(12) United States Patent
Koda et al.

(10) Patent No.: US 11,951,760 B2
(45) Date of Patent: Apr. 9, 2024

(54) INFORMATION DISPLAY MEDIUM AND MANUFACTURING METHOD RELATING THERETO

(71) Applicant: TOPPAN PRINTING CO., LTD., Tokyo (JP)

(72) Inventors: Soko Koda, Tokyo (JP); Akihito Kagotani, Tokyo (JP); Toshiki Toda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/988,714

(22) Filed: Nov. 16, 2022

(65) Prior Publication Data

US 2023/0115123 A1    Apr. 13, 2023

Related U.S. Application Data

(63) Continuation of application No. 16/330,368, filed as application No. PCT/JP2017/031844 on Sep. 4, 2017, now Pat. No. 11,584,151.

(30) Foreign Application Priority Data

Sep. 5, 2016 (JP) .................................. 2016-172797
Sep. 5, 2016 (JP) .................................. 2016-172798

(Continued)

(51) Int. Cl.
*B42D 25/373* (2014.01)
*B42D 25/337* (2014.01)
(Continued)

(52) U.S. Cl.
CPC ......... *B42D 25/373* (2014.10); *B42D 25/337* (2014.10); *B42D 25/435* (2014.10);
(Continued)

(58) Field of Classification Search
CPC .. B42D 25/373; B42D 25/337; B42D 25/435; B42D 25/29; B42D 25/324;
(Continued)

(56) References Cited

U.S. PATENT DOCUMENTS 4,579,754 A    4/1986  Maurer et al.
8,755,121 B2   6/2014  Cape et al.
(Continued)

FOREIGN PATENT DOCUMENTS

JP        H04-36 B2      1/1992
JP        2014-514177 A  6/2014

*Primary Examiner* — Justin V Lewis
(74) *Attorney, Agent, or Firm* — Squire Patton Boggs (US) LLP

(57) ABSTRACT

Provided is an information display medium that can enhance a forgery prevention effect. An information display medium (100) includes a light reflection layer (20) made of a metal or a metallic oxide and partially or fully placed on one surface of a substrate, and the light reflection layer (20) includes a first region (30) where first information is displayed by either of or a combination of an outline shape and a shape of an uneven region, and a second information display region (21*a*) where identification information formed by partial material removal of the light reflection layer (20), the second information display region being set to partially or fully overlap with the light reflection layer (20) where the first information is displayed in the first region (30).

3 Claims, 24 Drawing Sheets

(30) Foreign Application Priority Data

Sep. 5, 2016 (JP) .................................. 2016-172799
Oct. 25, 2016 (JP) .................................. 2016-208886
May 19, 2017 (JP) .................................. 2017-099619

(51) Int. Cl.

| | | |
|---|---|---|
| B42D 25/435 | (2014.01) | |
| G02B 5/18 | (2006.01) | |
| G07D 7/207 | (2016.01) | |
| G09F 3/02 | (2006.01) | |
| B42D 25/29 | (2014.01) | |
| B42D 25/324 | (2014.01) | |
| B42D 25/328 | (2014.01) | |
| B42D 25/333 | (2014.01) | |
| B42D 25/364 | (2014.01) | |
| B42D 25/425 | (2014.01) | |
| B42D 25/47 | (2014.01) | |
| G07D 7/12 | (2016.01) | |

(52) U.S. Cl.
CPC ............. *G02B 5/1857* (2013.01); *G09F 3/02* (2013.01); *B42D 25/29* (2014.10); *B42D 25/324* (2014.10); *B42D 25/328* (2014.10); *B42D 25/333* (2014.10); *B42D 25/364* (2014.10); *B42D 25/425* (2014.10); *B42D 25/47* (2014.10); *G07D 7/12* (2013.01); *G07D 7/207* (2017.05); *G07D 2207/00* (2013.01)

(58) Field of Classification Search
CPC .. B42D 25/328; B42D 25/425; G02B 5/1857; G02B 5/18; G09F 3/02; G07D 7/207
USPC .............. 283/67, 70, 72, 74, 75, 94, 98, 901
See application file for complete search history.

(56) References Cited

U.S. PATENT DOCUMENTS

| | | |
|---|---|---|
| 9,333,787 B2 | 5/2016 | Cape et al. |
| 2012/0194916 A1* | 8/2012 | Cape ........................ B41M 5/26 |
| | | 359/620 |
| 2014/0232809 A1 | 8/2014 | Cape et al. |

* cited by examiner

INFORMATION DISPLAY MEDIUM AND MANUFACTURING METHOD RELATING THERETO

TECHNICAL FIELD

This disclosure relates to a technology for an information display medium. Particularly, this disclosure relates to a technology for an information display medium is adaptive to manufactured by irradiation of a pulsed laser.

BACKGROUND ART

An article, e.g., a valuable security such as a bank note or a gift voucher, a certificate, a brand-name product, an expensive product, an electronic device, or a personal identification medium is require is difficult to forge for protect value and information of the article from others. In view of this, a forgery prevention technology or an information display method that makes difficult to forge is incorporated in such articles.

For instance, an information display medium that is hard to forge may be attached to the article or a display part may be formed in a part of the article to make it difficult to forge.

For instance, it is generally known that a watermark is formed to prevent forgery of a paper currency, a certificate, a ticket, and the like. It is also known that a watermark is obtained by a difference in paper thickness at the time of issuing a certificate stamp or a watermark is formed by embossing or by laser beam writing (see PTL 1).

However, conventionally, a watermark is formed at the issuing a certificate stamp, and therefore, an on-demand watermark cannot be formed. Further, the formation of a watermark by laser beam processing like PTL 1 requires mixing of pigment that absorbs a specific wave length into a certificate stamp and has a problem that the cost is increased.

Further, a watermark has been conventionally used in a paper substrate. However, a paper currency or the like that uses a polymeric material made of organic molecules as a substrate has started to be in circulation in recent years, and a formation method of a watermark in a substrate made of organic molecules is not established Further, a method of using forgery prevention ink has been known as display of a display part that is hard to be forged. For example, PTL 2 describes a method that spectral characteristics of reflection light are changed by using special color matter or pigment, so that information is easily recognized at the time of reflection observation.

Further, as the information display method, an uneven structure such as a diffraction grating, a hologram, a lens array, or a scattering structure may be used. In order to form the uneven structure, an expensive manufacturing facility such as an electron beam lithography device or a laser drawing device is required, and it is difficult to analyze the structure, so that a forgery prevention effect can be demonstrated.

Further, PTL 3 discloses the following manufacturing method of an optical element in a structure forming layer including a region having an uneven structure with a large aspect ratio, and a flat region or a region having a small uneven structure with a smaller aspect ratio. That is, a metallic reflective layer is formed on the structure forming layer at a uniform surface density by a vacuum evaporation method. After that, a material having durability to etchant to be used for etching the metallic reflective layer is formed at a uniform surface density by the vacuum evaporation method. Subsequently, a provided laminated body is subjected to an etching treatment. Hereby, the material having durability to the etchant becomes a discontinuous film due to the uneven structure with a large aspect ratio, and the etchant infiltrates through the laminated body, so that the metallic reflective layer can be removed only in the region having the uneven structure with a large aspect ratio. Hereby, the metallic reflective layer can be formed with high positional accuracy, and the forgery prevention effect can be raised more.

However, in the technique of PTL 3, although the metallic reflective layer and the material having durability to the etchant are formed by a dry process, a wet process is used at the time of the etching treatment. Accordingly, a plurality of processes should be performed at the time of manufacture, so that a cost is increased.

Further, since the material having durability to the etchant is formed in advance, the metallic reflective layer is removed to have only a fixed pattern, and therefore, it is difficult to remove the metallic reflective layer on demand.

CITATION LIST

Patent Literature

PTL 1: Japanese Patent No. 3486275
PTL 2: Japanese Patent No. 2999354
PTL 3: Japanese Patent No. 5051311

SUMMARY OF INVENTION

Technical Problem

This disclosure is intended to provide an information display medium that can enhance a forgery prevention effect.

Solution to Problem

In order to solve the problem, one aspect of this disclosure includes a substrate and a light reflection layer, where the light reflection layer made of one or more materials selected from a metal, an alloy, a metal compound, and a metalloid compound is placed on one surface of the substrate, and the light reflection layer includes a first region where first information is displayed by either of or a combination of an outline shape and a shape of an uneven region, and a second information display region where identification information is displayed by partially material removal of the light reflection layer, the second information display region being set to partially or fully overlap with a part of the light reflection layer where the first information is displayed in the first region.

Further, another aspect of this disclosure includes an organic substrate, and a drawing portion formed on the organic substrate, and the drawing portion includes a first drawing portion formed by a combination of a removed portion formed by partially removing a surface of the organic substrate and a carbonized recessed portion formed by carbonizing the surface of the organic substrate and having a luminous transmittance lower than that at a position of the removed portion, and a second drawing portion formed by a combination of a cavity portion formed inside the organic substrate and a carbonized portion formed inside the organic substrate and having a luminous transmittance lower than that of the cavity portion, the second drawing portion being more minute than the first drawing portion.

Further, another aspect of this disclosure includes an organic substrate and a drawing portion formed on the organic substrate, and the drawing portion is formed by a combination of a removed portion formed by partially removing a surface of the organic substrate and a carbonized recessed portion formed by carbonizing the surface of the organic substrate and having a luminous transmittance lower than that at a position of the removed portion.

Further, another aspect of this disclosure includes an organic substrate and a drawing portion formed on the organic substrate, and the drawing portion is formed by a combination of a cavity portion formed inside the organic substrate and a carbonized portion formed inside the organic substrate and having a luminous transmittance lower than that of the cavity portion.

Advantageous Effects of Invention

With one aspect of this disclosure, an information display medium that can enhance a forgery prevention effect can be provided.

Further, for example, the information display medium can be processed on demand without requiring an additional material or the like for forgery prevention, so that authentication information and identification information can be given.

BRIEF DESCRIPTION OF DRAWINGS

FIGS. 55A to 55C illustrate an information display medium according to 7 of the fifth embodiment, FIG. 55A is a bird's eye view illustrating a part of the information display medium, and FIG. 55B is a partial sectional view of the information display medium.

DESCRIPTION OF EMBODIMENTS

Figure 1:
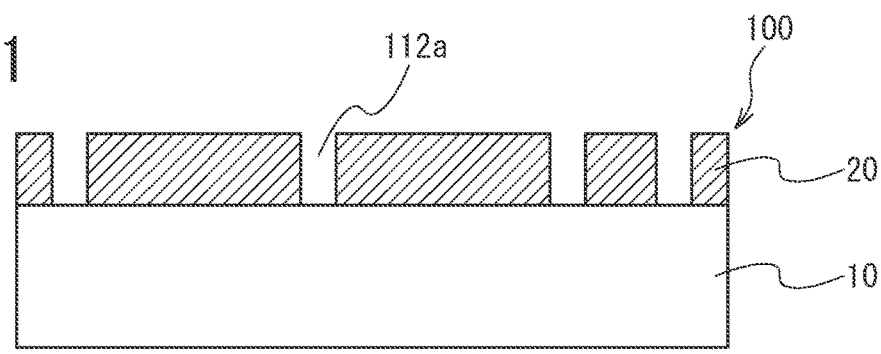
FIG. 1 is a partial sectional view would illustrating a part of a sectional structure of an information display medium according to a first embodiment.

Embodiments of this disclosure would be described with reference to the drawings.

Here, the drawings are schematic, and a relationship between thickness and flat dimension, a ratio between layer thicknesses, a recessed shape, and the like are different from real ones. Further, the embodiments described below exemplify configurations to embody the technical idea of this disclosure, and the technical idea of this disclosure does not specify a material, a shape, a structure, and the like of a component part to those described below. Various changes can be added to the technical idea of this disclosure within a technical scope defined by claims described in Claims.

First Embodiment

A first embodiment based on this disclosure would be described.

An information display medium of the present embodiment is configured that a light reflection layer made of a metal or a metal oxide is partially placed on one surface of a substrate, and includes a first region in which first information as authentication information is displayed by an outline shape of the light reflection layer, and a second information display region set in the light reflection layer, of the first region, in which the first information is displayed, that identification information formed by partially removing the light reflection layer is displayed. The first information as the authentication information may be configured by a combination of the outline shape of the light reflection layer and a shape of an uneven region to be described in a second embodiment, or by the shape of the uneven region to be described in the second embodiment. Third information may be formed in the substrate itself, and a region for the third information and the second information display region may overlap additionally.

The first information is recorded, for instance, as a pattern. Particularly, it is preferable that the first information made of a pattern have a curved pattern. The first information may be configured by a colored pattern, a line drawing, a geometric pattern, a calligraphy, a logo, a symbol, a portrait, a landmark, a landscape, an icon, a sign, or a combination of them. The first information typically has a graphical feature. A brand value is hereby raised.

The identification information formed in the light reflection layer in which the first information is displayed is a unique code, a personal profile, a serial number, a specific mark, or the like, for instance, and is typically recorded as a microcharacter that is hard to be observed by the naked eye. Since they are hard to be observed by the naked eye, their visual designs are not impaired, but if they are enlarged to be observed, they can be easily identified.

The identification information is formed, for instance, that the light reflection layer is partially removed by irradiating, with a pulsed laser, the light reflection layer in which the first information is to be formed in the first region.

When the identification information is recorded in the light reflection layer in which the first information is to be formed in the first region by partially removing the light reflection layer, the first information as the authentication information and the identification information are recorded indivisibly, thereby falsification of the information display medium can be prevented. Further, the identification information is recorded by being superimposed on the authentication information, so that a display surface of the information display medium can be utilized effectively.

A valuable security including authentication information and identification information may be formed by embedding or laminating of the information display medium described above.

Such a valuable security may be verified, for example, that the authentication information of the information display medium is identified by reflection light or transmitted light, and the first information is identified by enlarging and observing the authentication information of the information display medium by transmitted light.

Next would be described an exemplary configuration (an instance of partial removal) of the light reflection layer forming the first region or the second information display region. FIGS. 1 to 6 are partial sectional views illustrating an instance of an information display medium 100 according to the first embodiment.

Here, as can be seen from FIGS. 1 to 6, the first embodiment is an instance of a case that a surface (a top face in the figure) of a substrate 10 on which a light reflection layer 20 is formed is flat.

The Information display medium 100 is configured by the substrate 10 and the light reflection layer 20.

<Substrate>

A resin can be applied as a matrix of the substrate 10. The substrate 10 is typically a plastic. As the resin, one type or two or more types of resins selected from thermoplastic resin, thermoset resin, and photo-curing resin can be applied. A substrate 10 having optical transparency is preferable. Further, the substrate 10 may have a single-layered structure or may have a multi-layered structure. Furthermore, the substrate 10 may be made of a material having an optical anisotropy such as a liquid crystal material. In addition, the substrate 10 may be colored by adding dye or pigment to the resin.

Further, as the material of the substrate 10, metal oxides or their mixtures can be applied. As the metal oxides and their mixtures, $SiO_2$ (silicon dioxide), $TiO_2$ (titanium dioxide), or MgO (magnesium oxide) can be applied. Further, the material of the substrate 10 may be resin.

However, the substrate 10 has a refractive index different from that of the light reflection layer 20.

Note that, when the substrate 10 is made of a metal oxide, the substrate 10 can be formed by a dry coating, for instance, or can be formed by a wet coating such as gravure printing. As the dry coating, vapor coating, sputtering, and CVD (chemical vapor deposition) can be instantiated.

When the substrate 10 is made of resin, the substrate 10 can be formed, for instance, by extrusion molding, casting, or the wet coating. Further, the substrate 10 made of resin may be formed by a dry coating.

Note that, when the substrate 10 has optical transparency, information may be presented by the substrate 10 itself. For instance, when a relief hologram structure, a light scattering structure, a light interference structure, or the like is provided, information can be recognized by visual observation due to an optical effect of the structure.

Further, the substrate 10 may be made of a material which light transmit with scattering. Such a material may be paper or the like. Then, information may be presented by providing a watermark by varying the thickness of paper.

The thickness of the substrate 10 is preferably not less than 5 μm but not more than 200 μm. The thickness of the substrate 10 is more preferably not less than 20 μm but not more than 150 μm. When the substrate 10 has such thickness, strength of the substrate 10 becomes sufficient strength necessary to easily form the light reflection layer 20. In practice, the substrate 10 should have a thickness necessary for reflection observation or transmission observation at the time when the light reflection layer 20 is provided.

Further, the substrate 10 may have a uniform film thickness in the same region, or the film thickness may vary continuously or discontinuously.

<Light Reflection Layer 20>

The light reflection layer 20 is formed on one surface of the substrate 10. Note that the light reflection layer 20 may have a single-layered structure or may have a multi-layered structure.

As a material for the light reflection layer 20, one or more types of materials selected from a metal, an alloy, a metal compound, and a metalloid compound can be applied. As the metal, aluminum, silver, gold, copper, tin, or nickel can be used. As the alloy, steel, stainless steel, or duralumin can be used. Further, as the metal compound, zinc sulphide (ZnS), zinc oxide (ZnO), titanium dioxide ($TiO_2$), zirconium dioxide ($ZrO_2$), titanium nitride, alumina, magnesium fluoride, tungsten oxide ($WO_3$), or yttrium oxide ($Y_2O_3$) can be applied. As the metalloid compound, silica or germanium oxide can be used. A material with metallic luster is preferable in particular.

The light reflection layer 20 can be formed by vapor phase epitaxy for instance. As the vapor phase epitaxy, vapor deposition, sputtering, or CVD (chemical vapor deposition) can be used. Further, a wet coating technology such as a sol-gel method may be used, provided that the light reflection layer 20 is provided by the method.

The thickness of the light reflection layer 20 is preferably not less than 5 nm but not more than 100 nm. The thickness of the light reflection layer 20 is more preferably not less than 20 nm but not more than 60 nm. When the light reflection layer 20 has such thickness, the sufficient light reflectance for visual observation can be obtained, and the optical effect described below can be exhibit more easily.

Further, it is preferable that the light reflection layer 20 have a uniform film thickness in the same region, but the film thickness may vary continuously or discontinuously. Further, the light reflection layer 20 may form a periodic structure.

Further, the light reflection layer 20 in which the first information or the identification information is formed may be formed in a specific shape. As the specific shape, a colored pattern, a line drawing, a portrait, a landmark, a landscape, a sign, a symbol, an icon, a calligraphy, a geometric pattern, a code, a number, and a mark can be instantiated. For instance, in a case where the first information is formed, decorativeness may be enhanced by a specific pattern formed by a linear or curved pattern. When identification information is formed, the identification information may be formed in a specific pattern forming a microscopic character for instance.

In FIG. 1, a region 112a is formed in the light reflection layer 20 which the material is partially removed by a manufacturing process described below.

Due to the region 112a, a region with the light reflection layer 20 and the region 112a where the light reflection layer 20 is removed are different in reflectance at the time when the information display medium 100 is observed by reflection. Further, in a case where the light reflection layer 20 is made of a material that does not have optical transparency or the light reflection layer 20 has a thickness that interrupts the optical transparency, when the information display medium 100 is observed by transmission, the transmittance improves in the region 112a.

Thus, at reflection observation or transmission observation, the first information can be expressed by the region 112a.

Figure 2:
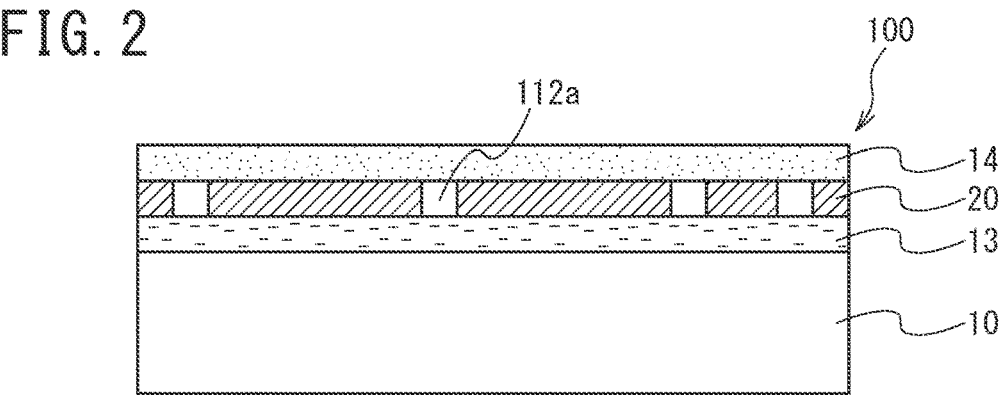
FIG. 2 is a partial sectional view illustrating a part of another instance of the sectional structure of the information display medium according to the first embodiment.

FIG. 2 is an instance of a sectional view to describe another configuration of the information display medium 100.

The information display medium 100 of FIG. 2 deals with an instance in which an adhesive layer 13 configured to closely bond the light reflection layer 20 to the substrate 10, and a protective layer 14 to prevent of damage to the light reflection layer 20 are provided. Even in such a case, the region 112a can be provided by applying local energy to the light reflection layer 20 by a pulsed laser, for instance.

Note that, in FIG. 1, the region 112a is formed to have a right angle at a corner on its section and to have a rectangular shape, but the region 112a may have a round corner and have a shape other than the rectangular shape. The following describes cases where the region 112a has a shape other than the rectangular shape, with reference to FIGS. 3 to 6.

Further, a surface of the substrate 10 on the light reflection layer 20 side, below the region 112a where the light reflection layer 20 is removed, may be carbonized. When the surface of the substrate 10 on the light reflection layer 20 side, below the region 112a where the light reflection layer 20 is removed, is carbonized, light is absorbed in the region 112a where the light reflection layer 20 is removed, so that visibility of the region 112a improves.

FIGS. 3 to 6 are instances in which respective information display media 100 are formed that respective light reflection layers 20 are removed to have different sectional structures.

Figure 3:
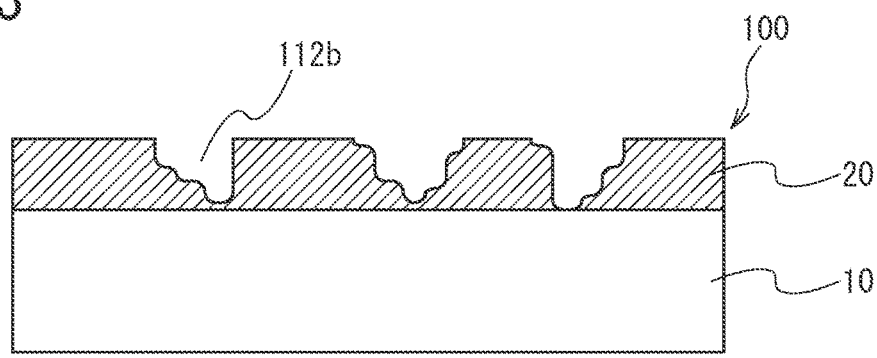
FIG. 3 is a partial sectional view illustrating a part of another instance of the sectional structure of the information display medium according to the first embodiment.

A region 112b in FIG. 3 illustrates a case that a part of the material of the light reflection layer 20 is removed so that the light reflection layer 20 is not completely penetrated to the substrate 10. Further, in the region 112b, the material of the light reflection layer 20 is removed in different thicknesses.

Hereby, the light reflection layer 20 has different thicknesses in the region 112b, so that different transmittances are obtained in parts having the different thicknesses. On that account, when the information display medium 100 is observed by transmission, the difference between the transmittances in the region 112b can be visually observed.

Further, when the light reflection layer 20 is thinned, the reflectance also decreases. Accordingly, in a case where information is written in the substrate 10 and the information and the region 112b overlaps with each other, the information thus formed in the substrate 10 can be checked at the time of reflection observation because the reflectance in the region 112b decreases.

Figure 4:
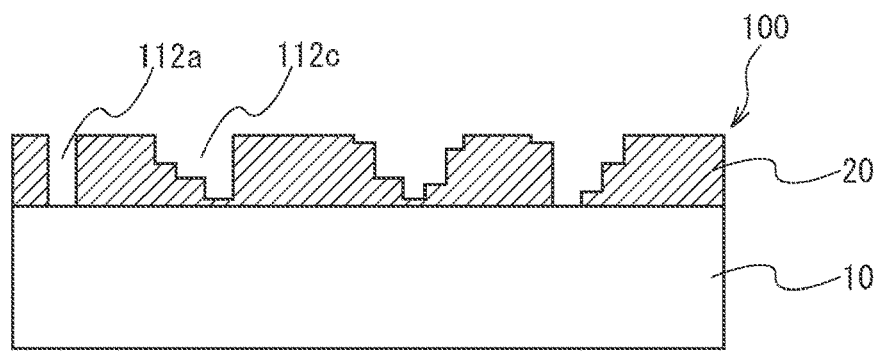
FIG. 4 is a partial sectional view illustrating a part of another instance of the sectional structure of the information display medium according to the first embodiment.

Note that FIG. 4 illustrates a case that the region 112a where the light reflection layer 20 is removed so that the light reflection layer 20 is penetrated to the substrate 10, and a region 112c where the light reflection layer 20 is removed in different thicknesses are formed at the same time.

Hereby, information to be provided by the region 112a where the light reflection layer 20 is completely removed can be combined with information to be provided by the region 112c having the light reflection layer 20 with different thicknesses.

Note that, in FIG. 3, a sectional shape of the light reflection layer 20 in the region 112b has round corners. In FIG. 4, sectional shapes in the regions 112a, 112c are right angles (in a stepped shape). In the present embodiment, the light reflection layer 20 may have any sectional shape, provided that the transmittance and the reflectance of the light reflection layer 20 can be changed.

Figure 5:
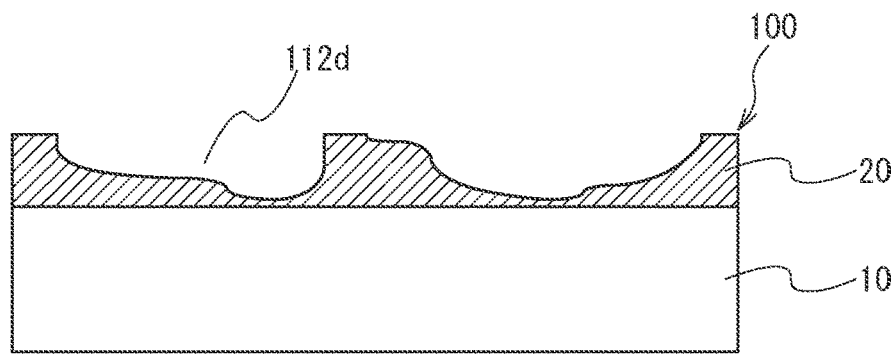
FIG. 5 is a partial sectional view illustrating a part of another instance of the sectional structure of the information display medium according to the first embodiment.
Figure 6:
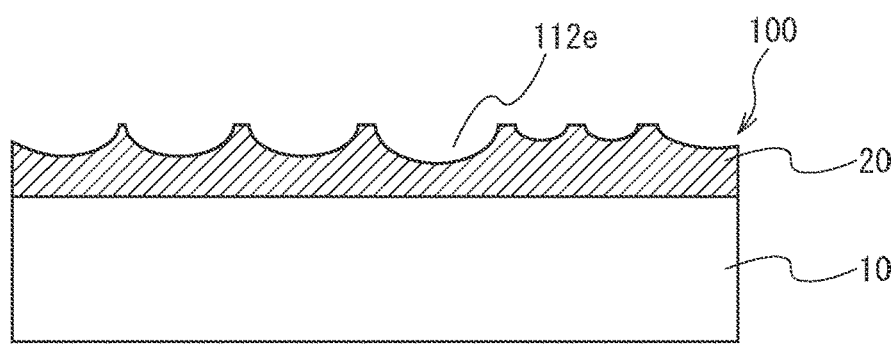
FIG. 6 is a partial sectional view illustrating a part of another instance of the sectional structure of the information display medium according to the first embodiment.

FIGS. 5 and 6 illustrate cases where structure sections 112d, 112e in which the material of the light reflection layer 20 is removed have curved structures in the sectional shape of the light reflection layer 20. Even in this case, the effect at the time of reflection observation and the effect at the time of transmission observation can be obtained.

In the regions 112a to 112e where the light reflection layer 20 is partially removed, the reflectance and the transmittance of the light reflection layer 20 can be changed in accordance with the sizes of the regions 112a to 112e to be formed.

Here, in a case that widths of regions where the region 112a to the region 112e are formed are not less than 300 μm but not more than 5 mm, more preferably not less than 500 μm but not more than 3 mm, changes of the reflectance and the transmittance of the light reflection layer 20 having different thicknesses due to the regions 112a to 112e are observable by visual inspection. In this case, a specific shape may be formed by the first region where the regions 112a to 112e are formed. The specific shape is a code, a mark, a number, a text, and the like, for instance.

Further, in a case that the widths of the regions where the regions 112a to 112e are formed are not less than 500 nm but not more than 300 μm, more preferably not less than 1 μm but not more than 100 μm, changes of the reflectance and the transmittance of the light reflection layer 20 can be partially formed by changing densities to provide the regions 112a to 112e. Hereby, the changes of the reflectance and the transmittance are observable by visual inspection.

In the meantime, in a case that the widths of the regions where the regions 112a to 112e are formed are not less than 500 nm but not more than 300 μm, more preferably not less than 1 μm but not more than 100 μm, a specific shape such as a picture, a mark, a number, a character, a geometric pattern, and the like may be formed in the regions where the regions 112a to 112e are formed. This allow to set the second information display region in which the specific shape is observable when the regions 112a to 112e are enlarged and observed by transmission or reflection.

As described above, by adjusting the width of the region where the light reflection layer 20 is partially removed, the first region where the first information is formed can be set, and by partially removing the material of the light reflection layer 20, in the first region, in which the first information is formed, the second information display region where identification information is formed can be set.

Figure 7A:
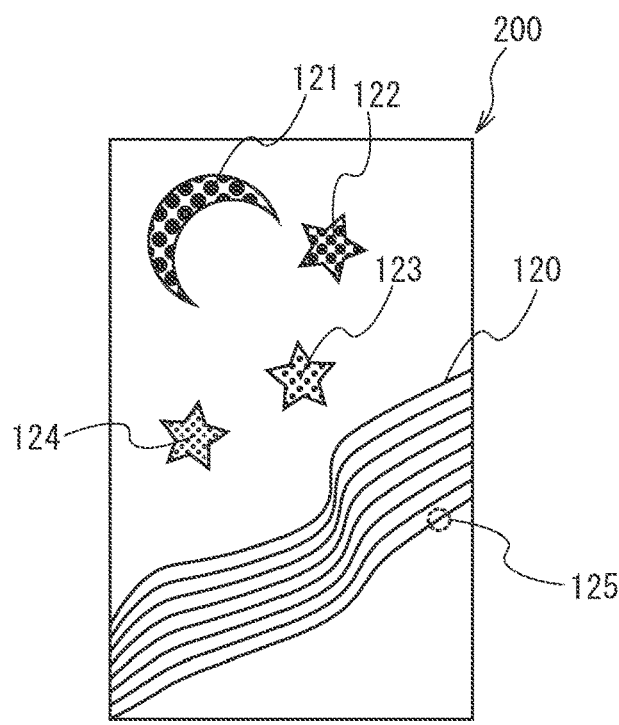
FIGS. 7A and 7B are front views illustrating an instance of the information display medium according to the first embodiment.
Figure 7B:
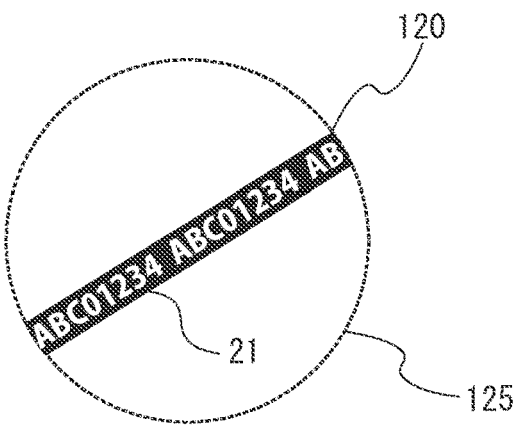

FIGS. 7A and 7B illustrate an information display medium 200 including regions 120, 121, 122, 123, 124, 21 having different reflectances and different transmittances of a light reflection layer 20 by partial removal. FIG. 7A illustrates an appearance of the information display medium 200, and FIG. 7B illustrates an enlarged view of a region 125 that is a part of the information display medium 200.

Here, in FIGS. 7A and 7B, the regions 120, 121, 122, 123, 124 serve as the first region, and as illustrated in FIG. 7B, the region 21 overlapping with the region 120 serves as the second information display region. Note that a part of the region 21 may be set to protrude from the region 120. Apart of a material removed portion in which identification information is formed may be placed in the region 120.

The region 120 is a first region in which first information is displayed by a pattern, namely, an outline shape, obtained by removing the light reflection layer 20 which the light reflection layer 20 is penetrated to the substrate 10. Further, the regions 121, 122, 123, 124, 21 are regions having different removal amounts of the light reflection layer 20.

When the information display medium 200 is visually observed by reflection, the differences in the removal amount of the light reflection layer 20 can be observed because the reflectance of the information display medium 200 is changed in accordance with the regions due to the differences in the removal amount. Particularly, in a case that a metal is applied for the light reflection layer 20, the differences are more obvious.

Further, in a case where information is formed in the substrate 10, the regions 120 to 124 have different transmittances, so that the information formed in the substrate 10 is observable at the time of visual reflection observation. Hereby, more complex information can be presented.

When the information display medium 200 is visually observed by transmission, the transmittance of the information display medium 200 changes in accordance with the regions due to the differences in the removal amount of the light reflection layer 20, so that the differences can be checked by eyes.

In the information display medium 200, the region 120 has a linear shape, the region 121 has a crescent shape, and the regions 122 to 124 have a pictural shape such as a star-shape. In practice, these regions are not limited to such pictures but may be formed in a specific shape such as a mark, a number, a character, and a geometric pattern.

Furthermore, a region having different information may be formed inside each region by further removing a part of the light reflection layer 20 inside the each region.

For instance, in FIG. 7B, in the region 125, the region 21 in which identification information is displayed is provided by further partially removing the light reflection layer 20 in a part of the region 120 included in the region 125. As the identification information, a microscopic character such as a unique code obtained in combination with a character, a number, and a mark, a personal profile, a serial number, or a specific mark such as "AB+" is preferably used. Hereby, when the information display medium 200 is enlarged and observed by transmission or reflection, the identification information in the region 21 constituting the second information display region inside the region 120 can be further recognized.

Note that, by forming identification information by irradiation with a pulse laser, a microscopic character and the like can be easily formed in a very small region.

As described above, the light reflection layer 20 is divided into respective regions and partially removed in the respective regions, and their removal amounts are changed, so that a plurality of pieces of information can be given to one information display medium 200 in an overlapped manner. Note that the plurality of pieces of information can be checked at the time of reflection observation or transmission observation.

Figure 8A:
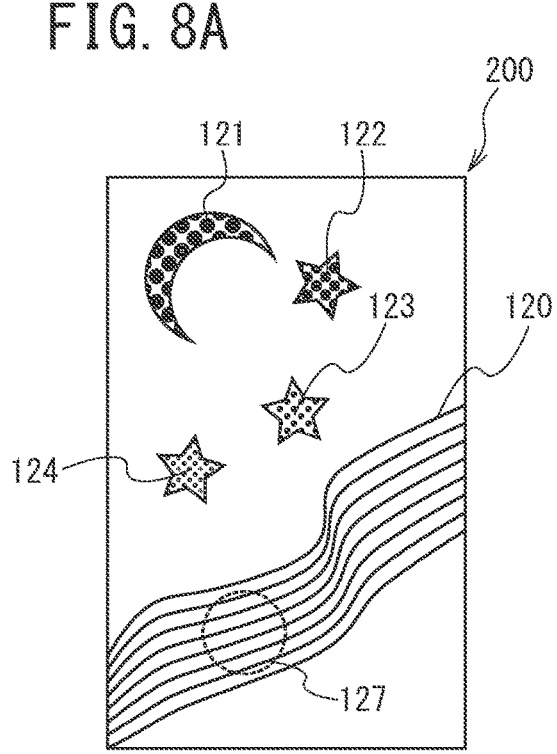
FIGS. 8A to 8C are front views illustrating an instance of the information display medium according to the first embodiment.
Figure 8B:
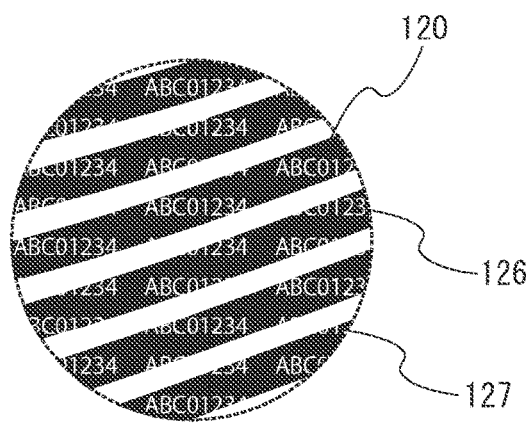
Figure 8C:
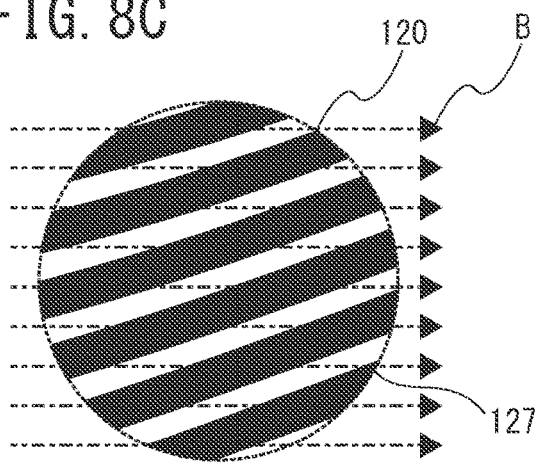

FIGS. 8A to 8C illustrate an information display medium 200 including regions 120, 121, 122, 123, 124, 126 having different reflectances and different transmittances of a light reflection layer 20. FIG. 8A illustrates an appearance of the information display medium 200, and FIG. 8B and FIG. 8C each illustrate an enlarged view of a region 127 that is a part of the information display medium 200.

The region 120 is a region where the light reflection layer 20 is removed so that the light reflection layer 20 is penetrated to the substrate 10. Further, the regions 121, 122, 123, 124, 126 are regions having different removal amounts of the light reflection layer 20.

When the information display medium 200 is visually observed by reflection, the reflectance of the information display medium 200 changes in accordance with the regions due to the differences in the removal amount of the light reflection layer 20, since the differences can be observed. Particularly, in a case that a metallic material is applied for the light reflection layer 20, the differences are more obvious.

Further, in a case where information is formed in the substrate 10, the information formed in the substrate 10 is observable at the visual reflection observation because the regions 120 to 124 have different transmittances. By this, more complex information can be presented.

When the information display medium 200 is visually observed by transmission, the transmittance of the information display medium 200 changes in accordance with the regions due to the differences in the removal amount of the light reflection layer 20, so that the differences can be checked by eyes.

In the information display medium 200, the region 120 has a linear shape, the region 121 has a crescent shape, and the regions 122 to 124 have a pictural shape such as a star-shape. In practice, these regions are not limited to such designs but may be formed in other specific shapes. The other specific shapes include a mark, a number, a character, a geometric pattern, and the like.

Furthermore, a region having different information may be formed inside each region by further removing the light reflection layer 20 inside the each region.

Here, at the time of forming the different information, a repeated pattern is formed as a picture to be recorded with a laser, so that the pattern recorded with the laser can be identified even if the pattern is displaced from the light reflection layer 20. A laser beam 50 is controlled anytime to scanning in a given direction, and a repetition distance of a picture to be formed is changed from a placement distance of a colored pattern or the like of the region 120, or an arrangement direction of the picture is changed from that of the colored pattern or the like of the region 120. Further, the picture is adjusted to fall within a width of the colored pattern. Hereby, further information can be checked in any part of the region 120 like FIG. 8B.

For instance, in FIG. 8B, the region 126 is provided in the region 127 by further partially removing the light reflection layer 20 in a part of the region 120 included in the region 127, so that character information is presented. But a picture, a mark, a number, a geometric pattern, or the like may be also presented practically, the character information no only presented. Hereby, when the information display medium 200 is enlarged and observed by transmission, the region 126 can be further recognized inside the region 120. The region 126 overlapping with the region 120 serves as the second information display region. Note that a part of the region 126 may be set to protrude from the region 120. Apart of a material removed portion in which identification information is formed may be placed within the region 120.

The region 126 in FIG. 8B is generated by scanning with the laser beam 50 along a laser scanning direction B in FIG. 8C.

The laser scanning direction is not limited to a straight line but may be a curve practically, provided that scanning is performed to form further information in the region 120 formed in advance in the information display medium 200.

<Manufacturing Method of Information Display Medium>

The following describes a manufacturing method of the information display medium 100, 200.

The information display medium 100, 200 is manufactured, after the light reflection layer 20 is formed on the substrate 10, by the light reflection layer 20 is partially removed or completely removed by locally applying energy to the light reflection layer 20 with a laser beam or the like.

Figure 10:
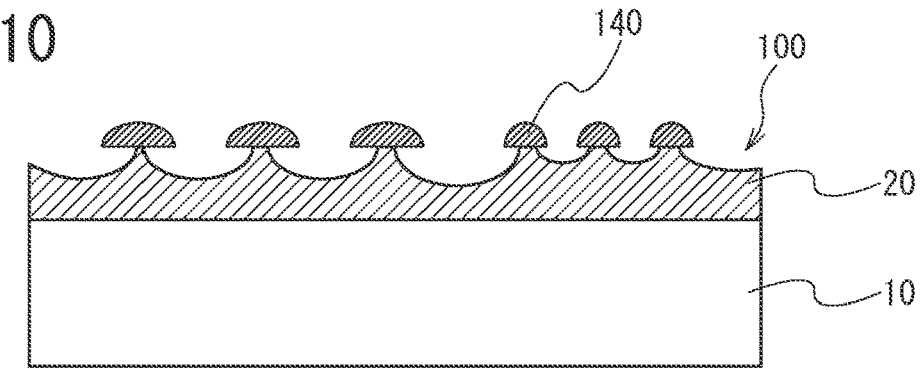
FIG. 10 is a partial sectional view to describe an example of the manufacturing method of the information display medium according to the first embodiment.

Alternatively, the information display medium 100, 200 is manufactured, after the light reflection layer 20 is formed on the substrate 10, by a patterning cover layer 140 is further formed on the light reflection layer 20 as illustrated in FIG. 10, and the light reflection layer 20 is partially removed or completely removed by a chemical treatment.

Figure 9:
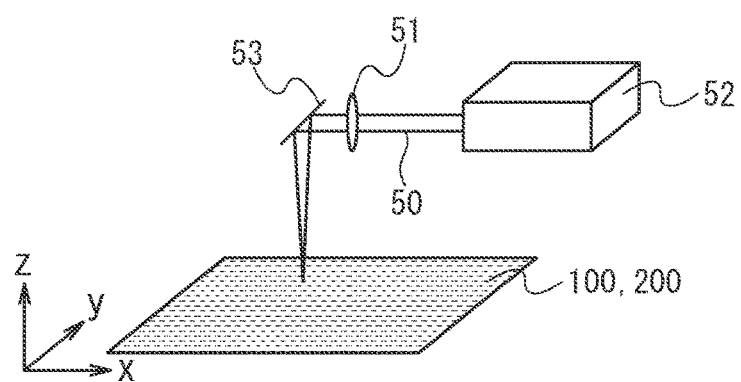
FIG. 9 is a bird's eye view illustrating an example of a manufacturing method of the information display medium according to the first embodiment.

As a method for locally applying energy to the light reflection layer 20, there is a technique using a pulsed laser source or a thermal head. Note that FIG. 9 illustrates a case that the pulse laser source is used.

A laser beam emitted from a pulse laser source 52 passes through a lens 51 and reflects from a reflecting mirror 53, and the laser beam is incident on the light reflection layer 20 forming the information display medium 100, 200 in a condensed manner. Then, energy of the laser beam is localized at a focal point, so that the light reflection layer 20 is melted and volatilized by the energy and is removed. Note that, in a case where the material is removed so that the light reflection layer 20 is penetrated, the laser beam may not necessarily be condensed on the light reflection layer 20.

By moving the information display medium 100, 200 or controlling a three-dimensional coordinate, X, Y, Z, of a beam waist position of the laser beam 50 at the processing with the laser beam, a region where the light reflection layer 20 is removed can be set.

Alternatively, the reflecting mirror 53 has a micro mirror array structure, so the beam waist position of the laser beam can be controlled by controlling the micro mirror array structure by a computer to control the phase of the laser beam.

Note that it is preferable for the pulse laser source 52 to have a pulse width of not less than 100 femtoseconds but not more than 1 picosecond. Hereby, the laser beam passing through the lens 51 momentarily has a high energy at the beam waist position, so that the light reflection layer 20 can be removed or carved. Further, since a time of such a high energy state is very short, an influence concentrates on an irradiation position.

At the time when the light reflection layer 20 is removed with the laser beam 50, the following system may be incorporated to accurately position for the removal.

Figure 11:
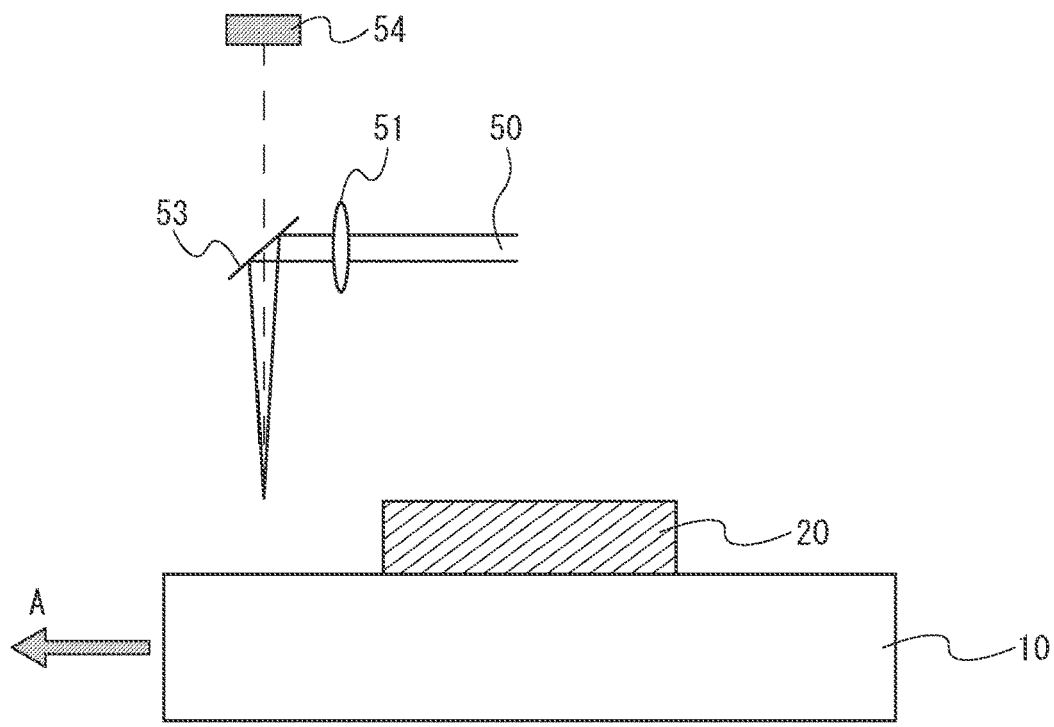
FIG. 11 is a schematic view illustrating an example of the manufacturing method of the information display medium according to the first embodiment.

As illustrated in FIG. 11, reflection light of the laser beam 50 from the substrate 10 or the light reflection layer 20 is measured with a detector 54 through a half mirror 53. Hereby, intensity change of the reflection light can be monitored through the detector 54. That is, it can be checked whether the light reflection layer 20 is provided on the substrate 10 or not.

However, in a case that the intensity of the laser beam 50 is high, the light reflection layer 20 may be removed at the moment when the light reflection layer 20 is irradiated with the laser beam 50. In view of this, it is necessary to monitor the intensity change of the reflection light with the detector 54 in a state where the optical intensity of the laser beam 50 is lowered. Alternatively, it is necessary to monitor the intensity change of the reflection light with the detector 54 in a state where the beam waist position of the laser beam 50 is shifted from the surface of the substrate 10.

As illustrated in FIG. 11, in a case that the substrate 10 is conveyed along a substrate conveying direction A, when the laser beam 50 approaches the light reflection layer 20, the intensity of the reflection light increases in the detector 54, so that it is found that the light reflection layer 20 approaches a region where the light reflection layer 20 can be irradiated with the laser beam 50. After that, a processing pattern set in advance is formed on the light reflection layer 20 with the laser beam 50, so that processing in line with the position of the light reflection layer 20 is performable.

Furthermore, a reflection-type spatial light modulator is used as the reflecting mirror 53, and the phase of each cell of the spatial light modulator is controlled by a computer to control the phase of the laser beam, so that the beam waist position of the laser beam can be controlled. Note that the spatial light modulator may be transmissive.

Note that the spatial light modulator not only controls the beam waist position of the laser beam, but also can divide the laser beam 50 into a plurality of beams and condense the beams, in addition to controlling of a focal point length of the laser beam 50.

By lengthening the focal point length of the laser beam 50, stable processing of removing the light reflection layer 20 isolated by disturbance such as vibration of a device or the like is possible.

As a method for lengthening the focal point length of the laser beam 50, it is also possible to lengthen the focal point length by replacing the lens 51 with an axicon lens or the like, other than the aforementioned technique using the spatial light modulator.

Further, as a method for a chemical treatment on the light reflection layer 20, the patterning cover layer 140 is partially provided on the light reflection layer 20 as illustrated in FIG. 10, and a chemical treatment (a wet etching or dry etching technique, or the like) is performed, so that the light reflection layer 20 can be partially removed or completely removed.

After the light reflection layer 20 is partially removed or completely removed, the patterning cover layer 140 may be left intact or may be removed.

FIG. 10 illustrates an instance in which the patterning cover layer 140 is provided in a dot pattern, but the patterning cover layer 140 is not limited to the dot pattern but may be a line pattern, a solid pattern, or the like. Alternatively, a specific pattern such as a picture, a mark, a number, a character, or a geometric pattern may be formed by the patterning cover layer 140.

The above manufacturing method can be applied after the information display medium 100, 200 is formed, so the manufacturing method can be applied as a post processing method to a production line for the information display medium 100, 200. Further, in a case of using the manufacturing method in which energy is locally applied, on-demand machining on the information display medium 100, 200 is performable.

Further, in a case of using the manufacturing method in which a chemical treatment is performed, the manufacturing method is performable in post processing at the same time as an etching process of a metal foil.

When the manufacturing method of this disclosure is applied to the information display medium 100, 200 as such, the regions 120, 121, 122, 123, 124, 21, 126 in the information display medium 200 illustrated in FIGS. 7 and 8 can have different optical expressions, respectively, and different pieces of information can be further provided in the regions. By a combination of such an optical expression and a combination of pieces of information, it is possible to determine that the information display medium 100, 200 is a genuine article.

Second Embodiment

Next would be described the second embodiment based on this disclosure with reference to the drawings.

The second embodiment is an instance of a case where a substrate includes a structure forming layer having an uneven structure, and first information is displayed on a metallic reflective layer in a shape of an uneven region due to recesses and projections.

Note that, in the drawings, the same reference sign is assigned to a constituent demonstrating the same or similar function, and a redundant description is omitted.

Figure 12:
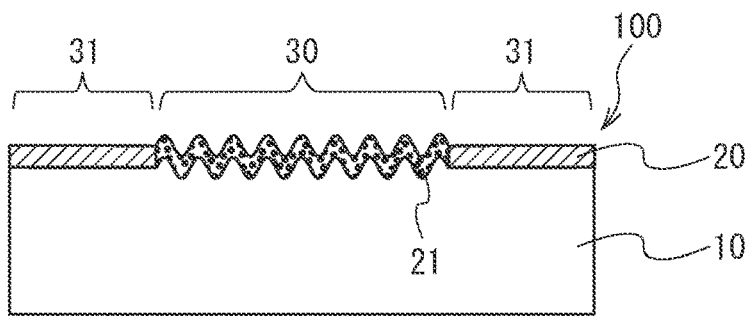
FIG. 12 is a partial sectional view illustrating a part of a sectional structure of an information display medium according to a second embodiment.
Figure 13:
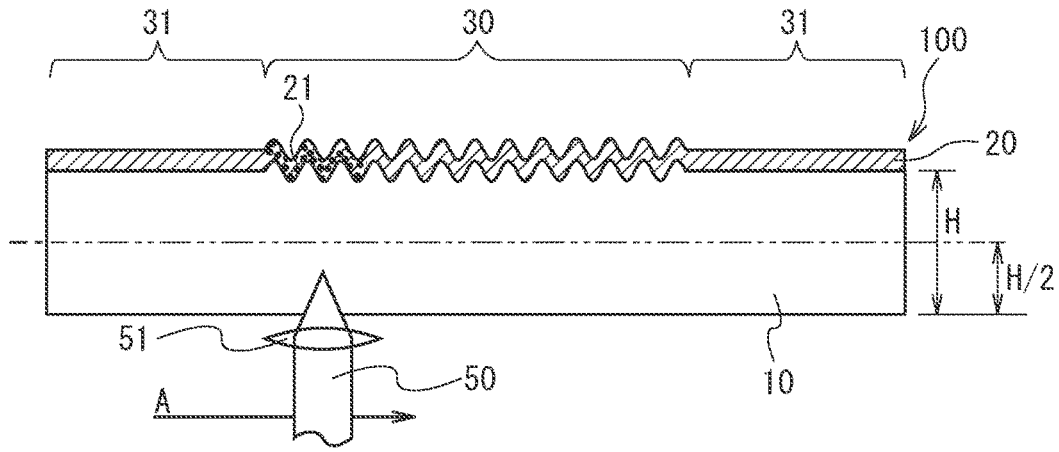
FIG. 13 is a partial sectional view illustrating a part of another instance of the sectional structure of the information display medium according to the second embodiment.
Figure 14:
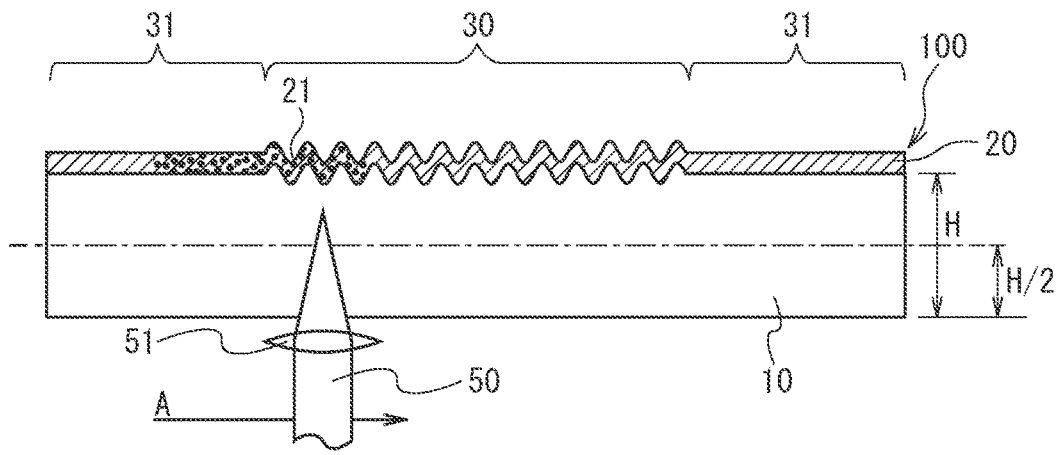
FIG. 14 is a partial sectional view illustrating a part of another instance of the sectional structure of the information display medium according to the second embodiment.

FIGS. 12 to 14 are partial sectional views each illustrating an instance of an information display medium according to the present embodiment. Each of the drawings illustrates a partial sectional view in a case where a light reflection layer 20 has a second information display region 21 in which a material forming the light reflection layer 20 is partially removed.

In the second embodiment, the structure forming layer is formed on a surface layer of the substrate. FIG. 12 exemplifies a case that the substrate is constituted only by a structure forming layer 10.

Exemplary Embodiment 1

In an information display medium 100 of Exemplary Embodiment 1 illustrated in FIG. 12, a first region 30 where an uneven structure is formed and a second region 31 where a flat structure is formed are formed on a surface of the structure forming layer 10. A light reflection layer 20 is formed on a boundary surface where those structures are formed. In addition, the first region 30 includes a second information display region 21 where a part of the light reflection layer 20 is removed. Accordingly, first information displayed in a shape of an uneven region is formed in the first region 30, and identification information is formed in the second information display region 21.

Note that the second region 31 does not necessarily have to be a flat planar shape and may have a planar shape with a roughness smaller than the first region 30. The same applies to the following other embodiments.

For instance, the roughness can be measured by use of arithmetic mean roughness (Ra: JISB0601).

A material including resin as a base material can be used for a substrate including the structure forming layer 10. The substrate is typically plastic. As the resin, thermoplastic resin, thermoset resin, or photo-curing resin can be applied. It is preferable for the substrate to have optical transparency. The substrate including the structure forming layer 10 may have a single-layered structure or may have a multi-layered structure. Furthermore, the substrate may be made of a material having an optical anisotropy such as a liquid crystal material. In addition, the substrate may be colored by adding dye or pigment to the resin.

Further, as the material of the substrate, metal oxides or their mixtures can be applied. As the metal oxides and their mixtures, $SiO_2$ (silicon dioxide), $TiO_2$ (titanium dioxide), or MgO (magnesium oxide) can be applied. Further, the material of the substrate may be resin. However, the substrate has a refractive index different from that of the light reflection layer 20.

Note that, when the substrate is made of a metal oxide, the substrate can be formed, for instance, by a dry coating technology or can be formed by a wet coating technology such as gravure printing. As the dry coating technology, vapor coating, sputtering, and CVD (chemical vapor deposition) can be instantiated.

When the substrate is made of resin, the substrate can be formed, for instance, by extrusion molding, casting, or the wet coating technology. Further, the substrate can be formed by the dry coating technology.

Note that, when the substrate has optical transparency, information may be presented by the substrate itself. For instance, when a relief hologram structure, a light scattering structure, a light interference structure, or the like is provided, information can be recognized by visual observation due to an optical effect of such a structure.

The thickness of the substrate is preferably not less than 5 μm but not more than 200 μm. The thickness of the substrate is more preferably not less than 20 μm but not more than 150 μm. When the substrate has such a thickness, strength of the substrate becomes sufficient strength necessary to easily form the light reflection layer 20. In practice, the substrate should have a thickness necessary for reflection observation or transmission observation at the time when the light reflection layer 20 is provided.

As illustrated in FIG. 12, the light reflection layer 20 is formed on a boundary surface, of the structure forming layer 10, where the uneven structure (a part corresponding to a first region) and the flat structure (a part corresponding to a second region) are formed. The light reflection layer 20 may have a single-layered structure or may have a multi-layered structure. Here, "flat" indicates that the roughness is smaller than that of a surface of the uneven structure.

As a material for the light reflection layer 20, a metal, an alloy, a metal compound, and a metalloid compound can be applied. As the metal, aluminum, silver, gold, copper, tin, or nickel can be applied. As the alloy, steel, stainless steel, or duralumin can be applied. Further, as the metal compound, zinc sulphide (ZnS), zinc oxide (ZnO), titanium dioxide ($TiO_2$), zirconium dioxide ($ZrO_2$), titanium nitride, alumina, magnesium fluoride, tungsten oxide ($WO_3$), or yttrium oxide ($Y_2O_3$) can be applied. As the metalloid compound, silica or germanium oxide can be applied. Particularly, a material with metallic luster is preferable as the material for the light reflection layer 20.

Note that light reflection layer 20 can be formed by vapor phase epitaxy. As the vapor phase epitaxy, vapor deposition, sputtering, or CVD (chemical vapor deposition) can be applied. Further, a wet coating technology such as a sol-gel method may be applied, provided that the light reflection layer 20 is provided by the method.

The thickness of the light reflection layer 20 is preferably not less than 5 nm but not more than 100 nm. The thickness of the light reflection layer 20 is more preferably not less than 20 nm but not more than 60 nm. Hereby, it is possible to obtain a sufficient light reflectance for visual observation.

Further, the light reflection layer 20 may have a uniform film thickness in the same region, or the film thickness may change continuously or discontinuously. Further, the light reflection layer 20 may form a periodic structure.

Further, the light reflection layer 20 may be formed in a specific shape. The specific shape is a mark, a number, a character, a geometric pattern, or the like.

The second information display region 21 may be formed in a specific shape entirely in the first region 30 or may be formed only partially in the first region 30. Note that the second information display region 21 is formed, for instance, by removing the material forming the light reflection layer 20 within a range of not less than 50% but not more than 100% per unit area. The unit area at this time can be a unit surface area (e.g., 1 mm$^2$) of the surface of the substrate 10.

Note that details of a formation method of the second information display region 21 would be described later.

Exemplary Embodiment 2

An information display medium 100 of Exemplary Embodiment 2, illustrated in FIG. 13, has a basic structure that is the same as the information display medium 100 of Exemplary Embodiment 1. Note that Exemplary Embodiment 2 is an example of a case where a second information display region 21 is set by material removal of a light reflection layer 20 positioned in a partial region inside a first region 30. Further, FIG. 13 also illustrates an example of a formation method of the second information display region 21. The formation method of the second information display region 21 illustrated in FIG. 13 is also applicable to Exemplary Embodiment 1 described above.

The information display media 100 of Exemplary Embodiment 1 and Exemplary Embodiment 2 are examples of a case where the second information display region is completely included inside the first region.

The formation method of the second information display region 21 as instantiated in FIG. 13 is as follows.

Note that the exemplary embodiment 2 exemplifies a case where the formation method of the second information display region 21 for identification information performs partial material removal of the light reflection layer 20 by irradiation with a laser.

Identification information is formed by, in terms of an average thickness H of a structure forming layer 10 in FIG. 13, a laser beam 50 condensed by a lens 51 is incident on a boundary surface of the structure forming layer 10, on an opposite side to a boundary surface where a structure is formed, and a beam waist of the laser beam 50 is moved based on drawing data set in advance, so that.

At this, by moving the beam waist of the laser beam 50 to a near side (a side distanced from the light reflection layer 20) that is a half of the average thickness H from a boundary surface of the structure forming layer 10 where no uneven structure is formed, a part of the material forming the light reflection layer 20 is removed in the first region 30 where the uneven structure is formed, and thus, the second information display region 21 is formed in the structure forming layer 10. At this, power is adjusted so that, in the second region 31 where the flat structure is formed in the structure forming layer 10, the material forming the light reflection layer 20 is not removed, or a removal amount of the material forming the light reflection layer 20 per unit area is less than 30%. In some cases, the power may be adjusted so that the removal amount of the material forming the light reflection layer 20 per unit area is less than 15%.

Exemplary Embodiment 3

An information display medium 100 of Exemplary Embodiment 3, illustrated in FIG. 14, has a basic structure that is the same as the information display medium 100 of Exemplary Embodiment 1. Note that Exemplary Embodiment 3 is an example of a case where a second information display region 21 is set that substance of a light reflection layer 20 positioned in partial regions of both of a first region 30 and a second region 31 is removed. Further, FIG. 14 also illustrates an example of the formation method of the second information display region 21.

The information display medium 100 of Exemplary Embodiment 3 is an example of a case where the second information display region 21 partially overlaps with the first region 30.

A laser beam 50 condensed by a lens 51 incident on a surface of the structure forming layer 10 that an opposite side to a surface where a structure is formed, according to average thickness H of a structure forming layer 10 in FIG. 14, and a beam waist of the laser beam 50 is moved based on drawing data set in advance, so that identification information is formed.

At this time, by the beam waist of the laser beam 50 is moved to a deeper side (the light reflection layer 20 side) that is a half of the average thickness H from a boundary surface of the structure forming layer 10 where no uneven structure is formed, a part of the material forming the light reflection layer 20 is removed in the second region 31 where a flat structure is formed as well as the first region 30 where an uneven structure is formed, and hereby, the second information display region 21 is formed on the structure forming layer 10. At this time, power is adjusted so that, in the second region 31 where the flat structure is formed in the structure forming layer 10, a removal amount of the material forming the light reflection layer 20 per unit area is 50% or more. In the present embodiment, Exemplary Embodiment 2 and Exemplary Embodiment 3 are performed by setting the power of the laser, and the like to the same condition.

Note that the second information display region 21 formed in the first region 30 and the second region 31 is formed not in the entire first region 30 and the entire second region 31, but partially in those regions.

In FIGS. 13 and 14, an arrow A indicates an example of a scanning direction of the laser beam 50.

Here, as described above, in FIG. 13, the second information display region 21 is formed only in the first region 30 where the uneven structure is formed in the region scanned with the laser beam 50. Further, in FIG. 14, in the region scanned with the laser beam 50, the second information display region 21 is formed in both of the first region 30 where the uneven structure is formed and the second region 31 where the flat structure is formed.

As such, even in a case that the power is set the same, by the scanning with the laser beam 50 with adjusting the beam waist position, a region where the second information display region 21 is formed can overlap with only the first region 30 or both of the first region 30 and the second region 31.

Here, the formation method of the second information display region 21 is not limited to the method in which drawing by scanning with the laser beam 50 as described above and may be a method in which a region irradiated with the laser beam 50 is controlled by use of a photo-mask, a method in which an irradiation direction of the laser beam 50 is controlled by use of a liquid crystal screen, a method in which the irradiation direction of the laser beam 50 is controlled by use of arrangement of mirrors, a method in which the irradiation direction of the laser beam 50 is controlled by use of a galvanometer mirror, or the like.

Here, at the time when the second information display region 21 is formed by irradiation with the laser beam 50, the material is removed by the material forming the light reflection layer 20 receives energy from the laser beam 50, and the material forming the light reflection layer 20 is sublimated by heat of the energy. Further, depending on the material forming the light reflection layer 20, the material is not sublimated but broken or carbonized. In a case where the material is broken or carbonized, the material is broken or carbonized to a size (an average diameter of 300 μm or less) that is not observable by naked eyes, and therefore, at the time of normal observation, substances thus broken or carbonized cannot be observed, so that the second information display region 21 can be applied for display of information without any problem.

Further, when the material forming the light reflection layer 20 is removed by 50% or more per unit area in the second information display region 21, the reflectance of the second information display region 21 decreases in comparison with other regions where the light reflection layer 20 is not removed, at the time when the information display medium 100 is observed by reflection. Alternatively, the transmittance of the second information display region 21 improves in comparison with other regions where the light reflection layer 20 is not removed, at the time when the information display medium 100 is observed by transmission. Note that the second information display region 21 is a part subjected to material removal by the laser in the light reflection layer 20, but identification information is not limited to the part where the material is removed and may be displayed in a part between parts where the material is removed.

Hereby, a plurality of pieces of information to be displayed by the information display medium 100 can be combined, and two or more pieces of information can be presented in an overlapped manner. For example, information presented by the uneven structure formed in the first region 30 and information presented by the second information display region 21 formed with the laser beam 50 can be included in the information display medium 100 in such a state where those regions overlap with each other.

Further, since the information presented by in the second information display region 21 is extremely small information such as a microscopic character and is presented by being hidden in information recorded in the first region 30, the information can be presented for the first time when the information is observed by reflection or transmission, so that identification information can be embedded in the information display medium 100 like latent image information. Note that, in the example of Exemplary Embodiment 3, the second information display region 21 is also formed in the second region, but in a case where identification information is formed like latent image information, it is preferable that the area of the second information display region 21 to be formed in the second region be not more than 30%, preferably not more than 15%.

Here, the identification information formed by the second information display region 21 is formed by condensing the laser beam 50, so that the identification information can be formed with a thin region width, and the region width can be changed. More specifically, the region width can be changed from 1 μm to 100 μm by one laser scanning. Further, the width of the second information display region 21 can be also changed by narrowing a scanning pitch at the time of scanning with the laser beam 50 or by changing a distance to the light reflection layer 20.

Note that, in a case where the identification information presented by the second information display region 21 is formed as a latent image as described above, the region width of the second information display region 21 should be set to 1 μm to 300 μm. This is because a line width of 300 μm or less is hard to be visually observed at the time of normal observation, due to the resolution of naked eyes. Further, when the identification information is embedded in the region of the first information, it becomes further difficult to visually observe the identification information.

Further, when the region width of the second information display region 21 is set in the order of millimeter, it is possible to visually observe the identification information at the time of normal observation.

The laser beam 50 is preferably emitted by a laser (a pulsed laser) that emits a laser beam more intermittently than a continuous-wave laser (CW laser), and more specifically, a picosecond laser or a femtosecond laser is most preferable.

The picosecond laser as the pulsed laser should be a laser that oscillates by fiber or solid crystal. Further, as the femtosecond laser, a laser that oscillates by fiber or solid crystal (titanium sapphire crystal) can be instantiated.

The picosecond laser and the femtosecond laser have a very short pulse width of a laser pulse, and therefore, a very strong energy is generated in a very small space near a focal point of a laser beam when the laser beam is condensed and emitted. When the material forming the light reflection layer 20 is sublimated or is minutely broken or carbonized by the energy or heat caused due to the energy, the material is removed.

With the use of these pulsed lasers, it is possible to momentarily apply a high energy at a laser focal point, thereby resulting in that sublimation, breaking, or carbonization of the material occurs. Accordingly, it is not necessary to use a laser beam absorptive material, a laser beam heat generation material, and the like conventionally required for generation of identification information, thereby making it possible to reduce a manufacturing cost. Further, a repetition frequency of the pulse can be 1 kHz to 1 GHz. The power of the laser can be also changed by changing the repetition frequency. Further, the power can be also changed by changing a Q-value.

Exemplary Embodiment 4

Figure 15:
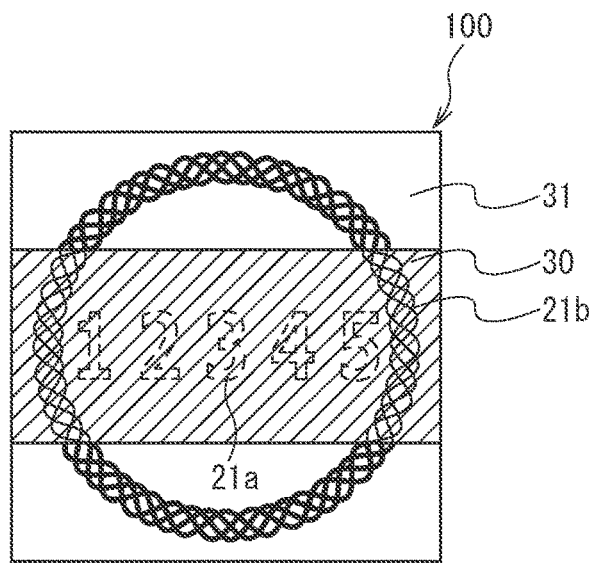
FIG. 15 is a front view illustrating an instance of the information display medium according to the second embodiment.

An information display medium 100 of Exemplary Embodiment 4 illustrated in FIG. 15 includes, as a second information display region 21, a second information display region 21a formed to be included in a first region 30 where an uneven structure is formed, and a second information display region 21b formed to extend over the first region 30 and a second region 31.

The uneven structure in the first region 30 is a relief structure or a random dot structure. As the relief structure, a one-dimensional relief structure or a two-dimensional relief structure can be applied.

The one-dimensional relief structure is, for example, a structure in which a grating vector is parallel to an X-direction or a Y-direction or a structure in which a grating vector is arranged in a direction having a specific angle from the X-, Y-directions. The two-dimensional relief structure has grating vectors in two directions, and the two-dimensional relief structure is, for example, a structure in which the grating vectors are parallel to the X-direction and the Y-direction, respectively, or a structure in which the grating vector are arranged in directions having a specific angle from the X-, Y-directions.

A sectional shape of the relief structure is a wave type, a saw tooth wave, a square wave, a step type, and the like. More specifically, in FIG. 15, the second information display region 21a is formed only in the first region 30, and by removing a material forming a light reflection layer 20, identification information of numerals "12345" is formed in the first region 30. Further, the second information display region 21b is formed to extend over the first region 30 and the second region 31, and by removing the material forming the light reflection layer 20, a geometric pattern like a colored pattern is formed as identification information.

Further, in the first region 30 where the uneven structure is formed in FIG. 15, information different from the identification information presented by the second information display region 21a is presented by reflection, diffraction, deflection, interference, and scattering of light to be caused by the uneven structure. Here, a shape forming first information by the uneven structure, the identification information of the second information display region 21b, and the like may constitute a background pattern, a decoration, or the like and may not exhibit a special content.

Further, it is more preferable that lines forming the second information display region 21a, 21b be formed by a much minute line drawing, geometric pattern, colored pattern, calligraphy, or the like. Hereby, when the second information display region 21a, 21b is enlarged and observed, further different information can be presented.

In addition, in a manufacturing process of the information display medium 100, the second information display region 21a, 21b can be formed to present different information for each information display medium 100 to be manufactured. This is because the light reflection layer 20 can be removed with a laser beam 50 based on different information every time.

Exemplary Embodiment 5

Another example of the formation method of the second information display region would be described.

A region 70 is a second information display region, and Exemplary Embodiment 5 is an example in which the region 70 is formed only in a first region 60.

Figure 16:
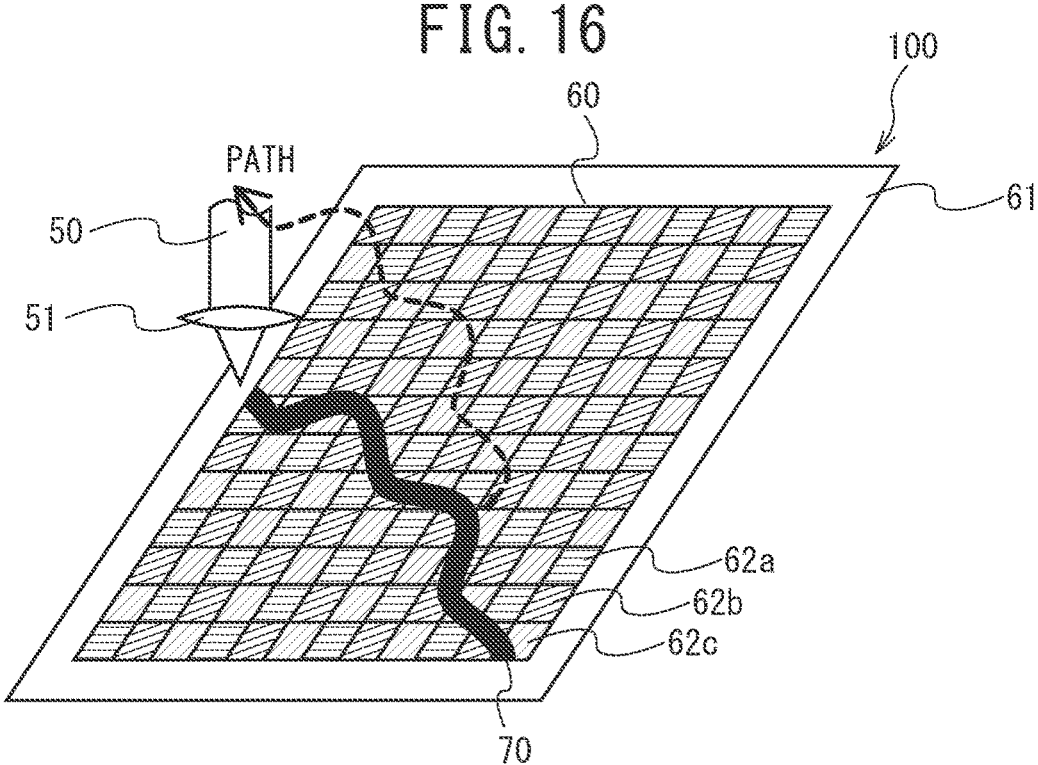
FIG. 16 is a partial enlarged bird's eye view illustrating an instance of the information display medium according to the second embodiment.

An information display medium 100 of Exemplary Embodiment 5 illustrated in FIG. 16 is a view to describe an example of a case that a laser beam 50 is moved over the first region 60 and a second region 61 to form the region 70. Further, the first region 60 includes three subregions 62a, 62b, 62c. Note that a dotted arrow indicated by PATH denotes a path where the laser beam 50 has passed.

Further, in FIG. 16, the laser beam 50 is incident on a boundary surface on a side opposite to a side where an uneven structure forming the first region 60 is formed and a side where a flat structure forming the second region 61 is formed, and a beam waist position of the laser beam 50 is set on a side distanced from a light reflection layer 20 from a half of an average thickness H of a structure forming layer 10. Accordingly, as described above, the light reflection layer 20 in the first region 60 where the uneven structure is formed is removed, but the light reflection layer 20 in the second region 61 is not removed, so that a wavy pattern like the region 70 is formed only in the first region 60.

Exemplary Embodiment 6

Another example of the formation method of the second information display region would be described.

A region 70 is a second information display region, and Exemplary Embodiment 6 is an example in which the region 70 is formed to extend over a first region 60 and a second region 61.

Figure 17:
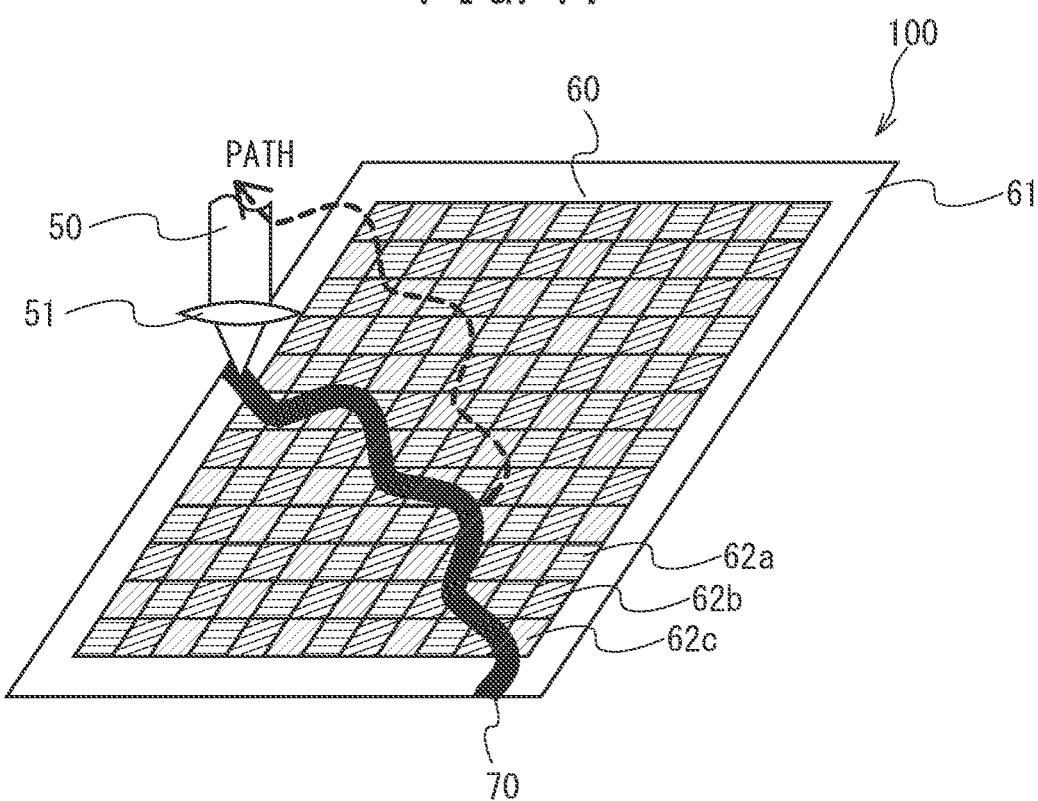
FIG. 17 is a partial enlarged bird's eye view illustrating another instance of the information display medium according to the second embodiment.

An information display medium 100 of Exemplary Embodiment 6 illustrated in FIG. 17 is a view illustrating another example to describe the formation of the region 70 in a case that a laser beam 50 is moved over the first region 60 and the second region 61. Further, the first region 60 includes three subregions 62a, 62b, 62c. Note that a dotted arrow indicated by PATH denotes a path where the laser beam 50 has passed.

In FIG. 17, the laser beam 50 is incident on a boundary surface on aside opposite to a side where an uneven structure forming the first region 60 is formed and a side where a flat structure forming the second region 61 is formed, and a beam waist position of the laser beam 50 is set on a deeper side (a side close to a light reflection layer 20) from a half of an average thickness H of a structure forming layer 10. Accordingly, as described above, the light reflection layer 20 is removed in both of the first region 60 where the uneven structure is formed and the second region 61, so that a wavy pattern like the region 70 is formed to extend over the first region 60 and the second region 61 in Exemplary Embodiment 6.

Here, in the instances illustrated in FIGS. 16, 17, the three subregions 62a, 62b, 62c are placed periodically in the first region 60, but the subregions 62a, 62b, 62c may be placed like a character, a number, a picture, a geometric pattern, or a colored pattern, so that information may be presented by reflection, diffraction, deflection, interference, or scattering of light by the uneven structure formed in the subregions 62a, 62b, 62c.

Further, by irradiate the laser beam 50 along the character, the number, the picture, the geometric pattern, the colored pattern, or the like formed by the subregions 62a, 62b, 62c, positional information of information formed by the subregions 62a, 62b, 62c and information to be obtained by the region 70 formed by the laser beam 50 can be aligned without any error.

In FIGS. 16, 17, a vector scan method in which the laser beam 50 is moved along the region 70 like PATH to form the region 70 is employed, but the region 70 may be formed by a raster scan method.

Further, the region 70 may be formed by the vector scan or raster scan method which an image is formed by the laser beam 50 at a single focal point, or the region 70 may be formed collectively within a specific dimensional area that an image is formed by the laser beam 50 at a plurality of focal points. Further, in a case where an image is formed by the laser beam 50 at the plurality of focal points, the region 70 may be formed by forming a character, a number, a picture, a geometric pattern, a colored pattern, or the like by the plurality of focal points.

Exemplary Embodiment 7

Figure 18:
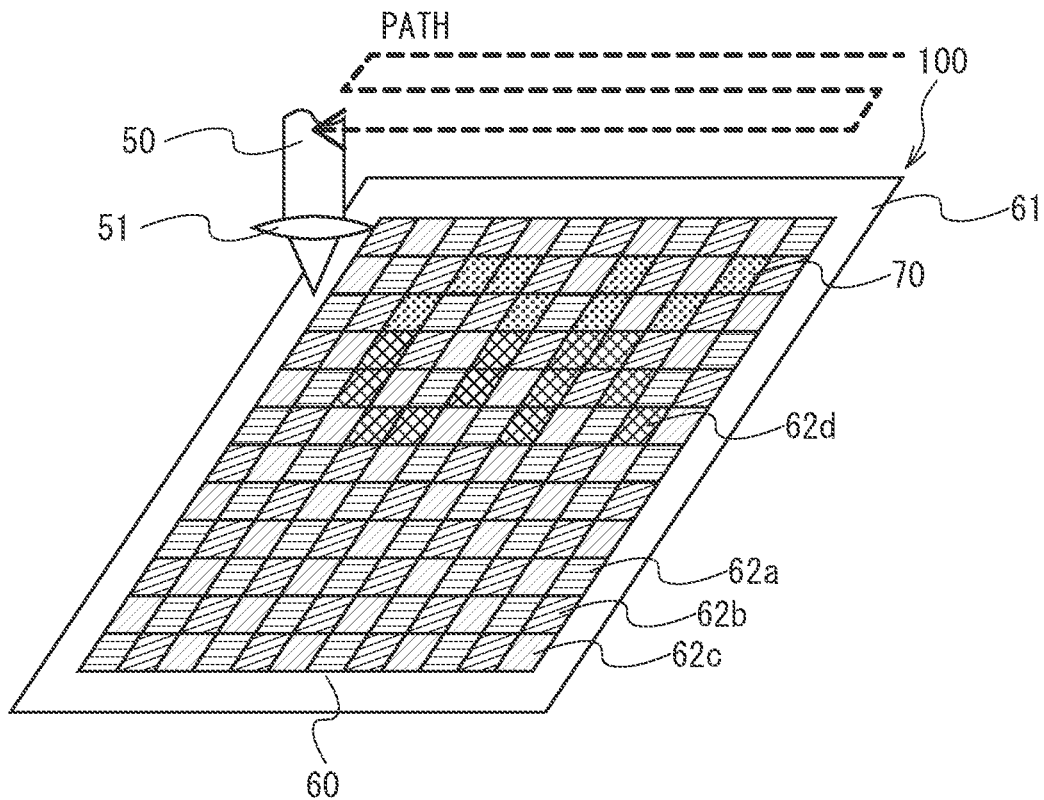
FIG. 18 is a partial enlarged bird's eye view illustrating another instance of the information display medium according to the second embodiment.

An information display medium 100 of Exemplary Embodiment 7 illustrated in FIG. 18 is a view illustrating another example to describe a case that a laser beam 50 is moved over a first region 60 and a second region 61 to form a region 70. Further, in Exemplary Embodiment 7, the first region 60 includes four subregions 62a, 62b, 62c, 62d. Note that a dotted arrow indicated by PATH denotes a path where the laser beam 50 has passed.

Further, in FIG. 18, the laser beam 50 is incident on a boundary surface on a side opposite to a side where an uneven structure forming the first region 60 is formed and a side where a flat structure forming the second region 61 is formed, and a beam waist position of the laser beam 50 is set on a nearside (a side distanced from a light reflection layer 20) from a half of an average thickness H of a structure forming layer 10. On this account, the light reflection layer 20 is removed only in the first region 60 where the uneven structure is formed, so that the region 70 is formed in the first region 60.

Here, in Exemplary Embodiment 7, aspect ratios of uneven structures forming the subregion 62a, 62b, 62c are not less than 0.1 but less than 1, and an aspect ratio of an uneven structure forming the subregion 62d is set to be not less than 1 but not more than 2.

Since the aspect ratios of the uneven structures are different, surfaces of the uneven structures have different surface areas. As the aspect ratio of the uneven structure is higher, the surface area is larger, and therefore, at the time when the light reflection layer 20 is formed, a region with a high aspect ratio has a thinner apparent thickness of the light reflection layer 20 than that of a region with a low aspect ratio.

Thus, when the laser beam 50 is irradiated, the light reflection layer 20 is easily removable in the region with a high aspect ratio because the thickness of the light reflection layer 20 is thin.

In FIG. 18, the aspect ratio of the uneven structure is high in the subregion 62d, and therefore, when the laser beam 50 is irradiated along PATH by the raster scan method, a larger amount of the light reflection layer 20 is removed in the subregion 62d than in the subregions 62a, 62b, 62c, and thus, the region 70 is formed. In FIG. 16, the subregion 62d is placed to form characters "OK," and therefore, when the information display medium 100 is scanned and irradiated with the laser beam 50, the characters "OK" are formed as identification information and displayed in the region 70.

The information formed by the subregion 62d or the region 70 as illustrated in FIG. 18 is not limited to character information, and information indicated by a number, a picture, a geometric pattern, a colored pattern, or the like may be presented, for instance.

Exemplary Embodiment 8

Figure 19:
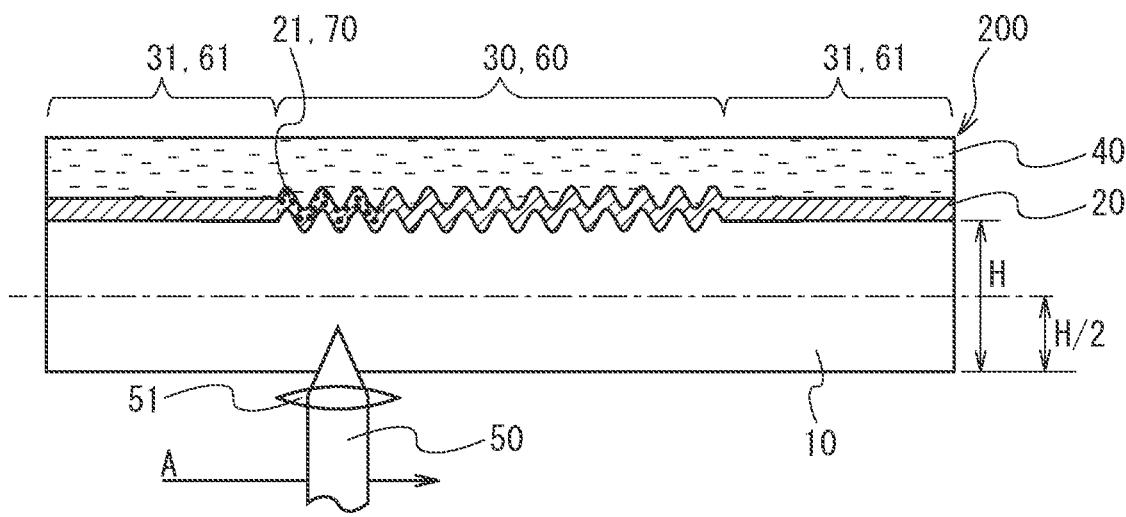
FIG. 19 is a partial sectional view illustrating a part of another instance of the sectional structure of the information display medium according to the second embodiment.

An information display medium 200 of Exemplary Embodiment 8 illustrated in FIG. 19 has a structure similar to those of the information display media 200 of Exemplary Embodiments 1 to 3 but illustrates a case where an adhesive layer 40 is formed on a light reflection layer 20.

Since the adhesive layer 40 is provided, the information display medium 200 can be attached to various substrates 41. For instance, like the information display medium 200 illustrated in FIG. 20, the information display medium 200 can be configured that the adhesive layer 40 is attached to a substrate 41.

Figure 20:
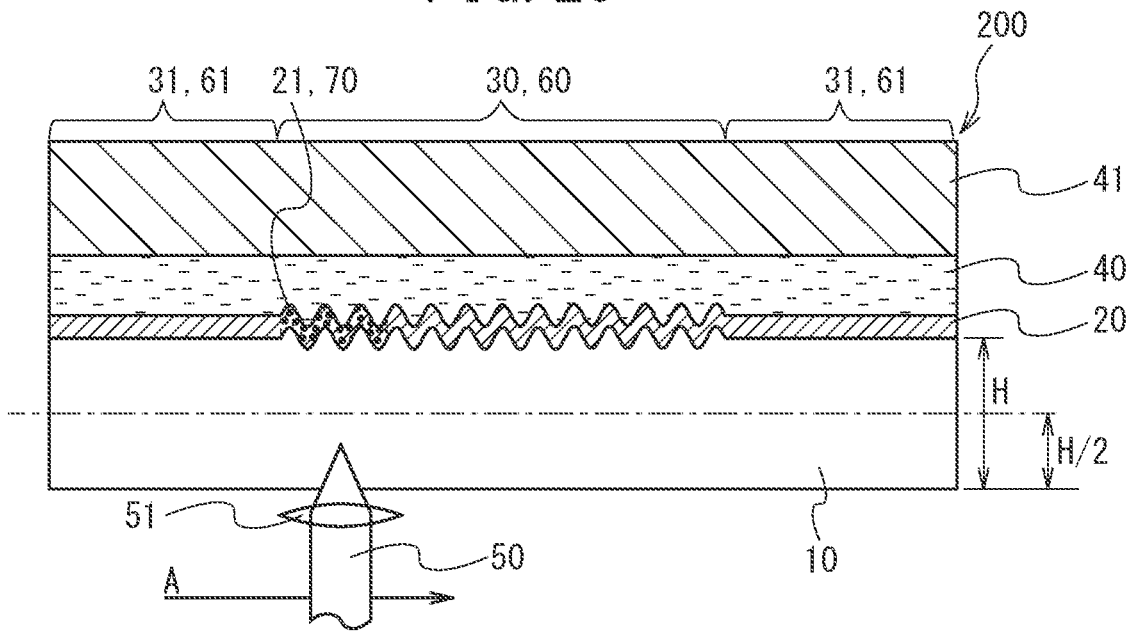
FIG. 20 is a partial sectional view illustrating a part of another instance of the sectional structure of the information display medium according to the second embodiment.

When the information display medium 200 is configured like FIGS. 19 and 20, not only an uneven structure or a flat structure is formed in the structure forming layer 10, but also the structure forming layer 10 itself has a role as a protective layer that protects the uneven structure or the flat structure. In practice, a protective layer may be formed on a side of the structure forming layer 10 where the uneven structure or the flat structure is not formed. At this time, it is further preferable that a material through which the wave length of a laser beam 50 passes be applied for the protective layer.

Figure 21:
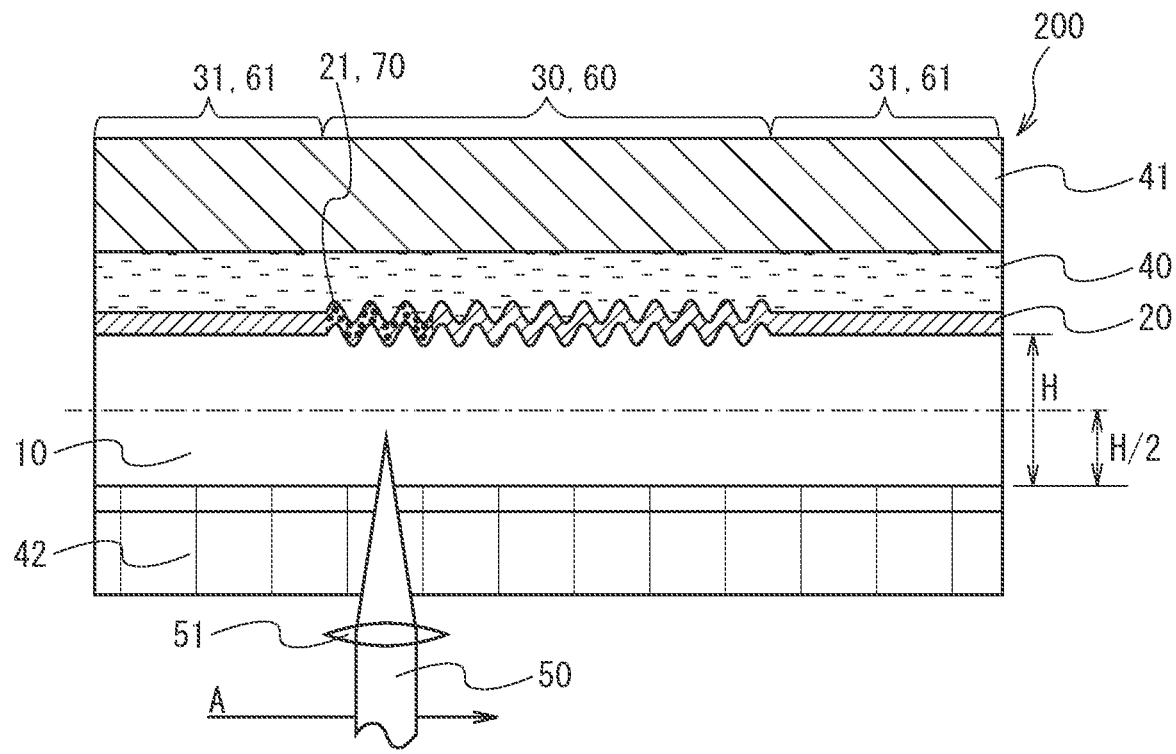
FIG. 21 is a partial sectional view illustrating a part of another instance of the sectional structure of the information display medium according to the second embodiment.

The information display medium 200 illustrated in FIG. 21 has a configuration in which a carrier layer 42 is further provided in addition to the configuration illustrated in FIG. 20. At the time of manufacturing the information display medium 200, the carrier layer 42 is useful in a manufacturing process of forming the structure forming layer 10, the light reflection layer 20, and the adhesive layer 40. Further, the carrier layer 42 is also useful for the purpose of protecting the information display medium 200 at the time when the information display medium 200 is attached to the substrate 41.

The information display medium 200 illustrated in FIGS. 19, 20, 21 is manufactured by forming of the uneven structure and the flat structure, forming of the light reflection layer 20, and forming of the adhesive layer 40 sequentially in this order after the structure forming layer 10 is formed, for instance, but the order of formation may be changed in accordance with an actual manufacturing process.

Further, in FIGS. 19, 20, 21, a boundary surface on which the laser beam 50 is incident is a boundary surface (the lower side in the figures) of the structure forming layer 10 on a side opposite to a boundary surface where the uneven structure or the flat structure is formed, but if the adhesive layer 40 and the substrate 41 are made of a transparent material or a material through which the laser beam 50 passes, the second information display region 21, 70 can be formed by removing a material forming the light reflection layer 20 that the laser beam 50 is incident on a boundary surface where the adhesive layer 40 is formed or a boundary surface where the substrate 41 is formed.

Here, an adhesive layer may be formed on a back side of the abovementioned information display medium 100, 200, and releasing paper may be attached to the adhesive layer as a label.

[Manufacturing Method of Information Display Medium]

The following describes an example of a manufacturing method of the information display medium 100, 200.

The information display medium 100, 200 is manufactured, for example, by the following steps 1 to 3 that the steps are performed in this order.

Step 1 is a step of forming a structure on a boundary surface of the structure forming layer 10 by pressing, on a surface of the structure forming layer 10, a printing plate on which an uneven structure and a flat structure are formed in advance.

Step 2 is a step of forming the light reflection layer 20 on the boundary surface where the structures are formed in step 1.

Step 3 is a step of forming the second information display region 21, 70 by controlling whether the light reflection layer 20 included in the first region 30, 60 and the second region 31, 61 is removed or not, such that, while the beam waist position of the laser beam 50 is controlled, the laser beam 50 is irradiated on a boundary surface of the structure forming layer 10 where the structure is not formed.

At this time, before step 1, step 4 of forming the structure forming layer 10 on the carrier layer 42 may be included.

Further, step 4 of forming the adhesive layer 40 on the light reflection layer 20 formed in step 2 and step 5 of attaching the structure forming layer 10 to the substrate 41 via the adhesive layer 40 may be included.

Further, in step 3, irradiation may be performed on a surface of the substrate 41 on a side that does not make contact with the adhesive layer 40 while the beam waist position of the laser beam 50 is controlled.

FIG. 20 illustrates a view as a method of irradiating the information display medium 100, 200 with the laser beam 50.

In this example, the laser beam 50 emitted from the laser source 52 passes through the reflecting mirror 53 and the lens 51 and is incident on the information display medium 100, 200. Note that the order of passing through the reflecting mirror 53 and the lens 51 may be reversed to the above. This makes it possible to remove the light reflection layer 20.

Figure 22:
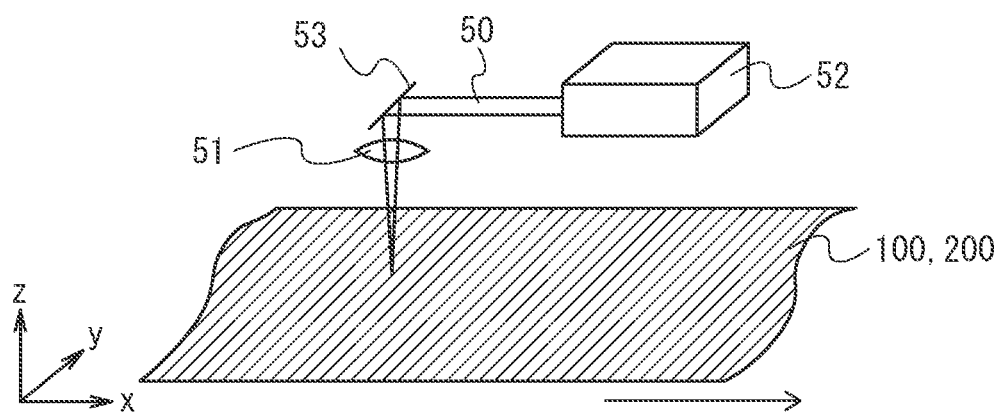
FIG. 22 is a bird's eye view illustrating an example of a manufacturing process of the information display medium according to the second embodiment.

Note that, in FIG. 22, the information display medium 100, 200 is conveyed to the direction indicated by an arrow in the figure. That is, the removal of the light reflection layer 20 can be controlled by the laser beam 50 while the information display medium 100, 200 is conveyed.

As the reflecting mirror 53, a galvanometer mirror, a micro-mirror array structure, or a liquid crystal display may be employed as well as a normal planar mirror, and by controlling them by a computer, the irradiation position or the phase of the laser beam can be controlled. Further, the beam waist position of the laser beam can be also controlled.

In addition, in a case where the reflecting mirror 53 is a micro-mirror array structure or a liquid crystal display, a plurality of beam waist positions can be formed by controlling the phase of the laser beam 50. This makes it possible to shorten a processing time of an actual manufacturing process.

As another method to control the beam waist position of the laser beam 50, the beam waist position of the lens 51 can be controlled by controlling the position of the lens 51 or by using a liquid lens or a liquid crystal lens as the lens 51.

[Instance of Uneven Structure]

Figure 23:
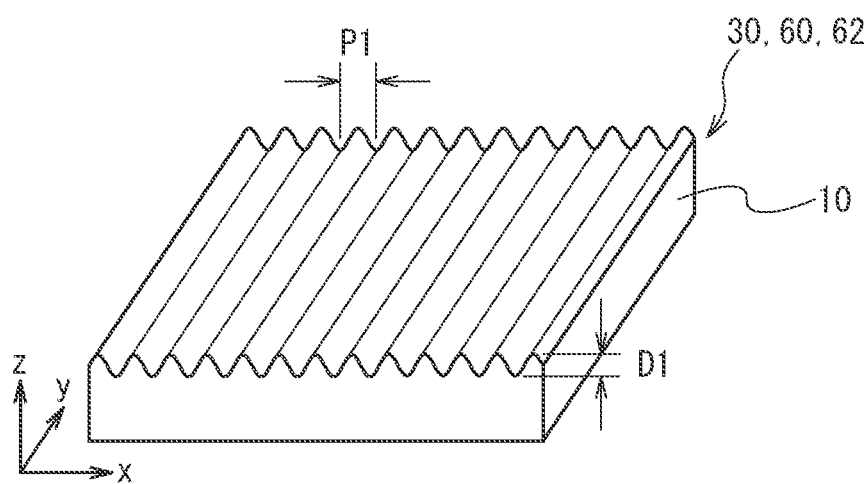
FIG. 23 is a bird's eye view illustrating an instance of a subregion of the information display medium according to the second embodiment.
Figure 25:
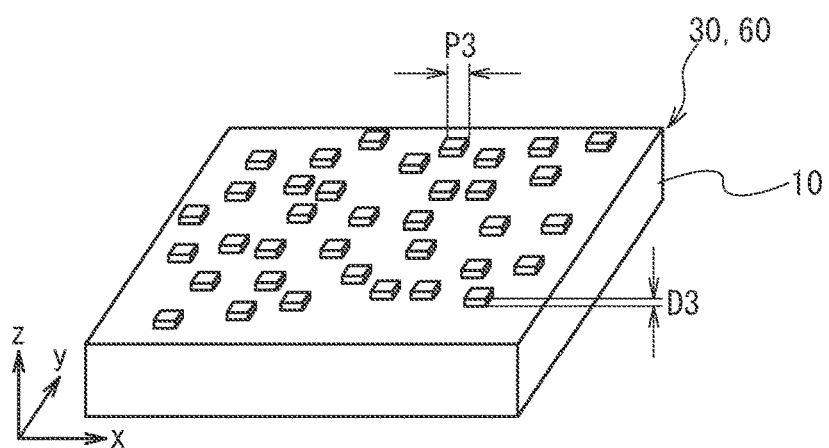
FIG. 25 is a bird's eye view illustrating an instance of a subregion of the information display medium according to the second embodiment.

As an instance of the uneven structure formed in the first the region 30, 60 and the subregion 62, there is a relief structure as illustrated in FIG. 23 or a random dot structure as illustrated in FIG. 25.

The relief structure illustrated in FIG. 23 is a one-dimensional relief structure, and its grating vector is parallel with the X-direction. However, the grating vector may be parallel with the Y-direction or may be formed in parallel with a direction having a specific angle from the X-, Y-direction.

Further, the relief structure may be a two-dimensional relief structure. Further, a sectional shape of the relief structure in FIG. 23 is a wave type, but the sectional shape may be a saw tooth wave, a square wave, a step type, and the like. Alternatively, the sectional shape should be a shape along a specific periodic function.

Here, an aspect ratio at the time when the uneven structure is a periodic structure is found based on a structure period P1 and a structure depth (or height) D1. More specifically, the aspect ratio is calculated by aspect ratio=structure depth (or height) D1/structure period P1. On that account, it is necessary to set the period, the depth, and the height of the relief structure for each subregion 62 to achieve the effect of the present embodiment as described above.

Figure 24:
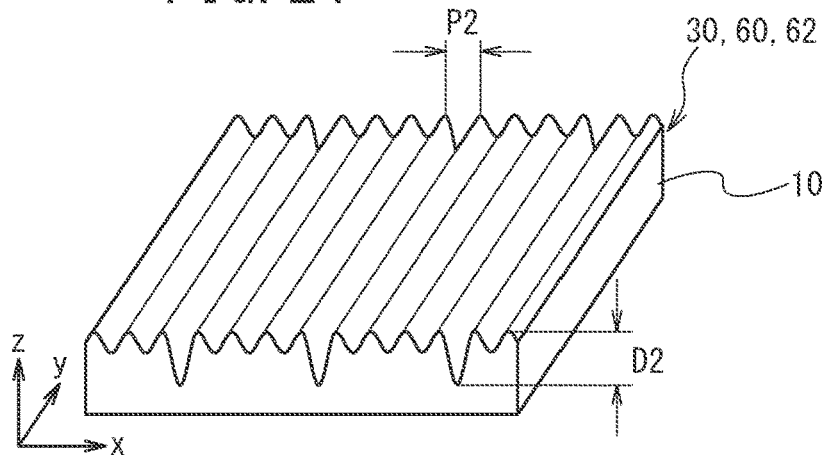
FIG. 24 is a bird's eye view illustrating an instance of a subregion of the information display medium according to the second embodiment.

A structure illustrated in FIG. 24 is considered, for instance, as the relief structure having a specific periodic function. More specifically, the structure is a periodic structure in combination with a shallow structure and a deep structure. The aspect ratio in this case is calculated from a width P2 of a structure forming a deepest structure and its structure depth (or height) D2.

In a case where the shallow structures and the deep structures are provided periodically in the subregion 62 like FIG. 24, the light reflection layer 20 is removed in a part where the deep structure is formed, based on the above discussion. Hereby, the removal amount of the light reflection layer 20 can be changed in the subregion 62, so that the light reflection layer 20 can have gradation in the information display medium 100, 200 in accordance with the aspect ratio of the shape of the uneven structure, thereby making it possible to express a halftone at the time of reflection observation or transmission observation.

In addition, it is possible to more minutely set a region where the light reflection layer 20 is removed. Accordingly, a transmission grating can be formed based on presence or absence of the light reflection layer 20, and when the information display medium 100, 200 is observed by transmission, information formed by diffraction light can be observed.

As illustrated in FIGS. 23, 24, when the relief structure is employed as the uneven structure, reflection, diffraction, and absorption of light can be controlled. Thus, information can be presented in the first region 30, 60 by use of reflection, diffraction, and absorption of light.

In the random dot structure illustrated in FIG. 25, each dot has a shape having an equal length in the X-direction and in the Y-direction, but each dot may have a shape that is long in the X-direction or is long in the Y-direction. At this time, each dot has an equal or random length.

Further, a sectional shape of each dot of the random dot structure in FIG. 25 is a square shape, but may be a semicircular shape, a semielliptical shape, a triangular shape, or a curved shape.

An aspect ratio of the random dot structure depends on a structure width P3 and a structure depth (or height) D3. More specifically, the aspect ratio is calculated by aspect ratio=structure depth (or height) D3/structure width P3. On that account, it is necessary to set the width P3 and the depth or height D3 of the random dot structure for each subregion 62 to achieve the effect of this disclosure as described above.

In a case where the random dot structure has a shape that is long in the X-direction or in the Y-direction, its aspect ratio is calculated by the width of the random dot structure in its short-axis direction and the structure depth or height.

In a case where the random dot structure has the same length in the X-direction and in the Y-direction, light can be scattered nondirectionally. Further, in a case where the random dot structure is long in the X-direction or in the Y-direction, light can be scattered in a direction perpendicular to the direction where the random dot structure is long, so that light can have directivity. In addition, in a case where a sectional shape of the random dot structure is a square shape and the random dot structure has a flat boundary surface the normal direction of which is along a Z-direction, interference of light easily occurs, so that the random dot structure is colored. Thus, information can be presented in the first region 30, 60 by scattering or interference of light.

[Information Display Medium Combined with Wet Etching]

The present embodiment is the same method as a so-called dry etching method to remove the light reflection layer 20 by the laser beam 50. Different from conventional wet etching, the information display medium 100, 200 can be manufactured fully by a dry process, thereby making it possible to reduce a manufacturing cost. However, the present embodiment can be also performed in combination with a wet process.

The first information is formed by removing the light reflection layer 20 by the wet process. The first information is a specific picture, mark, number, character, geometric pattern, colored patter, or the like.

Further, the first information can be formed by removing the light reflection layer 20 by the dry process by the abovementioned laser beam 50 to form on-demand identification information. The identification information is made of a unique code, a personal profile, a serial number, a specific mark, or the like.

Figure 26:
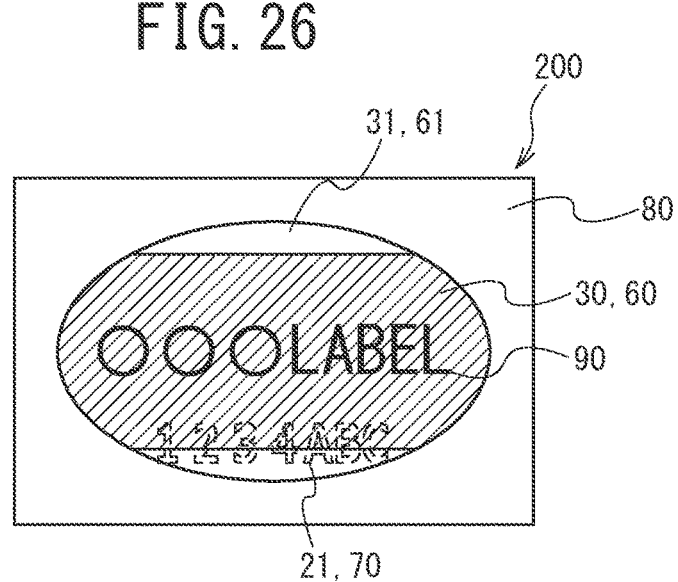
FIG. 26 is a front view illustrating an instance of the information display medium according to the second embodiment.

An information display medium 200 illustrated in FIG. 26 includes a region 80 formed by the wet process, and also includes a first region 30, 60 and a second region 31, 61. In addition, character information "OOO LABEL" is formed by a print layer 90. Further, by the manufacturing method of the present embodiment, a second information display region 21, 70 is formed, so that character information "1234ABC" is formed as identification information.

In FIG. 26, the identification information in the second the information display region 21, 70 is configured by information made of numbers and characters, but the identification information may be formed by a picture, a mark, a geometric pattern, or a colored pattern. Further, the second information display region 21, 70 may be formed to extend over the region 80.

As describe above of the information display medium 100, 200 of the present embodiment and the manufacturing method of the information display medium, by scanning the first the region 30, 60, the subregion 62 where the first region 30, 60 is formed and the second region 31, 61 are irradiated with the laser beam 50, identification information consist of the second information display region 21, 70 where the light reflection layer 20 removed is formed. Hereby, information can be provided by overlapping two pieces of information, i.e., the first information presented by the first region 30, 60 and the identification information presented by the second information display region 21, 70. Further, the identification information presented by the second information display region 21, 70 can be formed on demand.

As mentioned earlier, whether or not the second information display region 21, 70 is formed in the first region 30, 60 having the uneven structure or the second region 31, 61 having the flat structure can be selected by the beam waist position of the laser beam 50. Further, whether the second information display region 21, 70 is formed or not can be controlled by changing a removal amount of a light reflecting film by changing the aspect ratio of the uneven structure formed in the subregion 62.

[Verification Method of Information Display Medium]

A verification method of an information display medium is verifying by presenting hidden information such that a part, of the information display medium, that is estimated to have identification information is irradiated with a pulse laser. The information thus presented by irradiation may be captured with an imaging device, and the identification information may be verified based on the captured image. A genuineness determination can be performed, for instance, by verifying the identification information that appears by irradiation.

Figure 27A:
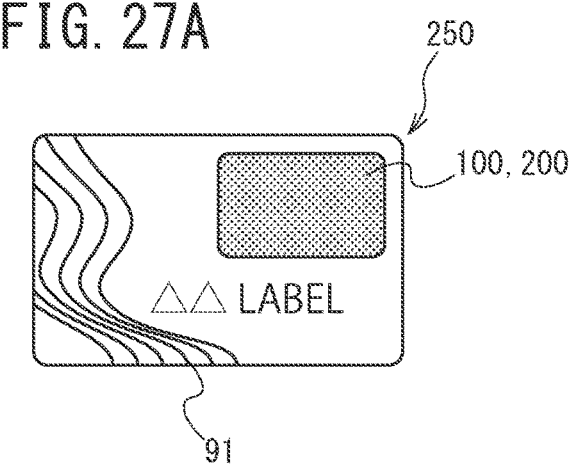
FIGS. 27A to 27C are conception diagrams to describe a verification method of the information display medium according to the second embodiment.
Figure 27B:
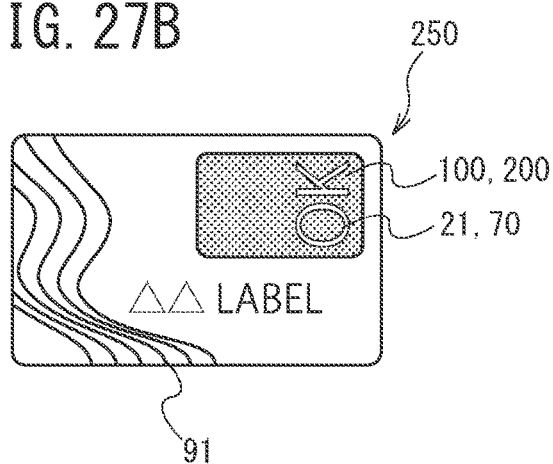
Figure 27C:
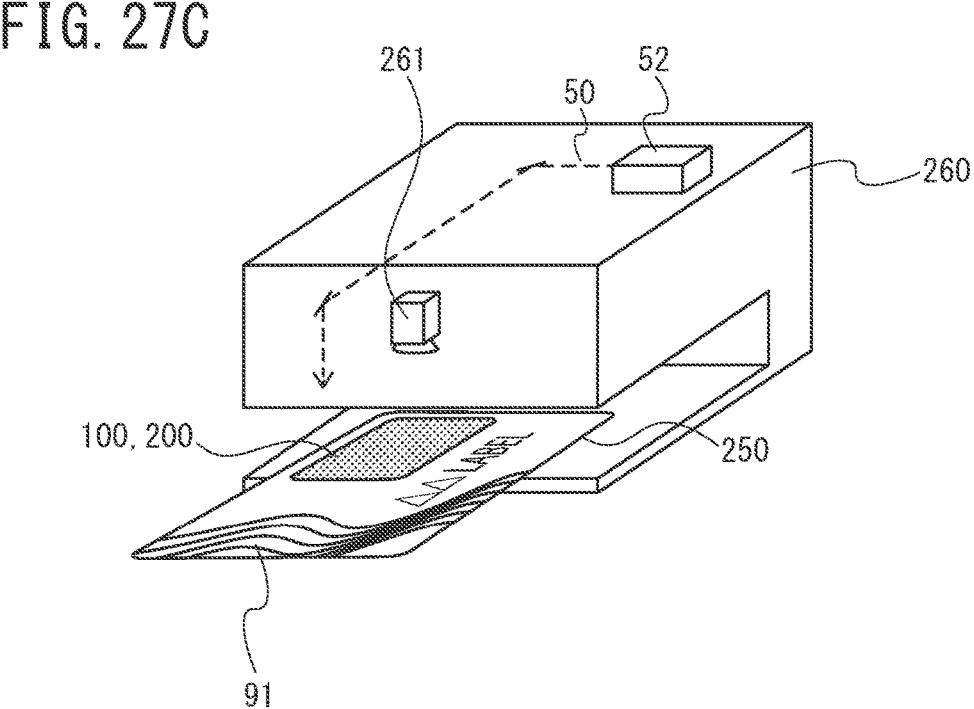

FIGS. 27A to 27C illustrate a verification method of the information display medium 100, 200. As illustrated in FIG. 27A, an information display medium 100, 200 is attached to a medium 250, and a geometric pattern and character information are formed by print information 91. The medium 250 illustrated in FIG. 27B illustrates a state where the medium 250 is irradiated with a pulsed laser of a verifier 260, so that a second information display region 21, 70 is formed and character information "OK" is presented, that is, appears.

In addition, FIG. 27C schematically illustrates an instance of a state where the medium. 250 is inserted into the verifier 260 for verification.

At the time of verifying the medium 250, it is preferable that the information display medium 100, 200 be configured that a plurality of subregions 62 is formed in a first region 30, 60, and an uneven structure having a low aspect ratio and an uneven structure having a high aspect ratio are formed. In addition, it is desirable that reflection, diffraction, deflection, interference, or scattering of light occur due to the uneven structure constituting the plurality of subregions 62 so that information is presented.

Further, in the information display medium 100, 200, a part of the light reflection layer 20 may be removed in advance, but at this time, it is desirable to exclude a region where the light reflection layer 20 is to be removed by the verifier 260.

In this case, the information display medium 100, 200 includes a subregion 62d having the uneven structure with a high aspect ratio, and when the light reflection layer 20 in the subregion 62d having the uneven structure with a high aspect ratio is removed by a laser beam 50 incorporated in the verifier 260, the second information display region 21, 70 is formed, so that information along a formation position of the subregion 62d is presented.

As such, when the medium 250 is inserted into the verifier 260 and the light reflection layer 20 in the specific subregion 62d is removed, hidden identification information indicating whether the medium 250 is a genuine article or not can be displayed and checked. When the medium 250 on which the hidden identification information is presented is observed, it is also possible to verify that the medium 250 is a genuine article, and that the medium 250 is a genuine article may be verified by acquiring and analyzing hidden information by an imaging device 261 incorporated in the verifier 260 in advance.

Note that it is desirable that the hidden identification information indicating whether the medium 250 is a genuine article or not be not presented until the medium 250 is inserted into the verifier 260, and it is desirable that the identification information be formed in a picture or a size that makes it difficult to visually observe the identification information before the insertion into the verifier 260, because the identification information is hidden by the first information presented on the information display medium 100, 200.

As such, a genuineness determination method of determining whether the medium 250 is a genuine article or not by use of the verifier 260 can be incorporated in the medium 250 having the information display medium 100, 200 of this disclosure.

As described above, in the present embodiment, in the information display medium in which the uneven structure is formed, after the light reflection layer 20 is formed, the material forming the light reflection layer 20 is removed by a laser on demand, so that the identification information can be formed to overlap with the first information.

Further, at the time when the identification information is formed by material removal by laser irradiation, even if the laser irradiation is moved over the first region and the second region, the identification information can be formed on demand in the first region or both in the first region and the second region by controlling the beam waist position of the laser.

In addition, the first region may be configured by two or more subregions adjacent to each other, and an amount of the material constituting the light reflection layer 20 per unit area in at least one of the subregions may be smaller than an amount of the material constituting the light reflection layer 20 per unit area in the other subregions.

In this case, the amount of the material constituting the light reflection layer 20 can be changed per subregion, and therefore, positioning of an optical expression by the uneven structure with an optical expression by light reflection obtained by changing the amount of the material can be performed, and a more complex optical expression is formable on demand.

Further, the first region may include a first subregion in which the uneven structure with an aspect ratio of not less than 0.1 but less than 1 is formed, and a second subregion in which the uneven structure with an aspect ratio of not less than 1 but not more than 2 is formed, and inside the structure forming layer, irradiation with a pulse laser may be performed in a condensed manner so that its beam waist is placed in a region from a side where the light reflection layer 20 is not provided to the average thickness of the structure forming layer. Hereby, an amount of the material constituting the light reflection layer 20 per unit area in the second subregion may be reduced by 50% or more.

In this case, since the amount of the material constituting the light reflection layer 20 can be varied in accordance with the aspect ratio of the uneven structure forming the subregion, the position of an optical expression by the uneven structure and an optical expression by light reflection obtained by varying the amount of the material can be adjusted, and at same time a more complex on-demand optical expression can be formed.

Further, at this time, the irradiation position of the laser to form the identification information may pass through a plurality of subregions constituting the first region, so that the amount of the material constituting the light reflection layer 20 per unit area at a passing position in the subregions may be reduced by 50% or more. Alternatively, the irradiation position of the pulsed laser may pass through the first region and the second region, so that the amount of the material constituting the light reflection layer 20 per unit area at a passing position in the first region and the second region may be reduced by 50% or more.

Since an optical reflectance decreases or a transmittance increases in an area where the light reflection layer 20 is removed by 50% or more, new information (identification information) can be displayed by the area where the light reflection layer 20 is removed, at the time when the information display medium is observed by reflection/transmission. Further, by changing the removal amount of the light reflection layer 20, information with a gradation expression can be recorded. Such new information display can be further processed on demand.

Here, when the identification information is formed in minute display such as a microscopic character and is formed to overlap with the first display, the identification information is hardly visually observable in a normal state.

Further, in the genuineness determination method of the medium to which information display medium having identification information is attached according to the present embodiment, the medium is inserted into a verification device in which a pulsed laser is incorporated, for instance, and an information display medium part having the identification information is subjected to irradiation with the pulsed laser, so that hidden information can be presented.

Alternatively, the identification information thus hidden may be read by an imaging device incorporated in the verification device and verified.

Hereby, information hidden in the information display medium having the identification information can be presented, and it is possible to check whether or not the medium is a genuine article.

As described above, the information display medium of this disclosure can display a plurality of pieces of information in partially different regions by reflection observation. Accordingly, the information display medium can be used as an optical effect for forgery prevention and can be used as a forgery prevention medium to protect value and information included, by embedding or laminating, in an article, e.g., a valuable security such as a bank note or a gift voucher, a certificate, a brand-name product, an expensive product, an electronic device, a personal identification medium, and the like.

Further, the information display medium can be used for purposes other than forgery prevention, and, for instance, can be used as a toy, an educational material, a decorative trim of a product, a poster, or the like.

Further, since information can be added on demand, the information display medium can be applied to on-demand information assignment to a manufactured article or management of traceability information. Further, when given information is a QR Code (registered trademark) or the like, the information display medium can be used in a machine authentication system using a reading device having an imaging function such as a camera, a mobile phone, or a smartphone.

Further, a region where the light reflection layer 20 is removed can be determined by the aspect ratio of the uneven structure. Accordingly, when the medium including this disclosure is inserted into a specific device and is subjected to irradiation with a laser inside the device, the light reflection layer 20 in a structure part with a high aspect ratio is removed, and whether a specific shape or information is presented or not is checked by an imaging device inside the device or by visual inspection, thereby checking whether or not the medium is a genuine article or not. Thus, the information display medium is usable in a machine authentication system or a genuineness determination system.

Further, in this disclosure, hidden information can be observed by transmission observation, so that this disclosure can be used for purposes other than forgery prevention. For instance, this disclosure is usable as a toy, an educational material, a decorative trim of a product, a poster, or the like.

Third Embodiment

Next would be described a third embodiment.

Note that, in the drawings, the same reference sign is assigned to a constituent demonstrating the same or similar function, and a redundant description is omitted.

An information display medium of the present embodiment includes an organic substrate and a drawing portion formed in the organic substrate. The drawing portion has either or both of a first drawing portion (rough drawing) and a second drawing portion (minute drawing). The organic substrate is a substrate made of an organic material.

The organic material is organic resin, paper, or the like. As the organic material, acryl, polyethylene terephthalate, polycarbonate, polyethylenenaphthalate, or parylene can be instantiated.

The first drawing portion is formed in combination with a removed portion formed by partially removing a surface of the organic substrate and a carbonized recessed portion formed by carbonizing the surface of the organic substrate and having a luminous transmittance lower than that at a position of the removed portion. The second drawing portion is formed in combination with a cavity portion formed inside the organic substrate and a carbonized portion formed inside the organic substrate and having a luminous transmittance lower than that of the cavity portion. The second drawing portion is a drawing more minute than the first drawing portion.

The removed portion can be formed by a step of forming the removed portion by pulse laser irradiation with a small pulse number that its focal point is set on the vicinity of the surface of the organic substrate, for instance. The carbonized recessed portion can be formed by a step of forming the carbonized recessed portion by pulse laser irradiation with a large pulse number that its focal point is set on the vicinity of the surface of the organic substrate, for instance. The cavity portion can be formed by a step of forming the cavity portion by pulse laser irradiation with a small pulse number that its focal point is set inside the organic substrate. The carbonized portion can be formed by a step of forming the carbonized portion by pulse laser irradiation with a large pulse number that its focal point is set inside the organic substrate.

Then, the aforementioned information display medium of the present embodiment may be embedded or laminated on a substrate for a valuable security, for instance, thereby forming a valuable security.

Further, an adhesive layer and releasing paper may be provided on a back side of the information display medium as a label.

FIGS. 28 to 36 are partial sectional views illustrating instances of the information display medium according to the third embodiment. Note that FIGS. 28 to 32 and FIG. 36 each illustrate a partial sectional view of the information display medium 100 in a case where a modified region 331, 332, 333 is provided in a region except an information display region, and FIGS. 33 to 35 each illustrate a partial sectional view of the information display medium 100 in a case where the modified region 331 is provided in a region including the information display region.

An application region 330 is a part where the drawing portion is formed, and the modified region is a part where the removed portion, the carbonized recessed portion, the cavity portion, or the carbonized portion is formed.

Figure 28:
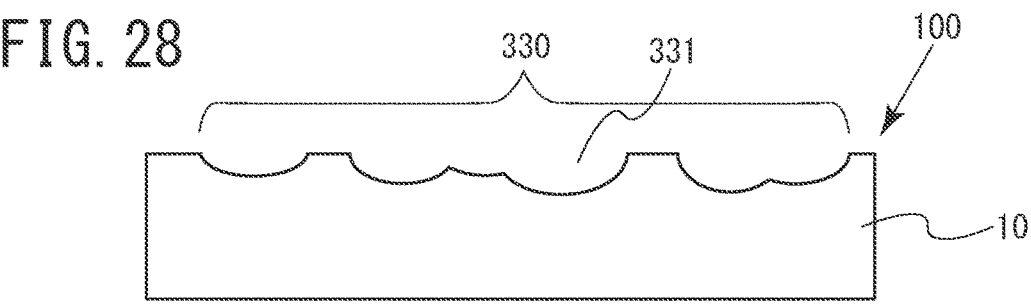
FIG. 28 is a partial sectional view illustrating a part of a sectional structure of an information display medium according to a third embodiment.

The information display medium 100 in FIG. 28 includes the application region 330 where energy is locally applied to a substrate 10 made of a fiber material as an organic material, and the application region 330 includes the modified region 331.

FIG. 28 illustrates a case where the modified region 331 is formed by carving the substrate 10, but the modified region 331 may be formed by carbonizing, swelling, whitening, solidifying, or softening a surface of the substrate 10. In a case where the modified region 331 is formed by carbonization, swelling, whitening, solidification, or softening, the luminous transmittance becomes lower than a case where it is formed by carving.

Since the substrate 10 is made of a fiber material, the substrate 10 has an effect to scatter light. Note that, when the fiber material is arranged minutely, an effect to transmit light can be given to the substrate 10. Further, the luminous transmittance of the substrate 10 can be changed in accordance with the arrangement density of the fiber material.

Further, the substrate 10 may have a single-layered structure or may have a multi-layered structure. Furthermore, a material having responsiveness by local energy application may be added to the substrate 10. For instance, the material having responsiveness may be a thermochromic material with thermal responsiveness, a photochromic material, a luminescence material, or a phosphorescence material with photoresponsiveness, a material with pressure responsiveness, a solvatochromic material with solvent responsiveness, a material the molecule of which is carbonized by energy application, and the like. In addition, the substrate 10 may be colored by addition of pigment, dye, or the like.

In the substrate 10, roughness and fineness of the fiber material may have been formed already or the substrate 10 may be partially removed so that a watermark of paper is formed like the conventional technology.

As a method to form the application region 330, there is a method using a pulsed laser, for example. Further, a method by a thermal head, a method by an electron beam, a method by an ion beam, and the like are also usable.

FIG. 28 illustrates a case where the application region 330 on which local energy applied by the pulse laser is formed, and the modified region 331 is formed as a removed portion obtained when the substrate 10 is carved in a curved shape, for instance.

Figure 29:
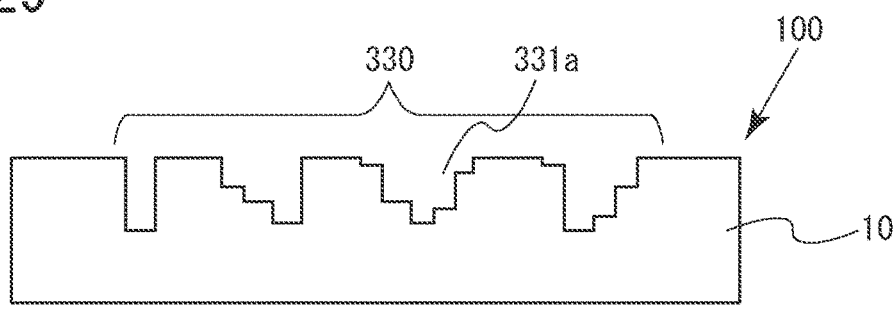
FIG. 29 is a partial sectional view illustrating a part of another instance of the sectional structure of the information display medium according to the third embodiment.

Further, FIG. 29 illustrates a case where a modified region 331a is formed as a removed portion obtained when the substrate 10 is carved in a linear shape.

The modified region 331 as the removed portion may be formed into a curve shape like FIG. 28, may be formed in a multistep manner like FIG. 29, or may be formed in a single-step manner. Further, the modified region 331 may be formed in a shape combined with a curve and a straight line.

Note that the substrate 10 may include a region where the modified region 331 is not formed.

Figure 30:
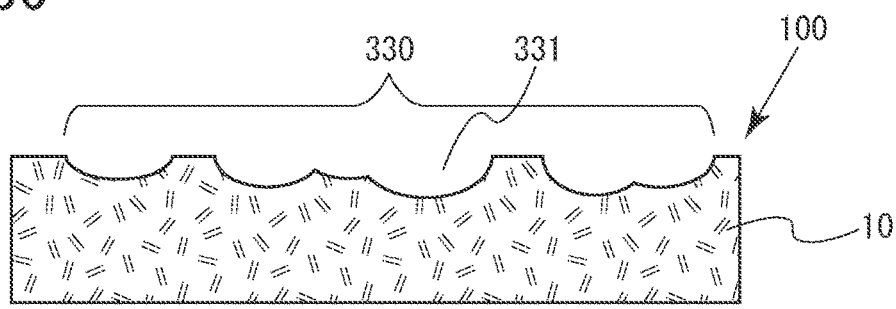
FIG. 30 is a partial sectional view illustrating a part of another instance of the sectional structure of the information display medium according to the third embodiment.

The information display medium 100 in FIG. 30 is configured that the substrate 10 made of the organic material includes the application region 330 including the modified region 331.

FIG. 30 illustrates an instance in which the removed portion is formed by carving the substrate 10 as the modified region 331. This improves the luminous transmittance of the substrate 10. Further, for instance, by changing the pulse number of the pulse laser that irradiate on the substrate 10, the substrate 10 can be carbonized, swollen, whitened, solidified, or softened to be formed into a carbonized recessed portion. Further, a change of a refractive index may occur in the modified region 331.

Figure 31:
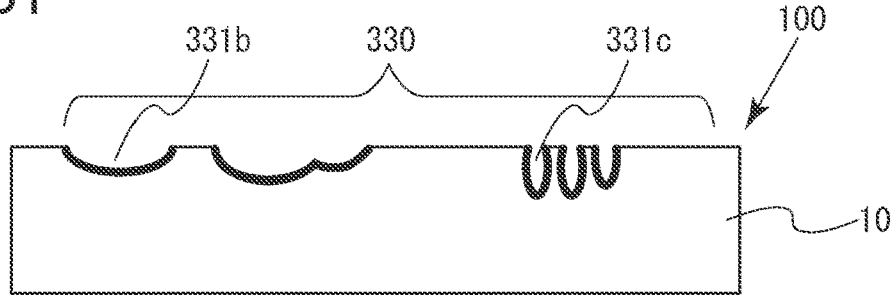
FIG. 31 is a partial sectional view illustrating a part of another instance of the sectional structure of the information display medium according to the third embodiment.

Further, in FIG. 31, the focal point is set on the vicinity of the surface of the substrate, and the pulse number of the pulsed laser is increased, so that the carbonized recessed portion that is carbonized is formed as a modified region 331b on the surface.

In this case, the luminous transmittance of the substrate decreases as compared with a case where the surface is carved.

Due to the contrast between the removed portion and the carbonized recessed portion, the first drawing portion having a gradation drawing can be provided.

The substrate 10 is made of an organic material, and in a case that the organic material has optical transparency, the substrate 10 becomes a substrate having optical transparency.

In the substrate 10, a watermark pattern may be formed in advance by roughness and fineness of an organic material density, roughness and fineness of a whitened region density, roughness and fineness of a carbonized region density, or the like. Further, a part of the substrate 10 may be removed.

FIG. 31 illustrates a case where the modified region 331 is formed in the application region 330 when the substrate 10 is carved in a curved shape. Note that, similarly to FIG. 29, the modified region 331 in the substrate 10 may be linearly formed to have a multistage sectional shape or may be formed in a single step manner. Further, the modified region 331 may be formed in a shape combined with a curve and a straight line.

Figure 32:
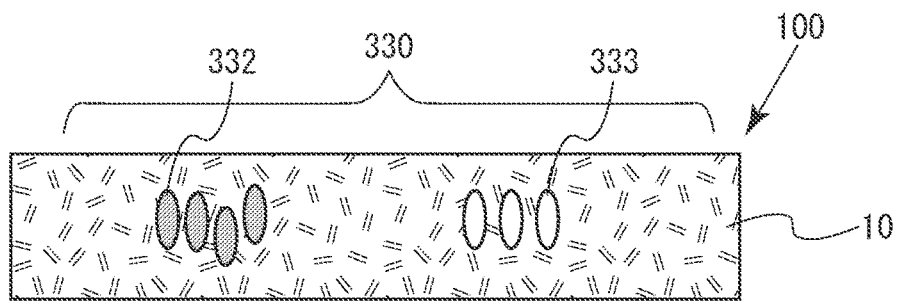
FIG. 32 is a partial sectional view illustrating a part of another instance of the sectional structure of the information display medium according to the third embodiment.

FIG. 32 illustrates an instance in which the modified regions 332, 333 are formed inside the substrate 10. Among them, the modified region 332 is a carbonized portion, and the modified region 333 is a cavity portion. Note that FIG. 32 illustrates a case where different modifications are performed on the modified regions 332, 333, but a similar modification may be performed.

Respective positions where the modified regions 332, 333 are formed may be formed at the same position in a thickness direction of the substrate 10 or may be formed at different positions.

A region where the modified region 332 is formed and a region where the modified region 333 is formed can be formed to have different luminous transmittances, for example. Further, the regions where the modified region 332 and the modified region 333 are formed may be formed to have a difference not in luminous transmittance, but in refractive index, scattering rate, reflectance, opacity rate, carbonization rate, and the like.

Further, metallic fine particles may be formed as the modified region 333 that metal ions are contained in the substrate 10, and local energy is applied inside the substrate 10. Furthermore, particles other than metal may be formed.

Note that the substrate 10 may include a region where the modified regions 332, 333 are not formed.

Due to the contrast between the carbonized portion and the cavity, the second drawing portion having a gradation drawing can be provided.

Figure 33:
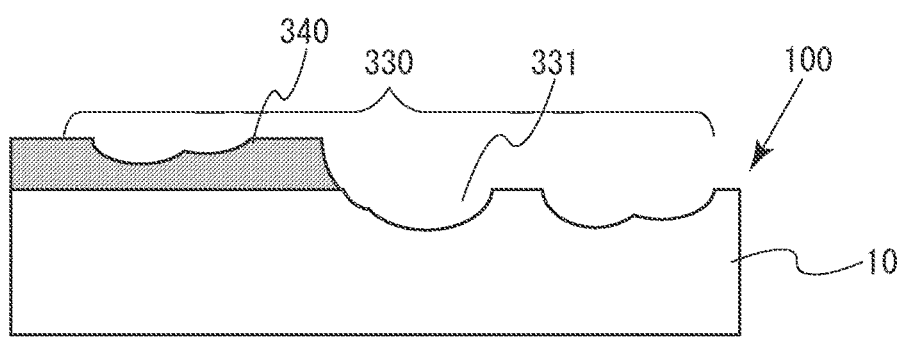
FIG. 33 is a partial sectional view illustrating a part of another instance of the sectional structure of the information display medium according to the third embodiment.

FIG. 33 illustrates a case where an information display region 340 is formed in the substrate 10. This example further illustrates a case where the modified region 331 is also formed in the information display region 340. In practice, the modified region 331 may not be formed in the information display region 340, or the modified region 331 may be formed in apart of the information display region 340.

This instance illustrates a case where the modified region 331 formed in the information display region 340 is formed by carving the information display region 340, but the modified region 331 may be formed by carbonizing, swelling, whitening, solidifying, or softening the information display region 340. Further, a change of a refractive index may occur in the modified region 331.

Figure 34:
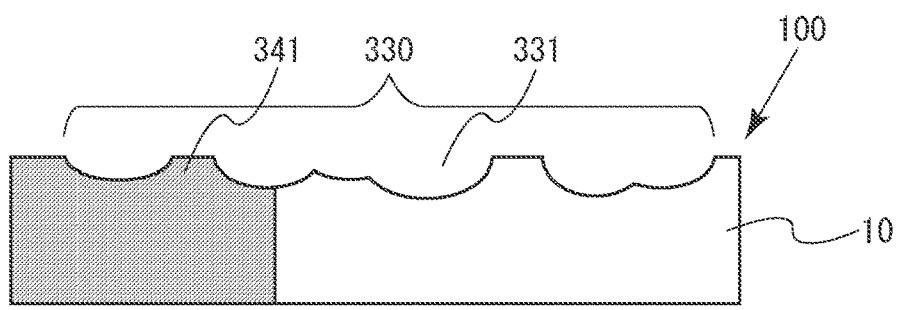
FIG. 34 is a partial sectional view illustrating a part of another instance of the sectional structure of the information display medium according to the third embodiment.

FIG. 34 illustrates a case where an information display region 341 is formed inside the substrate 10. Note that the information display region 341 is formed by embedding, impregnation, or the like of coloring matter or ink into the substrate 10. Further, an information medium may be formed by pigment, foil, or the like that has been already embedded at the time of formation of the substrate 10. Further, FIG. 34 illustrates a case where the modified region 331 is formed in the information display region 341. In practice, the modified region 331 may not be formed in the information display region 341, or the modified region 331 may be formed in a part of the information display region 341.

This example illustrates a case where the modified region 331 formed in the information display region 341 is formed by caving the information display region 341, but the modified region 331 may be formed by carbonizing, swelling, whitening, solidifying, or softening the information display region 341. Further, a change of a refractive index may occur in the modified region 331.

Figure 35:
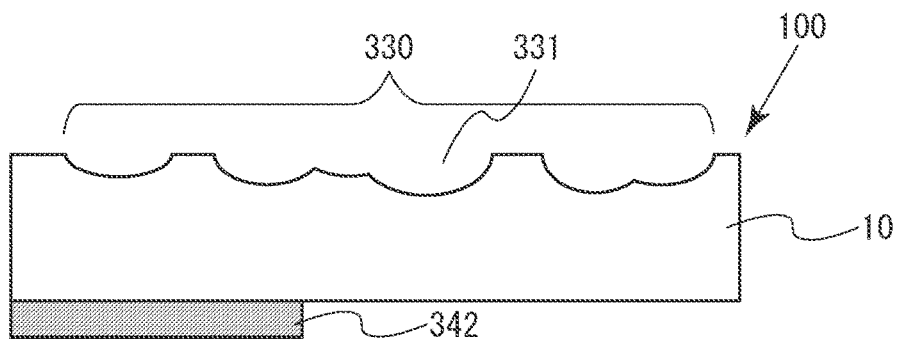
FIG. 35 is a partial sectional view illustrating a part of another instance of the sectional structure of the information display medium according to the third embodiment.

FIG. 35 illustrates a case where an information display region 342 is formed on a surface of the substrate 10 on a side where the application region 330 and the modified region 331 are not formed. In a case that the substrate 10 has optical transparency, when the modified region 331 is formed on a boundary surface on a side opposite to a boundary surface where the information display region 342 is formed, information to be provided by the information display region 342 can be observed through the modified region 331.

Note that respective regions where the information display region 342 and the modified region 331 are formed may overlap with each other or may be different from each other.

When the respective regions where the information display region 342 and the modified region 331 are formed partially or fully overlap with each other, the information to be provided by the information display region 342 is scattered by the modified region 331, for example, so that a part of the information is hard to be observed. Further, the information to be provided by the information display region 342 can be presented in an enlarged or reduced manner by distribution of the refractive index of the modified region 331.

Figure 36:
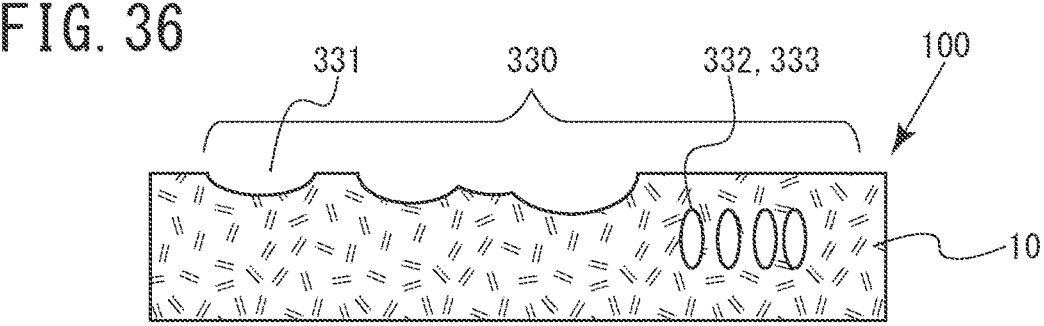
FIG. 36 is a partial sectional view illustrating a part of another instance of the sectional structure of the information display medium according to the third embodiment.

FIG. 36 illustrates a sectional view in a case where, in the substrate 10 made of an organic material, the modified region 331 is formed on a boundary surface of the substrate, and further, the modified regions 332, 333 are formed inside the substrate.

In FIG. 36, the modified region (the removed portion) 331 and the modified regions 332, 333 are formed at different positions, but they may be formed at the same position.

Hereby, different drawings can be formed in the modified region 331 (the removed portion) formed on the boundary surface (the surface) of the substrate 10 and in the modified region 332 (the cavity portion) formed inside the substrate. The drawing formed by the removed portion has a wide line width of the drawing as compared with that of the cavity portion. On that account, the removed portion becomes a rougher drawing than the cavity portion, so that the drawing is a slightly blur image. On the other hand, the cavity portion becomes a more minute drawing than the removed portion, so that the drawing is a sharp image. By use of the removed portion and the cavity portion as such, the drawings can be formed with various tones. Further, similarly, in a case of the carbonized recessed portion and the carbonized portion, line widths of their drawings are changeable. The drawing formed by the carbonized recessed portion has a wide line width of the drawing as compared with that of the carbonized portion. On that account, the carbonized recessed portion becomes a rougher drawing than the carbonized portion, so that the drawing is a slightly blur image. On the other hand, the carbonized portion becomes a more minute drawing than the carbonized recessed portion, so that the drawing is a sharp image. By use of the carbonized recessed portion and the carbonized portion as such, the drawings can be formed with various tones.

Different pieces of information can be provided in each modified region 331. Note that different modifications may be performed on the modified region 331 and the modified regions 332, 333, or the same modification may be performed.

Figure 37:
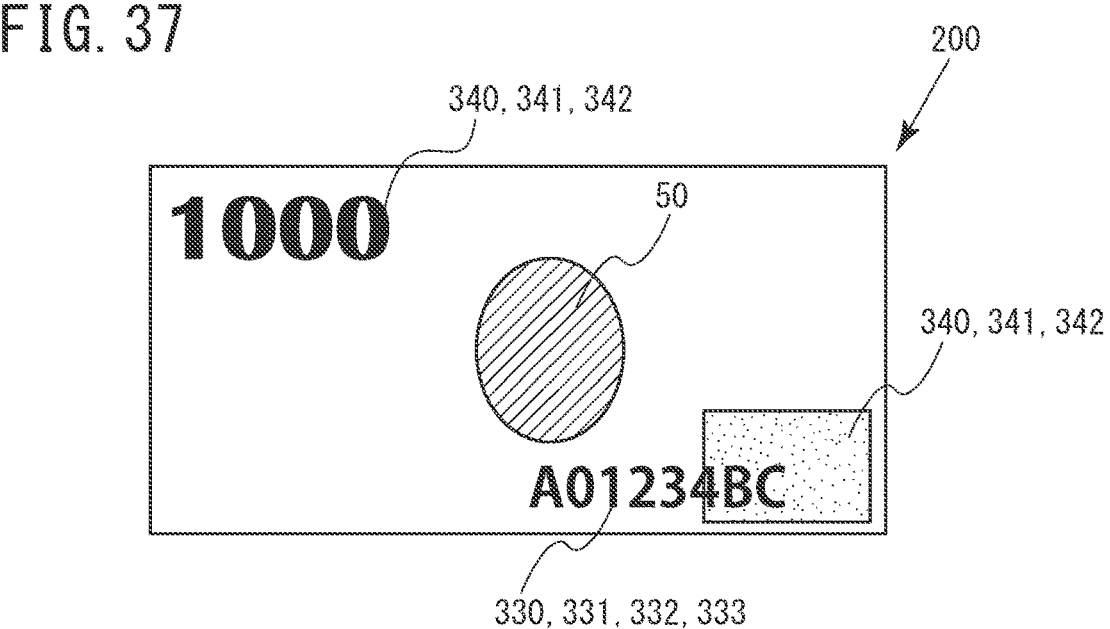
FIG. 37 is a front view illustrating an instance of the information display medium according to the third embodiment.

FIG. 37 illustrates a case where, in an information display medium 200, an application region 330, a modified region 331, 332, 333, an information display region 340, 341, 342, and further a watermark region 350 are formed in a substrate.

In a part of FIG. 37, the application region 330, the modified region 331, 332, 333, and the information display region 340, 341, 342 overlap with each other, but they may be formed independently.

Further, information presented by the information display region 340, 341, 342 may be formed to be aligned with the application region 330 and the modified region 331, 332, 333, but may not be formed without the alignment.

The application region 330 and the modified region 331, 32, 33 may be further formed to overlap with the watermark region 350.

Hereby, information to be displayed by the information display medium 200 can form a plurality of pieces of information in combination with the watermark region 350, the application region 330, the modified region 331, 332, 333, and the information display region 340, 341, 342. Note that an effect to be obtained would be described later.

In FIG. 37, character information is presented by the application region 330, the modified region 331, 332, 333, and further the information display region 340, 341, 342. In practice, information to be presented is not limited to the character information and may be formed in a specific shape such as a mark, a geometric pattern, or a picture.

[Manufacturing Method of Information Display Medium]

The following describes a manufacturing method of the information display medium 100, 200.

The information display medium 100, 200 is manufactured such that, after the substrate 10 is formed, by locally energy applied to a boundary surface of the substrate 10 or inside the substrate 10 to partially modify the substrate 10 based on a desired drawing pattern.

Alternatively, the information display medium 100, 200 is also manufactured such that, after the substrate 10 is formed, an information display region is provided, and energy is locally applied to the boundary surface of the substrate 10 or inside the substrate 10 to partially modify the substrate 10.

Further, the information display medium 100, 200 is also manufactured such that, after the substrate 10 is formed, an information display region is provided, energy is locally applied to the boundary surface of the substrate 10 or inside the substrate 10 to partially modify the substrate 10, and further, energy is locally applied to a boundary surface of the information display region to partially modify the information display region.

As a method for locally applying energy to the substrate 10 and the information display region 340, 341, 342, there is a method using a pulsed laser source, a thermal head, an electron beam, or an ion beam. Note that FIG. 38 illustrates a case that a pulse laser source 52 is used.

A laser beam emitted from the pulsed laser source 52 passes through a lens 51 and reflects from a reflecting mirror 53, and the laser beam is incident on the information display medium 100, 200 or on a manufacture line of the information display medium 100, 200 to its focal point be set on a specific position on the information display medium 100, 200. Then, energy caused by the laser beam is localized at the focal point, so that the modified region 331, 332 is formed.

Figure 38:
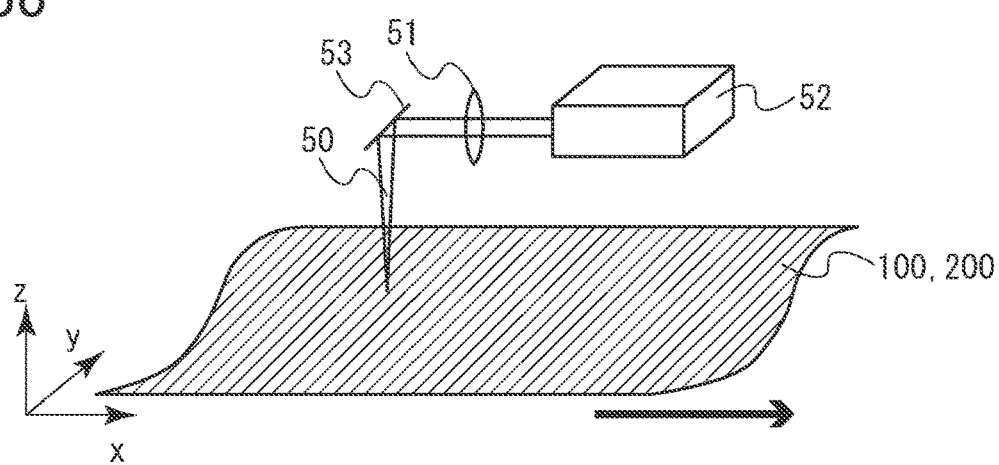
FIG. 38 is a conception diagram illustrating an example of a manufacturing method of the information display medium according to the third embodiment.

Note that, in FIG. 38, the laser beam passes through the reflecting mirror 53 after the laser beam has passed through the lens 51, but the passing order may be reversed.

In terms of machining with the laser beam, in a case that the information display medium 100, 200 is manufactured by a roll-to-roll method, a formation position of the modified region 331, 332 can be determined by controlling X, Y, Z of the focal position of the laser beam.

Further, in a case that the information display medium 100, 200 is manufactured from each sheet, the formation position of the modified region 331, 332 can be determined by moving a stage on which the information display medium 100, 200 is set or by controlling X, Y, Z of the focal position of the laser beam.

Alternatively, in a case where the reflecting mirror 53 is a micromirror array structure, the phase of the laser beam is controlled by controlling the micromirror array structure by a computer, so that the focal position of the laser beam can be controlled.

Furthermore, a reflection-type spatial light modulator is used as the reflecting mirror 53, and the phase of each cell of the spatial light modulator is controlled by a computer to control the phase of the laser beam, so that the focal position of the laser beam can be controlled. Note that the spatial light modulator may be transmissive.

Note that it is desirable for the pulsed laser source 52 to have a pulse width of not less than 100 femtoseconds but not more than 1 picosecond. Hereby, the laser beam passing through the lens 51 momentarily has a high energy at the focal point, so that the modified region 331, 332, 333 can be formed effectively. Further, since a time during which the laser beam has a high energy is very short, an influence concentrates on an irradiation position.

Further, it is desirable to use any of a fiber laser using optical fibers, a solid laser, or a semiconductor laser as the pulsed laser source 52. As the solid laser, a solid laser using a titanium sapphire crystal or a $YVO_4$ crystal can be instantiated. Further, it is desirable that a wave range of the pulsed laser source 52 be from a near infrared region to an infrared region.

By use of the pulsed laser source 52, it is possible to momentarily form a high energy state at the focal point of the laser beam, so that fine processing can be performed on the substrate 10 and the information display region 340, 341, 342.

Figure 39A:
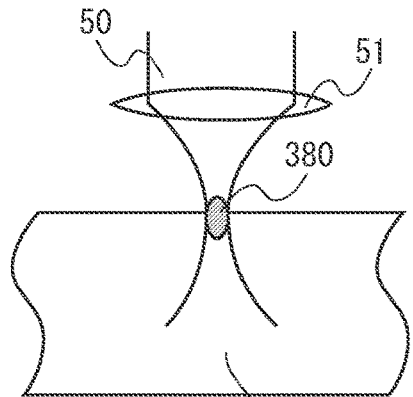
FIGS. 39A to 39C are sectional views illustrating an example of local energy application according to the third embodiment.
Figure 39B:
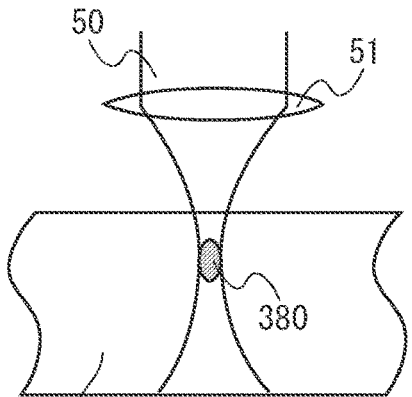
Figure 39C:
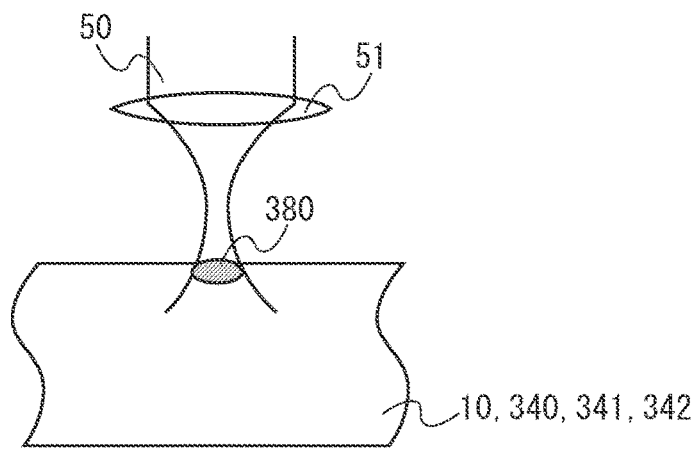

FIGS. 39A to 39C are schematic views in a case where the pulse laser source 52 locally applies energy to the substrate 10 or the information display region 340, 341, 342. As the local application, it is desirable that the energy be given in a spot manner like FIGS. 39A to 39C. Hereby, the modified region 331, 332, 333 can be formed more finely.

Note that FIG. 39A illustrates a case where the focal point of the pulsed laser beam 50 is set on the surface of the substrate 10, and FIG. 39B illustrates a case where the focal point of the pulse laser beam 50 is set inside the substrate 10. Further, FIG. 39C illustrates a case where the focal point is set on a part near the surface but slightly distanced from the boundary surface. Thus, by changing the focal position, the line width of the drawing can be changed, so that the drawing can be formed with various tones.

Further, in an energy localized portion 380 in FIGS. 39A, the carbonized portion, the carbonized recessed portion, the removed portion, or the cavity portion can be selectively formed by changing the pulse number of the pulsed laser. When the pulse number is high, the carbonized portion or the carbonized recessed portion is formed, and when the pulse number is low, the removed portion or the cavity portion is formed. The pulse number per unit second can be set to 10 to 50 kHz, and in a case where the removed portion or the cavity portion is formed, the pulse number per unit second is set to 10 to 1 kHz, and in a case where the carbonized portion or the carbonized recessed portion is formed, the pulse number per unit second is set to 1 k to 50 kHz.

Further, in a case where the pulse laser source 52 is used, the modified region 331, 332, 333 can be formed or patterned at a high speed, so that high-speed machining is performable. Further, different modified regions can be formed by changing the pulse number, so that the drawing with various tones or graduations can be obtained, thereby achieving a drawing with various expressions.

As described above, in a case that the pulse laser source 52 is used, fine processing and high-speed processing become possible, so that on-demand processing on the information display medium 100, 200 become possible.

[Observation Method and Effect of Information Display Medium]

According to the above description, an effect and an observation method described below can be obtained by use of this disclosure.

Figure 40:
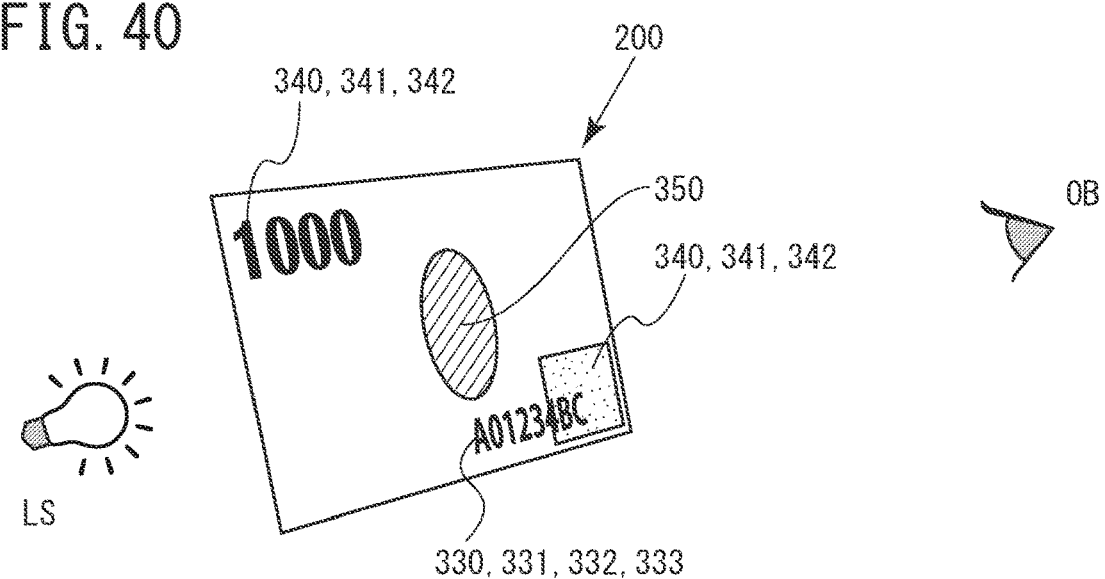
FIG. 40 is a perspective view illustrating an example of a genuineness determination method of the information display medium according to the third embodiment.

For example, in a case where a modification to reduce the thickness of the substrate is performed on the modified region 331, 332, 333, when the information display medium 200 is observed by transmission as illustrated in FIG. 40, character information can be observed as a watermark due to the modified region 331, 332, 333.

Figure 41:
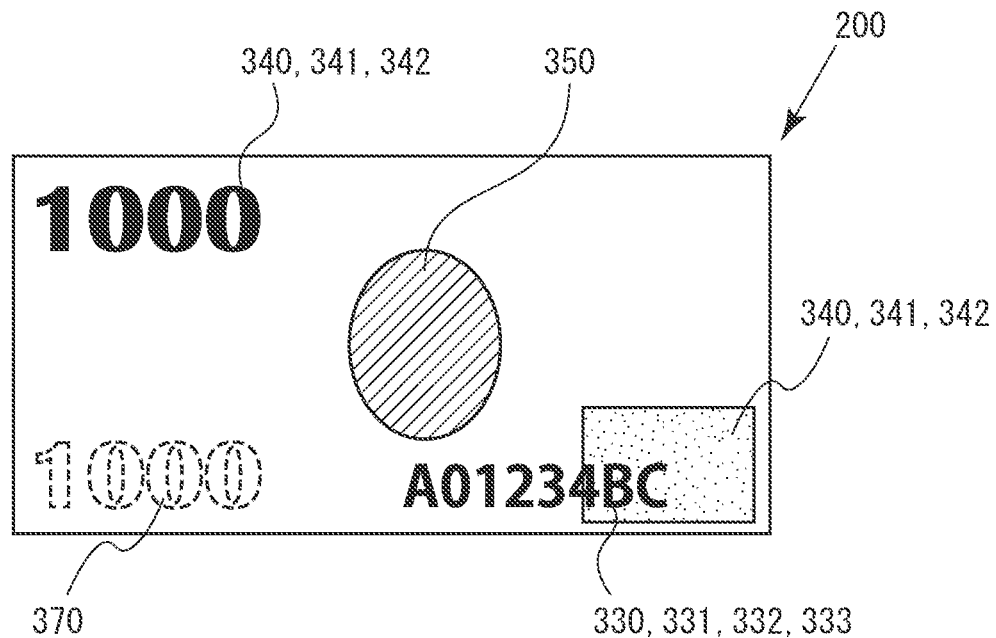
FIG. 41 is a front view illustrating another instance of the information display medium according to the third embodiment.
Figure 42:
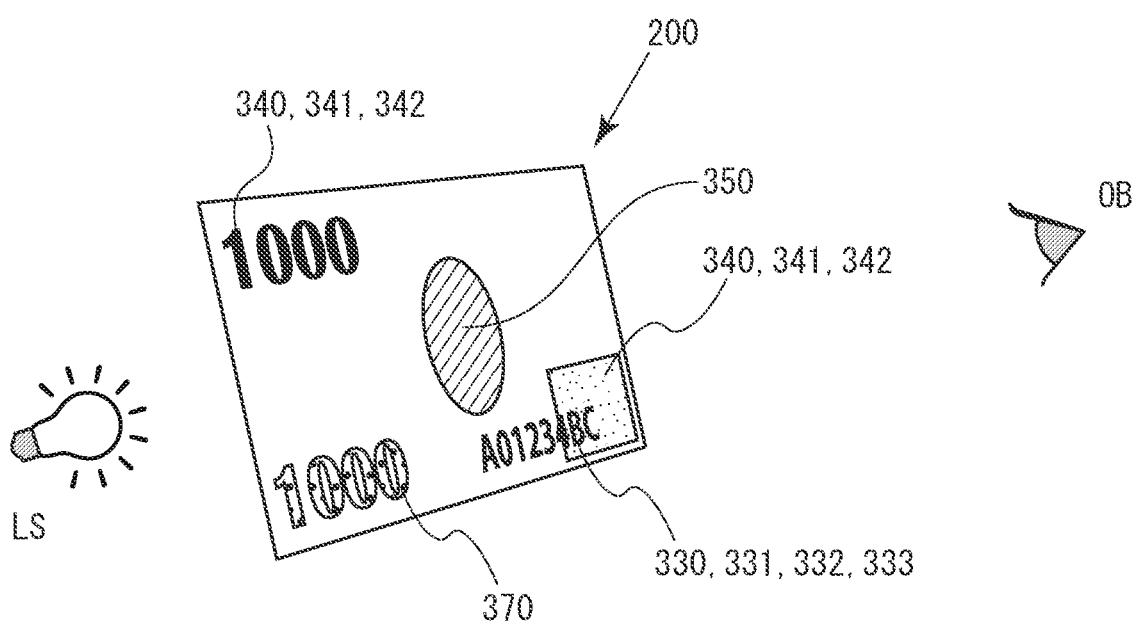
FIG. 42 is a perspective view illustrating another example of the genuineness determination method of the information display medium according to the third embodiment.

Further, as illustrated in FIGS. 41 and 42, when the substrate 10 is removed very thinly in the application region 370, its difference cannot be visually observed at the time of reflection observation, but the difference can be observed at the time of transmission observation. Thus, such a latent image can be formed on the information display medium.

Note that, as described above, in this disclosure, high-speed and fine processing is performable on demand, so that the application region 330, 370 and the modified region 331, 332, 333 can be formed depending on the information display medium. Further, since on-demand processing along a picture or information to be formed by the information display region 340, 341, 342 formed in the information display medium 100, 200 in advance is performable, more complex information can be given to the information display medium 100, 200.

As mentioned earlier, in the processing using the pulse laser source 52, information that can be observed by visual inspection can be processed on demand, but since fine processing is performable, information to become observable by enlarged observation can be embedded inside information visually observable.

Here, a conventional watermark is formed at the time of issuing a certificate stamp, and therefore, an on-demand watermark cannot be formed. Further, the formation of a watermark by laser beam machining conventionally requires mixing of pigment that absorbs a specific wave length into a certificate stamp and has a problem that a cost increases.

Further, a watermark has been conventionally used in a paper substrate, but since a paper currency or the like that uses a polymeric material made of organic molecules as a substrate has started to be in circulation in recent years, a formation method of a watermark in a substrate made of organic molecules is not established.

On the other hand, in order to solve this problem, this disclosure provides an information display medium and a valuable security in which a watermark can be formed on demand on a substrate such as a paper substrate made of organic molecules without the use of additional materials or the like, and an information display medium and a valuable security in which a watermark can be formed on demand on a substrate made of organic molecules.

That is, according to the aspect of this disclosure, it is possible to provide an information display medium and a valuable security in which a watermark can be formed on demand on an organic substrate without the use of additional materials or the like, and an information display medium and a valuable security in which a watermark can be formed on demand on a substrate made of organic molecules.

Further, the information display medium of this disclosure can display a plurality of pieces of information in regions partially different from each other at the time of reflection observation, so that the information display medium can be used as optical effect for forgery prevention and can be used as a forgery prevention medium to protect value or information included, by being embedded in or laminated on an article. As the article, a valuable security such as a bank note or a gift voucher, a certificate, a brand-name product, an expensive product, an electronic device, and a personal identification medium can be instantiated.

Further, an adhesive layer is formed on a substrate in which a print layer made of fluorescence ink or a hologram is formed, so that a label can be formed.

Further, since information can be added on demand, the information display medium can be applied to on-demand information assignment to a manufactured article or management of traceability information. Further, when given information is an information code, the information display medium can be used in a machine authentication system using a reading device having an imaging function such as a camera, a mobile phone, or a smartphone. As the information code, a QR Code (registered trademark) can be instantiated.

Further, in this disclosure, hidden information can be observed by transmission observation, so that this disclosure can be used for purposes other than forgery prevention. For instance, this disclosure is usable as a toy, an educational material, a decorative trim of a product, a poster, or the like.

Fourth Embodiment

Next would be described a fourth embodiment with reference to the drawings.

<Information Display Medium 100>

Figure 43:
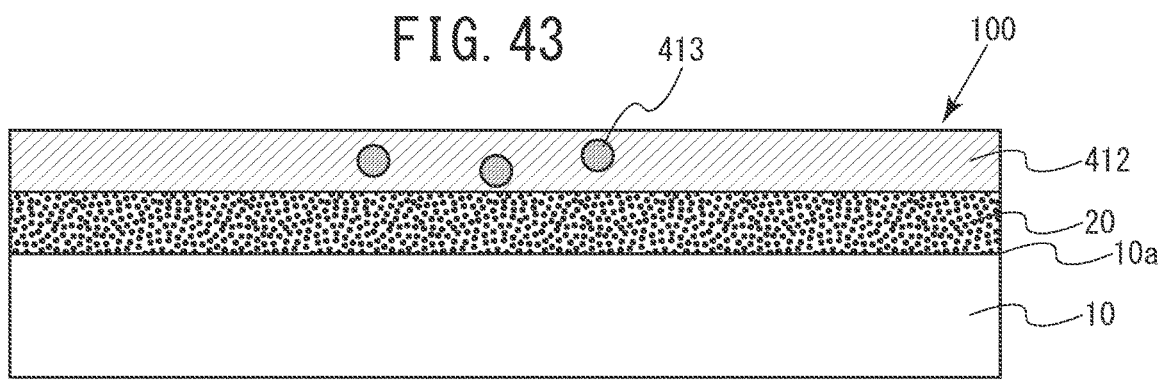
FIG. 43 is a partial sectional view illustrating a part of a sectional structure of an information display medium according to a fourth embodiment.

An information display medium 100 of the present embodiment is an information display medium on which forgery preventing means is provided as illustrated in FIG. 43.

The information display medium 100 is configured by a laminated body in which a structure forming layer 10 constituting a supporting layer, a light reflection layer 20, and a metal-ion containing layer 412 are laminated in this order from a lower side toward a surface side. Other layers such as an adhesive layer and a substrate layer may be further provided as a lower layer of the laminated body, or other layers such as a surface protection layer may be provided on the metal-ion containing layer.

Further, the information display medium 100 includes particles 413 in a partial region of the metal-ion containing layer 412.

The structure forming layer 10 has optical transparency. The structure forming layer 10 may have a single-layered structure or may have a multi-layered structure. Furthermore, the structure forming layer 10 may be made of a material having an optical anisotropy such as a liquid crystal material. In addition, the structure forming layer 10 may be colored by adding pigment or dye to resin.

As the material of the structure forming layer 10, metal oxides or their mixtures can be applied e. $SiO_2$ (silicon dioxide), $TiO_2$ (titanium dioxide), or MgO (magnesium oxide) can be instantiated as the metal oxides. Further, the material of the structure forming layer 10 may be resin.

Note that, when the structure forming layer 10 is made of a metal oxide, the structure forming layer 10 can be formed, for instance, by a dry coating technology. Further, the structure forming layer 10 can be formed by a wet coating technology such as gravure printing. As the dry coating technology, vapor coating, sputtering, or CVD (chemical vapor deposition) can be instantiated.

In a case that the structure forming layer 10 is made of resin, the structure forming layer 10 can be formed, for instance, by the wet coating technology. Alternatively, the structure forming layer 10 can be formed by the dry coating technology.

The thickness of the structure forming layer 10 is preferably not less than 100 nm but not more than 5000 nm. When the thickness is defined to this range, an uneven structure 414 to be described later can be easily formed. In practice, the structure forming layer 10 should have a thickness that just allows the uneven structure 414 to be formed.

Further, the structure forming layer 10 may have a uniform film thickness in the same region, or the film thickness may change continuously or discontinuously.

Figure 44A:
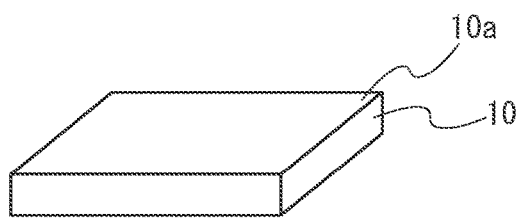
FIGS. 44A and 44B are partial perspective views illustrating a part of a structure forming layer in which the information display medium according to the fourth embodiment is formed.
Figure 44B:
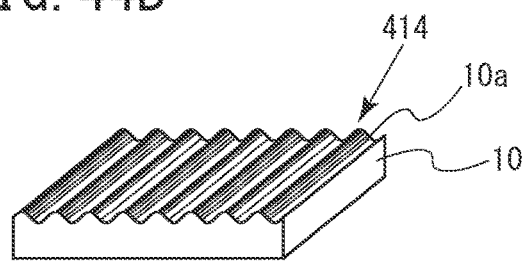

An exemplary structure of a boundary surface 10a of the structure forming layer 10 with the light reflection layer 20 is illustrated in FIGS. 44A and 44B. FIG. 44A illustrates an instance of a flat region of the boundary surface 10a in the structure forming layer 10, and FIG. 44B illustrates an instance of a region of the boundary surface 10a on which a relief structure (grating structure) arranged periodically in a one-dimensional direction is formed by an uneven structure in the structure forming layer 10.

The boundary surface 10a of the structure forming layer 10 with the light reflection layer 20 may entirely have a flat structure as illustrated in FIG. 44A, or the boundary surface 10a in a partial region may be configured by the uneven structure 414 exemplified in FIG. 44B.

The uneven structure 414 formed on the boundary surface 10a of the structure forming layer 10 may be a relief structure (e.g., a cross grating structure) periodically arranged in a two-dimensional direction, a random uneven dot structure, a random periodic relief structure (a random grating structure), or the like, other than the relief structure arranged in the one-dimensional direction as illustrated in FIG. 44B. When the relief structure or the cross grating structure is formed, for instance, light is diffracted along a grating vector direction of the relief structure, so that information can be presented by the diffracted light. Further, when the random uneven dot structure is formed, light is scattered, so that information can be presented by the scattered light. Further, when the random grating structure is formed, light is scattered particularly strongly in its grating vector direction, so that information can be presented by the scattered light having directivity.

In the structure forming layer 10, when different uneven structures 414 are formed in respective regions along a surface direction, a specific shape can be expressed. The specific shape is a picture, a mark, a number, a character, a geometric pattern, or the like.

Further, a shape of a region where the uneven structure 414 is formed may express the specific shape.

The light reflection layer 20 may have a single-layered structure or may have a multi-layered structure.

Further, as a material for the light reflection layer 20, a metal or an alloy can be applied, for instance. As the metal, aluminum, silver, gold, copper, tin, or nickel can be instantiated. As the alloy, steel, stainless steel, or duralumin can be instantiated. Further, the material for the light reflection layer 20 may be a material with metallic luster such as titanium nitride.

In addition, the material for the light reflection layer 20 may be a metallic compound. As the metallic compound, titanium dioxide ($TiO_2$), zirconium dioxide ($ZrO_2$), tungsten oxide ($WO_3$), yttrium oxide ($Y_2O_3$), zinc oxide ($ZnO$), and zinc sulphide ($ZnS$) that are known as materials having a high refractive index can be instantiated.

Note that, the light reflection layer 20 can be formed by a dry coating technology, for instance. As the dry coating technology, vapor coating, sputtering, or CVD (chemical vapor deposition) can be instantiated. Further, the light reflection layer 20 may be formed by use of a wet coating technology.

The thickness of the light reflection layer 20 is preferably not less than 5 nm but not more than 100 nm. The thickness of the light reflection layer 20 is more preferably not less than 20 nm but not more than 60 nm. When the thickness is defined to this range, a sufficient light reflectance for visual observation of the information display medium can be obtained, thereby making it possible to improve a forgery prevention effect.

Further, the light reflection layer 20 may have a uniform film thickness in the same region, or the film thickness may change continuously or discontinuously. Further, the light reflection layer 20 may form a periodic structure.

Further, the light reflection layer 20 may be formed in a specific shape such as a picture, a mark, a number, a character, or a geometric pattern.

The metal-ion containing layer 412 is formed to include the particles 413 in a partial region or an entire region.

FIG. 43 exemplifies a case where a plurality of particles 413 is placed with a distance in a partial region, but the particles 413 may be placed to be close to each other, or the particles 413 may be placed to make contact with each other. It is preferable that a region in which the particles are contained be partially or entirely placed to overlap, in the thickness direction, with a region where a specific pattern is formed in the structure forming layer 10.

The metal-ion containing layer 412 is formed by a metal compound dispersed in a binder high polymer material as a main material by use of a solvent. As the binder high polymer material, polyvinylpyrrolidone or gelatin can be instantiated. As the solvent, water or ethanol can be instantiated. As the metal compound, silver nitrate or tetrachloride auric acid can be instantiated.

The metal-ion containing layer 412 can be formed, for instance, by a wet coating technology. Further, the metal-ion containing layer 412 may be formed by baking after coating.

The thickness of the metal-ion containing layer 412 is preferably not less than 500 nm but not more than 50000 nm. More preferably, the thickness of the metal-ion containing layer 412 is not less than 1000 nm but not more than 5000 nm, provided that the metal-ion containing layer 412 can be formed with the thickness by the wet coating technology.

Further, the metal-ion containing layer 412 may have a uniform film thickness in the same region, or the film thickness may change continuously or discontinuously. Further, the metal-ion containing layer 412 may form a periodic structure.

Further, a specific pattern may be formed in the metal-ion containing layer 412 by placement of the plurality of particles. The specific shape is a picture, a mark, a number, a character, a geometric pattern, or the like, for instance.

The particles 413 of the present embodiment are formed in the metal-ion containing layer 412 by reduction of metal ions contained in the metal-ion containing layer 412. On that account, the material forming the particles 413 depends on a material contained in the metal-ion containing layer 412. For example, in a case that silver nitrate is dissolved in the metal-ion containing layer 412, silver ions are contained in the metal-ion containing layer 412, so that the particles 413 to be provided are made of silver. A formation method of the particles 413 in the metal-ion containing layer 412 would be described later.

As for the particles 413 formed in the metal-ion containing layer 412, a region where the particles 413 are to be contained in the metal-ion containing layer 412 can be set three-dimensionally in accordance with a three-dimensional position where metal ions are reduced.

<Other Information Display Medium 100>

Figure 45:
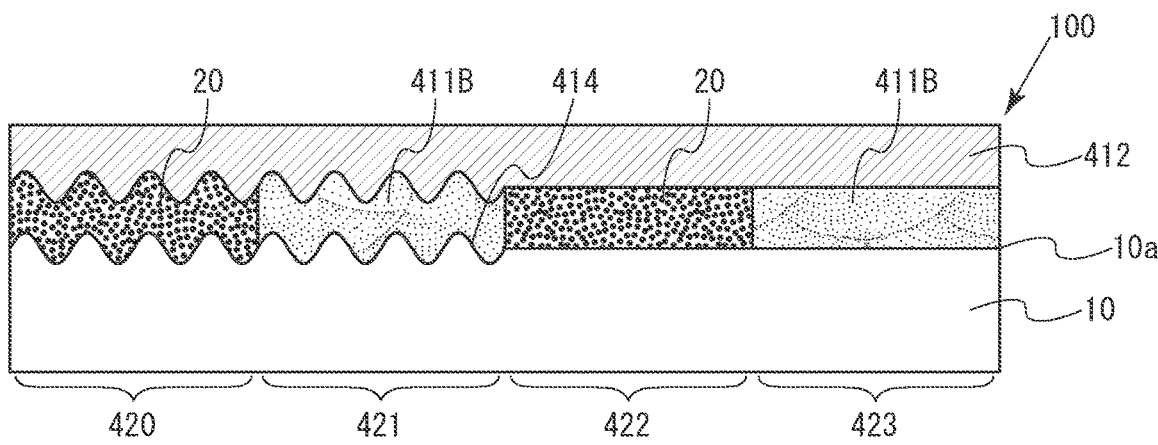
FIG. 45 is a partial sectional view illustrating a part of another instance of the sectional structure of the information display medium according to the fourth embodiment.

As illustrated in FIG. 45, another information display medium 100 is an instance in which an uneven structure 414 is formed on a boundary surface 10a in a partial region 421 in a structure forming layer 10, and a light reflection layer 20 and a metal-ion containing layer 412 are formed on the uneven structure 414.

Figure 46:
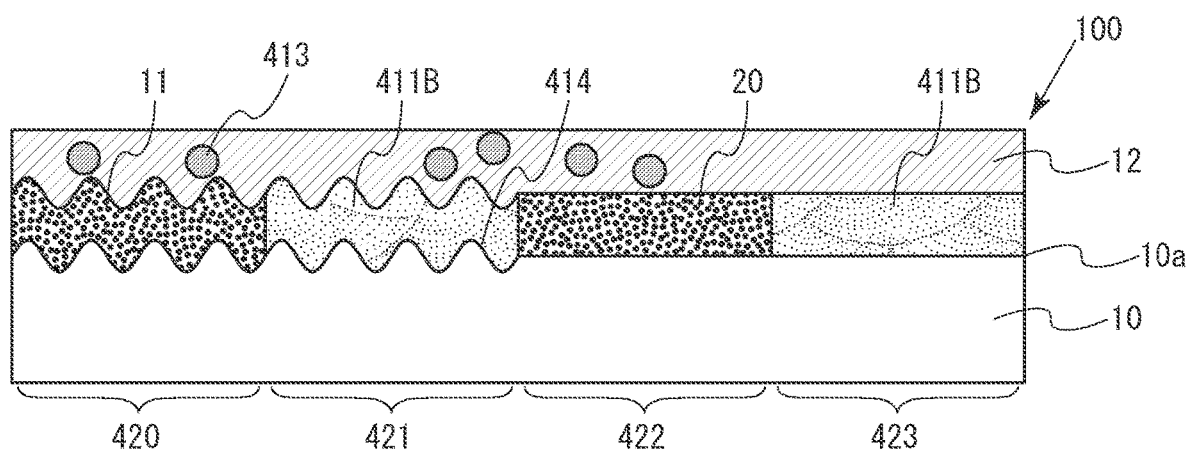
FIG. 46 is a partial sectional view illustrating a part of another instance of the sectional structure of the information display medium according to the fourth embodiment.

The information display medium 100 illustrated in FIG. 45 exemplifies a state before particles 413 are formed in the metal-ion containing layer 412, and when a reduction treatment of metal ions contained in the metal-ion containing layer 412 is performed on the metal-ion containing layer 412 of the information display medium 100 illustrated in FIG. 45 by a method described later, the information display medium 100 in which the particles 413 are formed in the metal-ion containing layer 412 as illustrated in FIG. 46 is obtained.

In the information display medium 100 illustrated in FIG. 46, the uneven structure 414 is formed in a partial region of the structure forming layer 10. Further, a process of locally removing the light reflection layer 20 is performed on the light reflection layer 20 as would be described later, so that a region where light does not reflect or a light reflectance is significantly low is formed. Hereinafter, the region where light does not reflect or the light reflectance is significantly low is referred to as a low light reflection portion 411B.

Accordingly, the information display medium 100 includes a region 420 where the uneven structure 414 and the light reflection layer 20 are formed, a region 421 where the low light reflection portion 411B is placed, a region 422 where the structure forming layer 10 is flat and the light reflection layer 20 is formed, and a region 423 where the low light reflection portion 411B is placed.

Further, as illustrated in FIG. 46, the particles 413 are contained in regions, of the metal-ion containing layer 412, that overlap with the regions 420, 422.

In the regions 421, 423, the low light reflection portion 411B of the light reflection layer 20 is provided by not coating of an application material constituting the light reflection layer 20 partially.

The instance of FIG. 46 is an example of a case where the low light reflection portion 411B in the regions 421, 423 is provided such that, after the light reflection layer 20 is once provided, the light reflection layer 20 is removed by locally applying energy by a laser or the like. Further, the light reflection layer 20 can be removed by using a chemical etching process.

When the regions 421, 423 having the low light reflection portion 411B are provided, information to be provided by the regions 420, 422 where light easily reflects from the light reflection layer 20 can be presented more effectively. For instance, since the uneven structure 414 is formed in the region 420, light reflected, scattered, diffracted, interfered, or absorbed by the uneven structure 414 can be visually observed. In the meantime, since reflection of light is low in the region 421, reflection, scattering, diffraction, interference, or absorption by the uneven structure 414 does not occur or hardly occurs. That is, based on whether the light reflection layer 20 is provided or not, information by visual observation can be displayed.

Further, information presented by the uneven structure 414 in advance can be aligned with a position of the region 421 where the low light reflection portion 411B is provided. Hereby, the information by the uneven structure 414 can be more clearly presented to an observer. Note that the same also applies to the regions 422, 423 where the uneven structure 414 is not formed.

Further, since the particles 413 are formed in the metal-ion containing layer 412, reflection, scattering, diffraction, interference, or absorption of light occurs due to the particles 413. For instance, when the particles 413 are made of a metal such as silver or gold, incident light causes surface plasmon on surfaces of the particles 413, so that light of a specific wave length is absorbed or scattered by the particles 413. Further, since the particles 413 thus formed are placed periodically, diffraction or scattering of light occurs. Further, when the particles 413 thus formed are continuously formed to be adjacent with each other or to make contact with each other, reflection of light occurs. On that account, an optical phenomenon different from an optical phenomenon caused due to the uneven structure 414 can be attained by the particles 413.

The following description is made on the premise that the particles 413 are made of a metallic material, and coloration is obtained by the particles 413 cause surface plasmon and light absorbed or scattered of a specific wave length by the particles 413.

By providing the regions 421, 423 where the low light reflection portion 411B is provided, it is possible to more effectively present information to be provided by the regions 420, 422 where the light reflection layer 20 is not removed. For instance, since the uneven structure 414 is formed in the region 420, light reflected, scattered, diffracted, interfered, or absorbed by the uneven structure 414 can be visually observed. In the meantime, since reflection of light is low in the region 421, reflection, scattering, diffraction, interference, or absorption by the uneven structure 414 does not occur or is small. That is, based on whether the light reflection layer 20 is provided or not, information by visual observation can be displayed.

Further, information presented by the uneven structure 414 in advance can be aligned with a position of the region 421 of the low light reflection portion 411B. Hereby, the information by the uneven structure 414 can be more clearly presented to an observer. Note that the same also applies to the regions 422, 423 where the uneven structure 414 is not formed.

Meanwhile, the coloration by the particles 413 formed in the metal-ion containing layer 412 is observable in any of the regions. On that account, for instance, the information by the uneven structure 414 in the region 420 and the coloration by the particles 413 are visually observable at the same time.

Thus, in addition to the information to be provided based on whether or not the uneven structure 414 is provided or whether or not the light reflection layer 20 is provided, information can be further given by forming the particles 413.

In addition, by use of a formation method of the particles 413 as would be described later, a region where the particles 413 are formed and a region (the low light reflection portion 411B) where the light reflection layer 20 is removed can be formed at once with a good alignment. Accordingly, a combination of any of whether or not the light reflection layer 20 is provided, whether or not the uneven structure 414 is provided, and whether or not the particles 413 are provided can be achieved, so that more complex information can be presented and the picture of the information display medium 100 can be improved at the same time.

<Information Display Medium 200>

Figure 47:
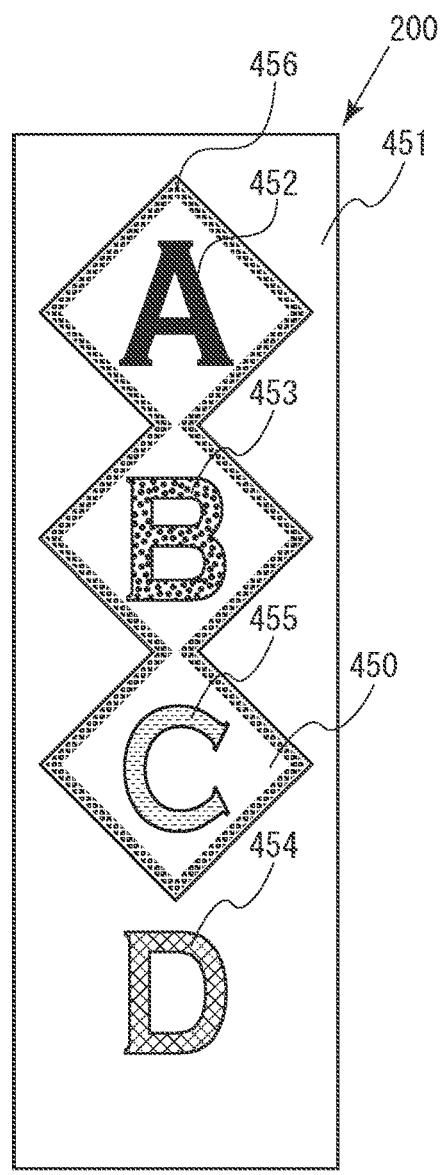
FIG. 47 is a plan view illustrating an instance of the information display medium according to the fourth embodiment.

FIG. 47 illustrates one instance of an information display medium 200. Note that the following description expect a case that a metallic material is used for a light reflection layer 20.

In FIG. 47, a pattern in which three diamonds are continuous with each other is formed by a region 450 where an uneven structure 414 is not formed in a structure forming layer 10 and the light reflection layer 20 is formed, and a region 451 of a low light reflection portion 411B. Further, an alphabet "A" is formed in a region 452 where the uneven structure 414 is formed, an alphabet "B" is formed in a region 453 formed by the uneven structure 414 and particles 413, and an alphabet "D" is formed in a region 454 where only the particles 413 are formed without the uneven structure 414. Further, finally by a method (a method to form the particles 413) to be described later in an after-mentioned manufacturing method, an alphabet "C" and an edging pattern of three continuous diamonds are formed in patterning regions 455, 456. Note that, in the region 456, the particles 413 are formed in a metal-ion containing layer 412.

In the region 450, light reflecting from the light reflection layer 20 can be visually observed, and in the region 451, the structure forming layer 10 is observable. Here, in a case that the information display medium 200 is attached to a substrate via a transparent adhesive material or the like, for instance, information formed on the substrate in advance is visually observable in the region 451. At this time, the adhesive material may be colored.

In the region 452, in a case where the uneven structure 414 is a grating structure, for instance, light is diffracted in the alphabet "A," so that the alphabet "A" is observed such that its color changes iridescently at the time of visual observation, and thus, information can be obtained.

In a case where the uneven structure 414 is a grating structure in the region 453 similarly to the region 452, the alphabet "B" is observed by the iridescent color change. In addition, in a case where coloration is obtained by the particles 413, the iridescent color change by the uneven structure 414 and the coloration by the particles 413 are mixed, so that a color expression different from the region 452 can be achieved.

In the region 454, light reflecting from the light reflection layer 20 is colored by the particles 413, so that colored reflection light is visually observable. For instance, in a case that aluminum is applied as the light reflection layer 20 and the coloration by the particles 413 is yellow, the region 454 presents golden luster at the time of visual observation.

In the region 455, when the light reflection layer 20 is removed to indicate the alphabet "C," the alphabet "C" is visually observable.

The region 456 is a region where the light reflection layer 20 is removed and is also a region where colored by the particles 413, so that a colored edging pattern is visually observable at the time of visual observation.

As described above, when the light reflection layer 20 and the particles 413 are partially formed in divided regions, a plurality of pieces of information can be given to one information display medium 200. Further, the particles 413 can be formed, and the light reflection layer 20 is further removable after the uneven structure 414, the light reflection layer 20, and the metal-ion containing layer 412 are formed, so that information can be given by a post-process.

<Manufacturing Method of Information Display Medium>

The following describes a manufacturing method of the information display medium 100, 200.

The information display medium 100, 200 is manufactured, for instance, through the following steps (1) to (5). (1) First, the uneven structure 414 is formed in the structure forming layer 10, and the light reflection layer 20 is formed.
(2) Then, the light reflection layer 20 is partially removed, so that the low light reflection portion is locally formed.
(3) Then, the metal-ion containing layer 412 is provided to form a laminated body.
(4) After that, energy is locally applied inside the metal-ion containing layer 412 in the laminated body, so that metal ions are reduced in the metal-ion containing layer 412 to form the particles 413 in the metal-ion containing layer 412.
(5) Further, energy is locally applied to the light reflection layer 20 to remove the light reflection layer 20.

The information display medium 100, 200 is manufactured by the above process. Note that, in the above manufacturing method, (2) and (5) may not be necessarily required at the time of manufacture and should be performed as needed.

Figure 48:
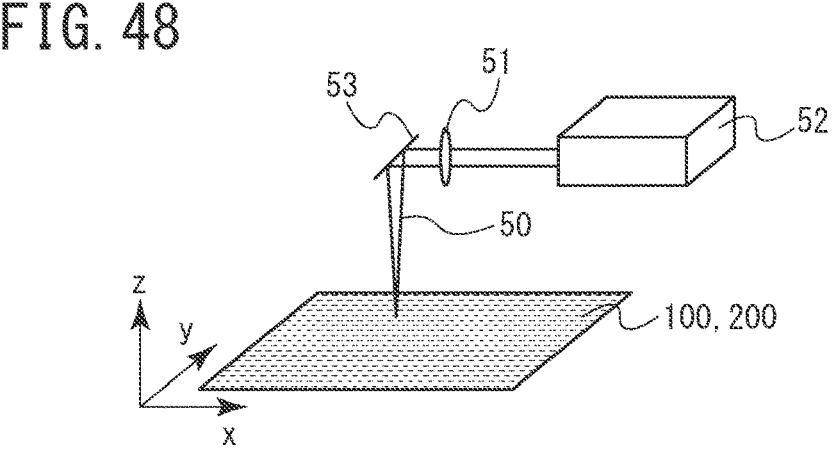
FIG. 48 is a conception diagram illustrating an example of a manufacturing method of the information display medium according to the fourth embodiment.

As a method for locally giving energy to the metal-ion containing layer 412, there is a method using a pulsed laser source or a thermal head. Note that FIG. 48 illustrates a case that the pulse laser source is used.

That is, a laser beam 50 emitted from a pulsed laser source 52 passes through a lens 51 and reflects from a reflecting mirror 53, and the laser beam is incident such that its focal point is set on the metal-ion containing layer 412 forming the information display medium 100, 200. Then, energy caused by the laser beam is localized at the focal point, so that the metal ions are reduced by the energy and the particles 413 are formed at the focal point.

Further, when the focal point of the laser beam 50 is set on the light reflection layer 20, the light reflection layer 20 is removed by the localized energy so that a layer in a low reflection state is formed. This technology is a technology well-known as laser ablation.

Further, in a case where the focal point of the laser beam 50 is set on the structure forming layer 10, the structure forming layer 10 can be removed at that position for example.

By controlling a setting position of the information display medium 100, 200 or X, Y, Z of the focal point of the laser beam 50 at the time of processing with the laser beam 50, a region where the particles 413 are formed or a region where the light reflection layer 20 is removed can be selected.

Alternatively, in a case where the reflecting mirror 53 is a micromirror array structure, the phase of the laser beam 50 is controlled by controlling the micromirror array structure by a computer, so that the focal position of the laser beam 50 can be controlled.

With the manufacturing method, the particles 413 can be formed in the metal-ion containing layer 412, and a partial region of the light reflection layer 20 can be removed. Further, a region where the particles 413 are formed and a region where the light reflection layer 20 is removed can be set to the same region.

The above manufacturing method can be applied after the information display medium 100, 200 is formed, so the manufacturing method can be applied as a post processing method to the manufacture line of the information display medium 100, 200. On this account, the manufacturing method of this disclosure allow on-demand processing on the information display medium 100, 200.

When the manufacturing method of this disclosure is applied to the information display medium 100, 200 as such, different optical expressions are achievable in respective regions 450, 451, 452, 453, 454, 455, 456, and different pieces of information can be further provided in the respective regions. By a combination of the optical expressions and a combination of the pieces of information, determination which the information display medium 100, 200 is a genuine article is possible.

(Effects and Others)

The information display medium of the present embodiment is configured by a laminated body formed such that a supporting layer through which light passes, a light reflection layer, and a metal-ion containing layer are laminated in this order, the metal-ion containing layer makes contact with the light reflection layer, and a partial region of the metal-ion containing layer includes particles.

At this time, the light reflection layer may be partially placed on the same plane, and a region, of the metal-ion containing layer, that includes the particles and a region where the light reflection layer is provided may be placed to have an overlapped part in a thickness direction of the laminated body.

Further, the region, of the metal-ion containing layer, that includes the particles and the region where the light reflection layer is provided may be aligned with each other in the thickness direction of the laminated body to overlap with each other.

Further, the information display medium may be configured by a laminated body including the metal-ion containing layer through which light passes, the light reflection layer, and the supporting layer having a structure formed on a boundary surface so that the supporting layer serves as a structure forming layer. The structure forming layer may make contact with one surface of the light reflection layer, and another surface of the light reflection layer may make contact with the metal-ion containing layer. A partial region of the metal-ion containing layer may include particles, the light reflection layer may be partially provided on a boundary surface making contact with the structure forming layer, and the structure forming layer may have an uneven structure provided in a part of a boundary surface making contact with the light reflection layer.

Further, at least two regions from among the region, of the metal-ion containing layer, that includes the particles, a region where the light reflection layer is provided, and a region where the uneven structure is provided may be placed to have an overlapped part in the thickness direction of the laminated body.

Further, the light reflection layer is made of a metallic material or a metallic oxide material, for instance.

Further, in the manufacturing method of the information display medium, the particles should be formed in the metal-ion containing layer by locally applying light energy to the metal-ion containing layer after the laminated body is provided.

Further, in the manufacturing method of the information display medium, a region where light does not reflect or a light reflectance decreases should be locally formed at a layer position of the light reflection layer by locally applying energy to the light reflection layer after the laminated body is provided.

With such a configuration, the particles are contained in a partial region of the metal-ion containing layer through which light on a surface side passes, so that a display pattern formed in a lower layer is hard to be forged.

Further, by placing the particles to be contained in a three-dimensional specific pattern as needed, an information display pattern can be formed in the metal-ion containing layer.

Further, since on-demand processing is performable on the metal-ion containing layer or the light reflection layer without requiring additional materials or the like, authentication information, identification information, a decorative pattern, or the like can be given in each layer. In addition, simultaneous processing of forming the particles and processing on the light reflection layer allow either of processing with alignment of their positions or processing without alignment of their positions.

In the information display medium of this disclosure, a plurality of pieces of information can be displayed in regions partially different from each other at the time of reflection observation, so that the information display medium can be used as an optical effect of forgery prevention. Accordingly, the information display medium can be used as a forgery prevention medium to protect value and information included in an article such as a valuable security, a certificate, a brand-name product, an expensive product, an electronic device, and a personal identification medium.

Further, the information display medium can be used for purposes other than forgery prevention, and, for instance, can be used as a toy, an educational material, a decorative trim of a product, a poster, or the like.

Fifth Embodiment

The following describes a fifth embodiment in detail with reference to the drawings.

[Information Display Medium]

Figure 49:
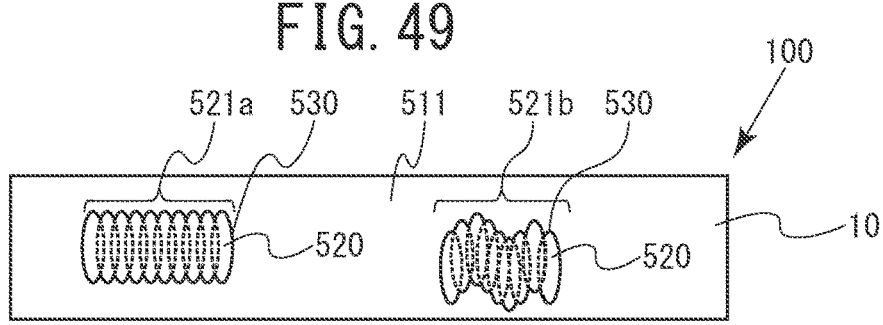
FIG. 49 is a partial sectional view of an information display medium according to 1 of a fifth embodiment.

FIG. 49 is a partial sectional view of an information display medium according to 1 of the fifth embodiment, and an information display medium 100 is an information display medium which forgery preventing means is applied.

The information display medium 100 includes an information display region 560 (see FIG. 60) inside a substrate 10 made of an organic material having optical transparency.

Here, the substrate 10 is made of organic resin having optical transparency, for instance. As the organic material resin having optical transparency, acryl, polyethylene terephthalate, polycarbonate, polyethylenenaphthalate, or parylene can be instantiated. Further, the substrate 10 may have a single-layered structure or may have a multi-layered structure. Furthermore, the substrate 10 may be made of a material having an optical anisotropy such as a liquid crystal material. In addition, the substrate 10 may be colored by addition or the like of dye to resin.

Furthermore, a material having responsiveness by local energy application may be added to the substrate 10. For instance, the material having responsiveness may be a thermochromic material with thermal responsiveness, a photochromic material, a luminescence material, and a phosphorescence material with photoresponsiveness, a material with pressure responsiveness, a solvatochromic material with solvent responsiveness, a material the molecule of which is carbonized by energy application, and the like. In addition, metal ions may be contained in the substrate 10.

In a case that an organic resin high polymer material is used for the substrate 10, the substrate 10 can be formed by a wet coating technology, for example. Further, the substrate 10 may be formed by a dry coating technology.

The substrate 10 may be formed as a single body, or the substrate 10 may be formed by coating on a carrier film or the like.

Note that, since the substrate 10 has optical transparency, information may be presented by the substrate 10 itself. For instance, when a relief hologram structure, a light scattering structure, a light interference structure, or the like is provided, information can be recognized by visual observation due to an optical effect of such a structure.

The thickness of the substrate 10 is preferably not less than 5 μm but not more than 200 μm. The thickness of the substrate 10 is more preferably not less than 20 μm but not more than 150 μm. When the substrate 10 has such a thickness, the substrate 10 has a sufficient strength necessary to process inside the substrate 10.

Further, the substrate 10 may have a uniform film thickness in the same region, or the film thickness may change continuously or discontinuously.

Two continuous modified portions 521*a*, 521*b* are provided inside the substrate 10 of the information display medium 100 in FIG. 49.

Here, the continuous modified portions 521*a*, 521*b* are each configured such that modified portions 520 having a property different from other regions are formed continuously such that adjacent modified portions 520 partially or fully overlap with each other inside the substrate 10, and a boundary surface 530 with an unmodified region 511 has a continuous curved shape.

The boundary surface 530 works as an optical boundary surface and is configured such that information is displayed in the information display region 560 due to the curved shape.

Here, the modified portion 520 is formed by an energy application portion inside the substrate 10 by locally applying energy inside the substrate 10. The modified portion 520 is formed by a change in refractive index, removal, carbonization, swelling, whitening, solidification, or softening of the substrate 10.

As a method to form the modified portion 520, there is a method using a pulsed laser, for example. Further, a method by a thermal head, a method by an electron beam, a method by an ion beam, or the like is also usable.

Here, a curved shape of the boundary surface 530 formed by one continuous modified portion 521*a* is a curved shape expressed by a periodic function and is formed in a repeated pattern.

As such, when the curved shape of the boundary surface 530 is formed in a curved shape expressed by a periodic function, a diffraction grating structure is formed, so that information is formed in the information display region 560 by diffraction light diffracted by the diffraction grating structure.

Note that the curved shape of the boundary surface 530 may be a curved shape expressed by a superimposition function of two or more periodic functions. Further, the curved shape of the boundary surface 530 may not be a curved shape expressed by a periodic function or a curved shape expressed by a superimposition function, provided that the curved shape of the boundary surface 530 forms a curved surface.

Further, a curved shape of the boundary surface 530 formed by the other continuous modified portion 521*b* is a curved shape with steps having different heights in the thickness direction of the substrate 10 in a curved shape expressed by a periodic function. Hereby, a diffraction grating structure is formed, so that information is displayed in the information display region 560 by diffraction light diffracted by the diffraction grating structure.

Figure 50:
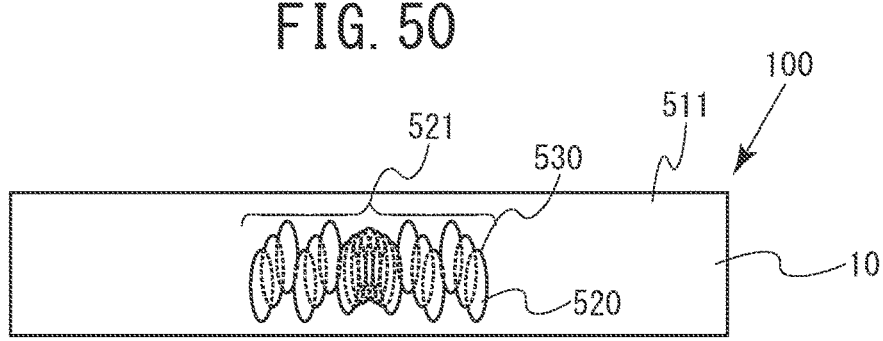
FIG. 50 is a partial sectional view of an information display medium according to 2 of the fifth embodiment.

Next would be described an information display medium according to 2 of the fifth embodiment, with reference to FIG. 50.

An information display medium 100 illustrated in FIG. 50 has a basic structure that is the same as the information display medium 100 illustrated in FIG. 49, but a single continuous modified portion 521 is formed, and a curved shape of a boundary surface 530 of the continuous modified portion 521 with an unmodified region 511 is different from the curved shapes of the boundary surfaces 530 of the continuous modified portions 521*a*, 521*b* with the unmodified region 511 in the information display medium 100 illustrated in FIG. 49.

That is, in the information display medium 100 illustrated in FIG. 50, the curve shape of the boundary surface 530 of the continuous modified portion 521 with the unmodified region 511 is a curved shape expressed by a periodic function and has a Fresnel lens shape inside a substrate 10. That is, the curved shape forms a Fresnel-shaped specific free-form curved structure inside the substrate 10. Hereby, information is displayed in an information display region 560 by reflection light reflected by the Fresnel-shaped specific free-form curved structure. Thus, at the time of reflection observation, an optical pseudo steric effect can be given.

Figure 51:
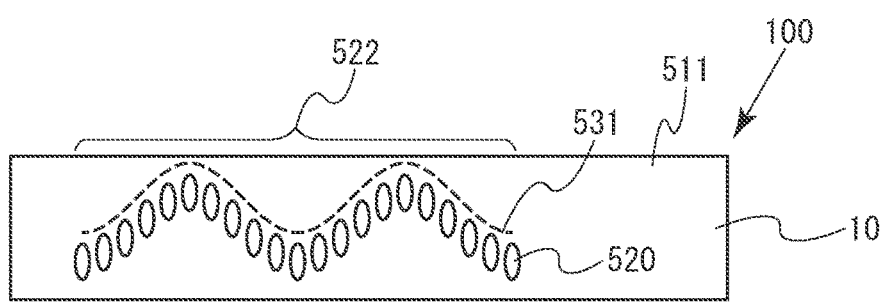
FIG. 51 is a partial sectional view of an information display medium according to 3 of the fifth embodiment.

Next would be described an information display medium according to 3 of the fifth embodiment with reference to FIG. 51.

An information display medium 100 illustrated in FIG. 51 has a basic structure that is the same as the information display medium 100 illustrated in FIG. 49 but is different from the information display medium 100 illustrated in FIG. 49 in that not continuous modified portions 521*a*, 521*b*, but a discontinuous modified portion 522 is provided inside a substrate 10.

Here, in the discontinuous modified portion 522, modified portions 520 are formed discontinuously such that adjacent modified portions 520 inside the substrate 10 do not overlap with each other, and a pseudo boundary surface 531 with an unmodified region 511 has a continuous curved shape.

The pseudo boundary surface 531 works as an optical boundary surface and is configured such that information is displayed in an information display region 560 due to a curved shape of the pseudo boundary surface 531.

The curved shape of the pseudo boundary surface 531 is a curved shape expressed by a periodic function and is formed in a repeated pattern. As such, when the curved shape of the pseudo boundary surface 531 is formed in a curved shape expressed by a periodic function, a diffraction grating structure is formed, so that information is displayed in the information display region 560 by diffraction light diffracted by the diffraction grating structure.

Figure 52:
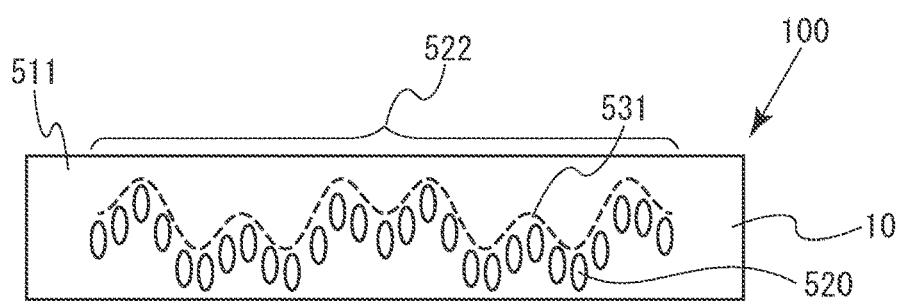
FIG. 52 is a partial sectional view of an information display medium according to 4 of the fifth embodiment.

Next would be described an information display medium according to 4 of the fifth embodiment with reference to FIG. 52.

An information display medium 100 illustrated in FIG. 52 has a basic structure that is the same as the information display medium 100 illustrated in FIG. 51 but is different from the information display medium 100 illustrated in FIG. 51 in that a curved shape of a pseudo boundary surface 531 is a curved shape expressed by a superimposition function of a plurality of periodic functions.

As such, when the curved shape of the pseudo boundary surface 531 is formed in a curved shape expressed by the superimposition function of the plurality of periodic functions, a diffraction grating structure is formed, so that information is displayed in an information display region 560 by diffraction light diffracted by the diffraction grating structure. When the curved shape of the pseudo boundary surface 531 is a curved shape expressed by the superimposition function of the plurality of periodic functions, this optical effect is easily caused.

Figure 53:
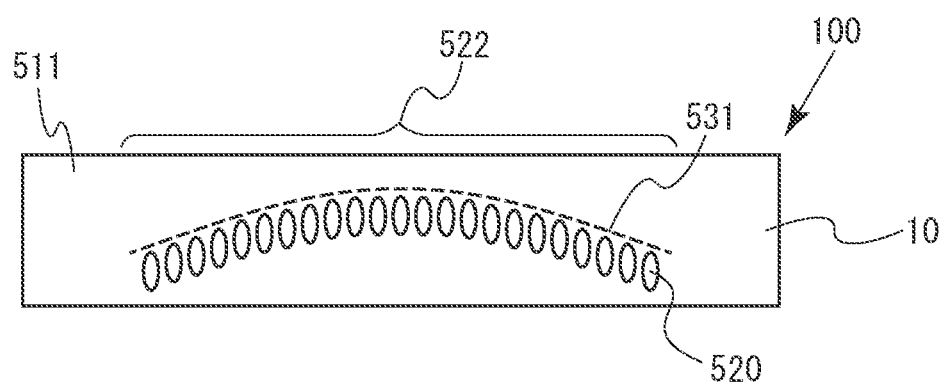
FIG. 53 is a partial sectional view of an information display medium according to 5 of the fifth embodiment.

Next would be described an information display medium according to 5 of the fifth embodiment with reference to FIG. 53.

An information display medium 100 illustrated in FIG. 53 has a basic structure that is the same as the information display medium 100 illustrated in FIG. 51 but is different from the information display medium 100 illustrated in FIG. 51 in that a curved shape of a pseudo boundary surface 531 is a lenticular shape.

Hereby, information is displayed in an information display region 560 by reflection light reflected by the lenticular shape. Thus, at the time of reflection observation, an optical pseudo steric effect can be given.

Figure 54:
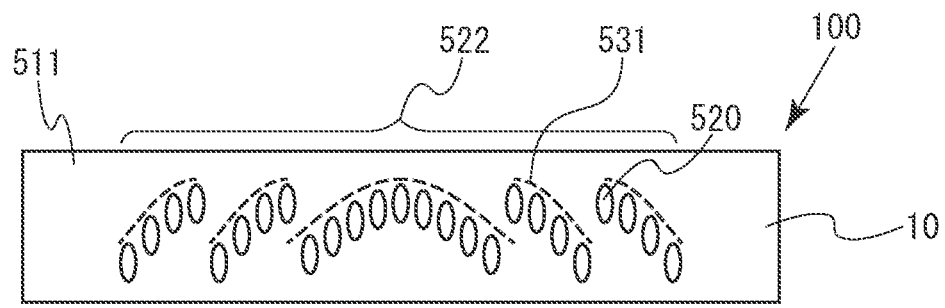
FIG. 54 is a partial sectional view of an information display medium according to 6 of the fifth embodiment.

Next would be described an information display medium according to 6 of the fifth embodiment with reference to FIG. 54.

An information display medium 100 illustrated in FIG. 54 has a basic structure that is the same as the information display medium 100 illustrated in FIG. 51 but is different from the information display medium 100 illustrated in FIG. 51 in that a curved shape of a pseudo boundary surface 531 is a Fresnel lens shape.

Hereby, information is displayed in an information display region 560 by reflection light reflected by the Fresnel lens shape. Thus, at the time of reflection observation, an optical pseudo steric effect can be given.

Note that the pseudo boundary surface 531 in FIG. 54 exhibits a Fresnel lens shape but may have a boundary surface shape obtained by intermittently slicing a free-form surface shape. In this case, at the time of reflection observation, an optical pseudo steric effect corresponding to the free-form surface shape can be given.

In either of a case where the continuous modified portion 521a, 521b, 521 in which the modified portions 520 are formed to overlap with each other is formed like 1 to 2 of the fifth embodiment and a case where the discontinuous modified portion 522 in which the modified portions 520 are formed not to overlap with each other is formed like 3 to 6 of the fifth embodiment, the position where the modified portions 520 are formed in the thickness direction of the substrate 10 may be at random. Hereby, light incident on the substrate 10 is scattered, so that information can be displayed due to gradation or directivity of the light thus scattered. That is, a light scattering structure is formed by the curved shape of the boundary surface 530 or the pseudo boundary surface 531, so that information can be displayed in the information display region 560 by scattered light scattered by the light scattering structure.

Further, by changing the density to form the modified portions 520, the continuous modified portion 521a, 521b, 521, or the discontinuous modified portion 522, the gradation of the scattered light of the light incident of the substrate 10 can be changed, so that information can be displayed by the graduation.

Figure 55A:
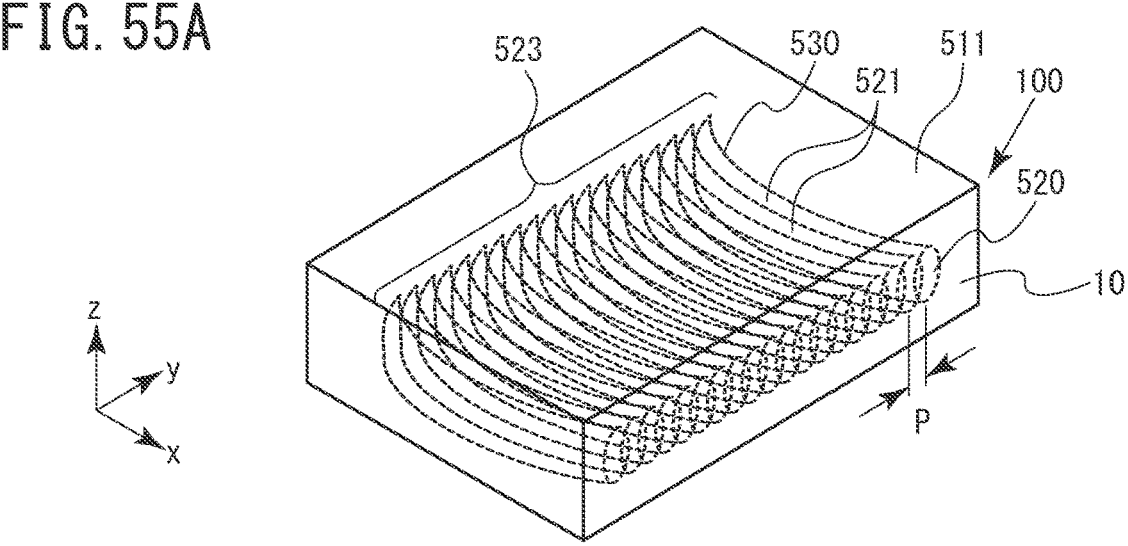
Figure 55B:
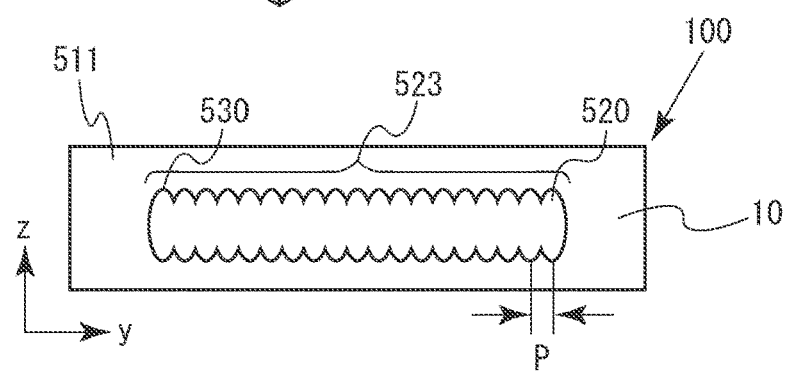

Next would be described an information display medium according to 7 of the fifth embodiment of this disclosure with reference to FIGS. 55A and 55B.

An information display medium 100 illustrated in FIGS. 55A and 55B are configured such that, inside a substrate 10, a plurality of continuous modified portions 521 as described 1 to 2 of the fifth embodiment is formed continuously at a formation pitch P set in advance along a y-axis direction, so that a modified region 523 is formed.

At this time, in a case where light is incident on the information display medium 100 at an angle of an incidence angle θin, diffracted light caused due to a diffraction grating structure formed by a boundary surface 530 is expressed by Equation (1) as follows.

$$P(\sin\theta_{in} - \sin\theta_{diff}) = m\lambda \ldots \quad (1)$$

Here, P indicates a grating formation pitch, θin indicates an incidence angle, θdiff indicates a diffraction angle, m indicates an order made of an integer number, and λ indicates a wavelength of incident light or diffracted light.

From Equation (1), it is found that the characteristic of the diffracted light depends on the grating formation pitch P.

In practice, by forming the modified region 523 by partially changing the formation pitch P between the continuous modified portions 521, diffracted light with a different wave length or diffracted light with a different diffraction angle can be observed in each part due to the difference in formation pitch P at the time when the information display medium 100 is observed, so that information can be hereby displayed.

Further, a phase hologram structure to control a phase difference of incident light can be formed not by a periodic formation pitch, but by the boundary surface 530 configured by the continuous modified portion 521b as illustrated in FIG. 49 or by the pseudo boundary surface 531 of the discontinuous modified portion 522 formed by the modified portions 520 as illustrated in FIG. 52. Hereby, a calculation hologram structure with a bright diffracted image, conventionally called kinoform, can be formed, so that a steric optical expression can be obtained by the modified portions 520 provided in a spot manner.

Further, the modified portions 520 can be also formed such that the modified portions 520 are controlled with respect to the substrate 10 in the thickness direction, so that an interference-fringe forming a conventional volume-type hologram structure can be formed by the modified portions 520. Hereby, a steric optical expression can be obtained by the modified portions 520.

In addition, when an outer shape of the modified portion 520 or the continuous modified portion 521 has a multistage shape to simulatively form a sawtooth wave section, a blazed diffraction grating structure is formed, so that diffracted light brighter than before can be obtained.

Figure 56:
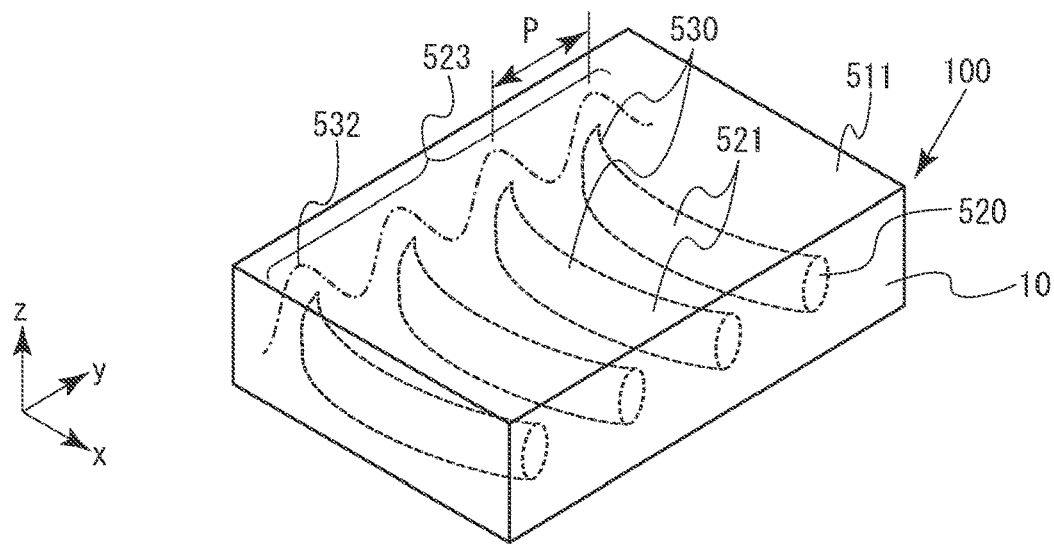
FIG. 56 is a bird's eye view illustrating a part of an information display medium according to 8 of the fifth embodiment.

Next would be described an information display medium according to 8 of the fifth embodiment with reference to FIG. 56.

An information display medium 100 illustrated in FIG. 56 is configured such that, inside a substrate 10, a plurality of continuous modified portions 521 as illustrated in 1 to 2 of the fifth embodiment is formed at a formation pitch P set in advance to forma modified region 523, so that a pseudo boundary surface 532 is formed by boundary surfaces 530 of the continuous modified portions 521. Hereby, similarly to the above description, a diffraction grating structure by the pseudo boundary surface 532 can be formed, so that information can be displayed by light diffracted by the diffraction grating structure.

In the information display medium 100 illustrated in FIG. 56, the continuous modified portion 521 is formed to draw a curved line inside the substrate 10, but the continuous modified portion 521 may be a straight line or may be formed in combination with a straight line and a curved line. Further, the continuous modified portions 521 may be formed by being changed in the thickness direction of the substrate 10. Hereby, a more complex diffraction grating structure can be formed.

Like the information display medium 100 illustrated in FIG. 56, by forming the continuous modified portions 521 to draw a curved line, parallax error can be given by diffracted light to be formed by the pseudo boundary surface 532 at the time of visual observation by people. Hereby, information obtained by the diffracted light can be a steric optical expression.

Figure 57:
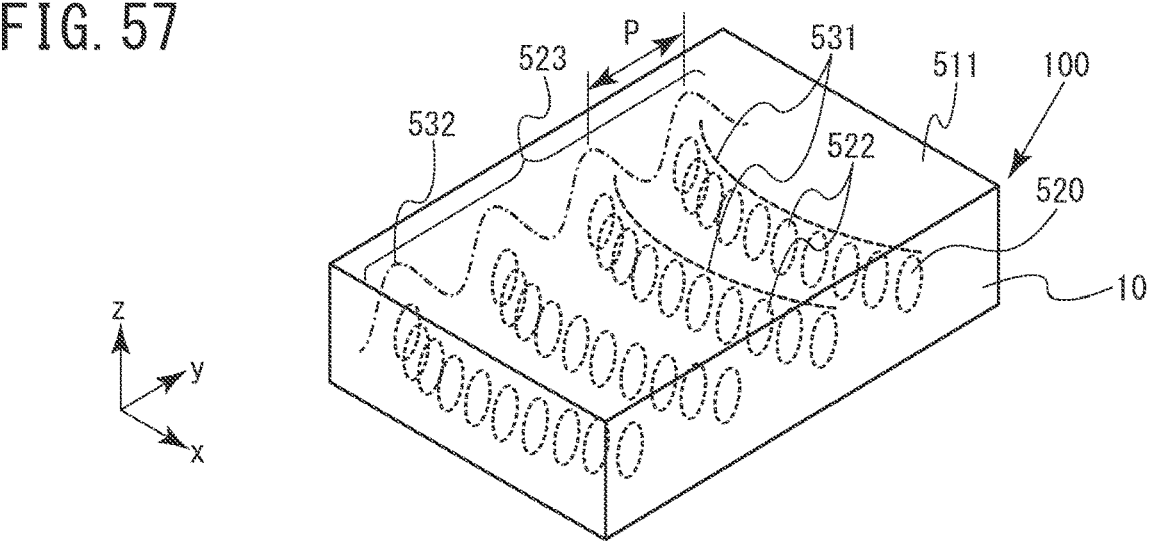
FIG. 57 is a bird's eye view illustrating a part of an information display medium according to 9 of the fifth embodiment.

FIG. 57 illustrates an information display medium according to 9 of the fifth embodiment.

An information display medium 100 illustrated in FIG. 57 is configured such that, inside a substrate 10, a modified region 523 is formed by forming a plurality of discontinuous modified portions 522 as illustrated in 3 to 6 of the fifth embodiment at a formation pitch P set in advance, and a pseudo boundary surface 532 is formed by pseudo boundary surfaces 531 of the discontinuous modified portions 522. Hereby, a diffraction grating structure can be formed by the pseudo boundary surface 532, so that information can be displayed by light diffracted by the diffraction grating structure.

[Manufacturing Method of Information Display Medium]

Next would be described a manufacturing method of the information display medium 100.

The information display medium 100 is manufactured by performing the following steps.

A step of partially forming the modified portion 520 that locally energy applied inside the substrate 10 after the substrate 10 formed.

A step of incessantly repeating formation of the modified portion 520 along a previously designed pattern.

That is, the information display media 100 according to 1 to 2 of the fifth embodiment are each manufactured by a step of locally applying energy inside the substrate 10 to form, at an energy application portion inside the substrate 10, the modified portion 520 having a property different from other regions, and a step of forming the continuous modified portion 521 by continuously forming the modified portions 520 that adjacent modified portions 520 partially or fully overlap with each other inside the substrate 10 and the boundary surface 530 with the unmodified region 511 has a continuous curved shape.

Further, the information display media 100 according to 3 to 6 of the fifth embodiment are each manufactured by a step of locally applying energy inside the substrate 10 to form, at the energy application portion inside the substrate 10, the modified portion 520 having a property different from other regions, and a step of forming the discontinuous modified portion 522 by discontinuously forming the modified portions 520 that adjacent modified portions 520 do not overlap with each other inside the substrate 10 and the pseudo boundary surface 531 with the unmodified region 511 has a continuous curved shape.

Further, as described above, the information display medium 100 according to 7 of the fifth embodiment is manufactured by forming the continuous modified portion 521 inside the substrate 10, and forming the modified region 523 by continuously forming a plurality of continuous modified portions 521 at the formation pitch P set in advance along a setting direction set in advance.

Further, as described above, the information display medium 100 according to 8 of the fifth embodiment is manufactured by forming the continuous modified portion 521 inside the substrate 10, and continuously forming a plurality of continuous modified portions 521 at the formation pitch P set in advance along a setting direction set in advance to form the modified region 523 in which the pseudo boundary surface 532 is formed by the boundary surfaces 530 of the continuous modified portions 521.

Further, as described above, the information display medium 100 according to 9 of the fifth embodiment is manufactured by forming the discontinuous modified portion 522 inside the substrate 10, and forming a plurality of discontinuous modified portions 522 at the formation pitch P set in advance to form the modified region 523 in which the pseudo boundary surface 532 is formed by the pseudo boundary surfaces 531 of the discontinuous modified portions 522.

In the manufacturing methods of the information display media 100 according to 1 to 9 of the fifth embodiment, two or more modified portions 520 are formed inside the substrate 10 at the same time. Hereby, a process time to form the continuous modified portion 521, the discontinuous modified portion 522, and the modified region 523 can be shortened.

Here, as a method for locally applying energy to the substrate 10, there is a method using a pulsed laser source, a thermal head, an electron beam, or an ion beam. Note that FIG. 58 illustrates a case that a pulse laser source 52 is used.

A laser beam 50 emitted from the pulsed laser source 52 passes through a lens 51 and reflects from a reflecting mirror 53, and the laser beam 50 is incident on the information display medium 100 or on a manufacture line of the information display medium 100 that its focal point is set on a specific position on the information display medium 100. Then, energy caused by the laser beam 50 is localized at the focal point, so that the modified portions 520 are formed in a spot manner.

Figure 58:
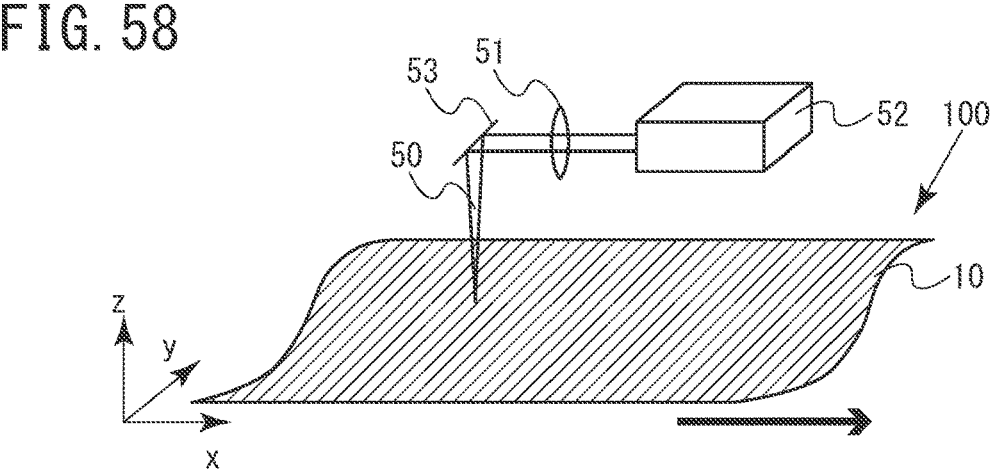
FIG. 58 is a view illustrating an instance of a manufacturing method of an information display medium according to this disclosure.

Note that, in FIG. 58, the laser beam 50 passes through the reflecting mirror 53 after the laser beam 50 has passed through the lens 51, but the passing order may be reversed.

In terms of machining with the laser beam 50, in a case that the information display medium 100 is manufactured by a roll-to-roll method, a formation position of the modified portion 520 can be selected and controlled by controlling the focal position (positions in an x-direction, a y-direction, and a z-direction) of the laser beam 50.

Further, in a case that the information display medium 100 is manufactured from each sheet, the formation position of the modified portion 520 can be selected and controlled by moving a stage on which the information display medium 100 is set or by controlling the beam waist position (positions in the x-direction, the y-direction, and the z-direction) of the laser beam 50.

Alternatively, in a case where the reflecting mirror 53 is a micromirror array structure, the phase of the laser beam is controlled by controlling the micromirror array structure by a computer, so that the beam waist position of the laser beam can be controlled.

Furthermore, a reflection-type spatial light modulator is used as the reflecting mirror 53, and the phase of each cell of the spatial light modulator is controlled by a computer to control the phase of the laser beam, so that the beam waist position of the laser beam can be controlled. Note that the spatial light modulator may be transmissive.

Note that it is desirable for the pulsed laser source 52 to have a pulse width of not less than 100 femtoseconds but not more than 1 picosecond. Hereby, the laser beam 50 passing through the lens 51 momentarily has a high energy at the beam waist position, so that the modified portion 520 can be formed effectively. Further, since a time during which the laser beam has a high energy is very short, no influence is caused in parts other than an irradiation position.

Further, it is desirable to use either a fiber laser using optical fibers or a solid laser using a titanium sapphire crystal as the pulsed laser source 52. Further, it is desirable that a wave range of the pulsed laser source 52 be from a near infrared region to an infrared region.

By use of the pulsed laser source 52, it is possible to momentarily form a high energy state at the focal point of the laser beam, so that fine processing can be applied on the substrate 10.

Figure 59:
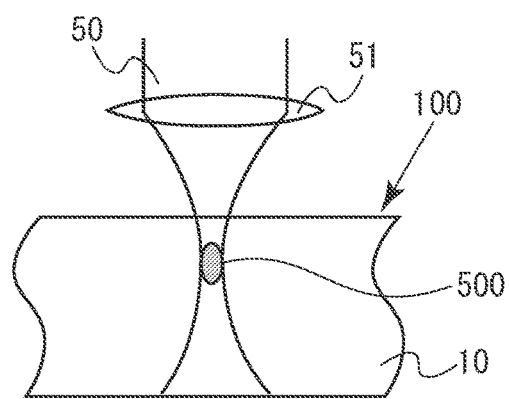
FIG. 59 is a partial sectional view to describe an instance of the manufacturing method of the information display medium according to this disclosure.

FIG. 59 illustrates a schematic view in a case where the pulse laser source 52 locally applies energy to the substrate 10 to form an energy application portion 500. As illustrated in FIG. 59, "locally" means that the energy that has passed through the lens 51 is given in a spot manner. Hereby, the modified portion 520 can be formed more finely.

Further, in a case that the pulse laser source 52 is used, the modified portion 520 can be formed or patterned at a high speed, so that high-speed machining is achievable.

As described above, in a case that the pulse laser source 52 is used, fine and high-speed processing are performable, so that on-demand processing is performable on the information display medium 100, 200.

As a conventional method to form a hologram, there has been well known a method in which a printing plate having a minute uneven structure to form a hologram is used, and the printing plate is pressed against a resin material to emboss the resin material with the minute uneven structure. The following two processes are employed to manufacture a hologram by this embossing.

Printing plate manufacturing process

Embossing process

In the meantime, the process of this disclosure directly apply on a resin material film to form grating such as a hologram, and therefore, the embossing process in addition to the printing plate manufacturing process is not required. This consequently leads to a reduction in manufacturing cost.

Figure 60:
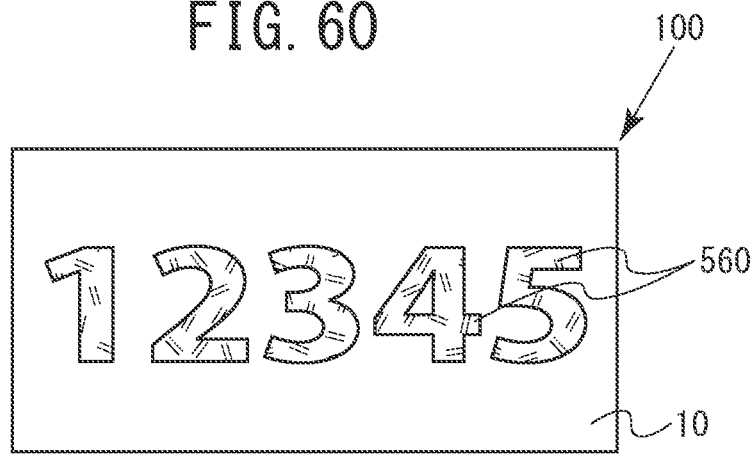
FIG. 60 is a front view of the information display medium according to this disclosure.

FIG. 60 illustrates the information display medium 100 according to 1 to 9 of the fifth embodiment, and the information display medium 100 is configured such that the continuous modified portion 521, the discontinuous modified portion 522, or the modified region 523 is formed inside the substrate 10, and the information display region 560 is formed by the boundary surface 530 or the pseudo boundary surface 531, 532. Information is displayed in the information display region 560 by optically causing diffracted light by the boundary surface 530 or the pseudo boundary surface 531, 532. FIG. 60 illustrates a case where information to be displayed is number information "12345."

Here, the information to be displayed is not limited to a number and may be other specific patterns. The other specific patterns may be character information, a picture, a mark, a geometric pattern, or the like.

Figure 61:
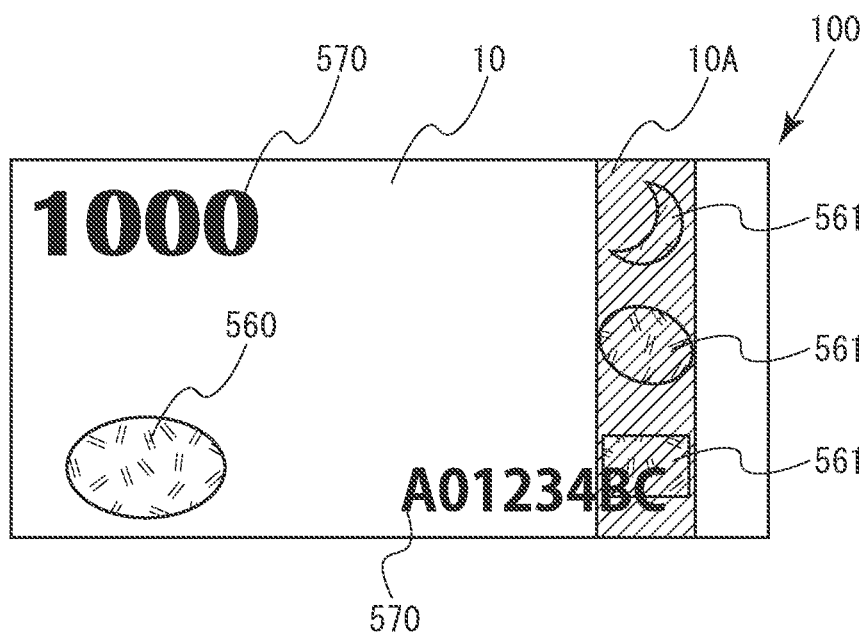
FIG. 61 is a front view of the information display medium according to this disclosure.

FIG. 61 illustrates an information display medium 100 according to 10 of the fifth embodiment, and the information display medium 100 is configured as follows. A continuous modified portion 521, a discontinuous modified portion 522, or a modified region 523 is formed inside a substrate 10, and an information display region 560 obtained by a boundary surface 530 or a pseudo boundary surface 531, 532 of the continuous modified portion 521, the discontinuous modified portion 522, or the modified region 523 is provided. A printing portion 570 formed by printing of ink or the like is formed on a surface of the substrate 10. Further, a continuous modified portion 521, a discontinuous modified portion 522, or a modified region 523 is formed inside a substrate 10A newly attached to the substrate 10, and an information display region 561 obtained by a boundary surface 530 or a pseudo boundary surface 531, 532 of the continuous modified portion 521, the discontinuous modified portion 522, or the modified region 523 is provided.

In practice, the information display medium 100 can be obtained by processing inside the substrate 10A in advance to form the information display region 561 and attaching the substrate 10A to the substrate 10, or as mentioned earlier, the information display region 561 may be formed by processing inside the substrate 10A after the substrate 10A is attached.

As illustrated in FIG. 61, the information display medium 100 may be formed by information other than the information display region 560. Further, information that can be observed may be newly recorded by not only forming the information display region 560 in the single substrate 10, but also forming the information display region 561 in the substrate 10A additionally formed.

Further, the information display region 560 and the printing portion 570 may overlap with each other. Hereby, a plurality of pieces of information can be formed on the information display medium 100 by the printing portion 570, the information display region 560 formed on the substrate 10, and the information display region 561 formed on the substrate 10A.

(Effects and Others)

An information display medium according to the fifth embodiment is an information display medium including an information display region inside a substrate made of an organic material having optical transparency and is summarized as follows. A continuous modified portion is provided inside the substrate by continuously forming modified portions having a property different from other regions that adjacent modified portions partially or fully overlap with each other inside the substrate and a boundary surface with an unmodified region has a continuous curved shape, so that information is displayed in the information display region due to the curved shape.

Hereby, the boundary surface between the unmodified region and the continuous modified portion is formed by the continuous curved shape, and optical response is changed by the shape of the boundary surface, so that information can be recorded in the information display region inside the substrate. Note that the shape of the boundary surface is formed inside the substrate, and therefore, in a case that display information is peeled off by forgery, counterfeit, manipulation, and the like, the display information is easily broken, so that forgery, counterfeit, and manipulation become difficult. Thus, it is possible to yield a higher forgery prevention effect.

Further, an information display medium according to another aspect of the fifth embodiment is an information display medium including an information display region inside a substrate made of an organic material having optical transparency and is summarized as follows. A discontinuous modified portion is provided inside the substrate by discontinuously forming modified portions having a property different from other regions that adjacent modified portions inside the substrate do not overlap with each other and a pseudo boundary surface with an unmodified region has a continuous curved shape, so that information is displayed in the information display region due to the curved shape.

Hereby, the pseudo boundary surface between the unmodified region and the discontinuous modified portion is formed by the continuous curved shape, and optical response is changed by the shape of the pseudo boundary surface, so that information can be recorded in the information display region inside the substrate. Note that the shape of the pseudo boundary surface is formed inside the substrate, and therefore, in a case that display information is peeled off by forgery, counterfeit, manipulation, and the like, the display information is easily broken, so that forgery, counterfeit, and manipulation become difficult. Thus, it is possible to yield a higher forgery prevention effect.

Further, in the above information display medium, it is preferable that at least two or more continuous modified portions be provided inside the substrate.

Further, in the above information display medium, it is preferable that at least two or more discontinuous modified portions be provided inside the substrate.

Hereby, a plurality of pieces of display information by the optical response by the continuous modified portions or the discontinuous modified portions can be provided inside the substrate.

Further, in the information display medium, it is preferable that the curved shape be formed by a repeated pattern.

Hereby, the following optical effect and information can be presented.

Further, in the above information display medium, the curved shape may form a Fresnel-shaped specific free-form curved structure inside the substrate, so that the information is displayed in the information display region by reflection light reflected by the Fresnel-shaped specific free-form curved structure.

Further, in the above information display medium, it is preferable that the curved shape be a curved shape expressed by a periodic function. Further, in the above information display medium, the curved shape may be a curved shape expressed by a superimposition function of at least two or more periodic functions.

Hereby, the following optical effect and information can be presented.

Further, in the above information display medium, a diffraction grating structure may be formed by the curved shape, so that the information is displayed in the information display region by diffraction light diffracted by the diffraction grating structure.

Further, in the above information display medium, a volume-type hologram structure may be formed by the curved shape inside the substrate, so that the information is displayed in the information display region by diffraction light diffracted by the volume-type hologram structure.

Further, in the above information display medium, a kinoform structure may be formed by the curved shape, so that the information is displayed in the information display region by diffraction light diffracted by the kinoform structure.

Further, in the above information display medium, a light scattering structure may be formed by the curved shape, so that the information is displayed in the information display region by scattered light scattered by the light scattering structure.

Further, a manufacturing method of an information display medium according to another aspect of the fifth embodiment is a manufacturing method of an information display medium including an information display region inside a substrate made of an organic material having optical transparency and is summarized as follows. The manufacturing method includes a step of locally applying energy inside the substrate to form, at an energy application portion inside the substrate, a modified portion having a property different from other regions, and a step of forming a continuous modified portion by continuously forming the modified portion that adjacent modified portions partially or fully overlap with each other inside the substrate and a boundary surface with an unmodified region has a continuous curved shape.

Hereby, the boundary surface between the unmodified region and the continuous modified portion is formed by the continuous curved shape, and optical response is changed by the shape of the boundary surface, so that information can be recorded in the information display region inside the substrate. Note that the shape of the boundary surface is formed inside the substrate, and therefore, in a case that display information is peeled off by forgery, counterfeit, manipulation, and the like, the display information is easily broken, so that forgery, counterfeit, and manipulation become difficult. Thus, it is possible to yield a higher forgery prevention effect.

Further, in the manufacturing method of the information display medium, it is preferable that one continuous modified portion be formed inside the substrate.

Hereby, the curved shape can be formed that the modified region (the continuous modified portion) is placed minutely.

Further, in the manufacturing method of the information display medium, it is preferable that two or more continuous modified portions be formed inside the substrate.

Hereby, the modified region (the continuous modified portions) can be placed minutely, and an area of a region where the modified region is formed can be made large.

Further, a manufacturing method of an information display medium according to another aspect of the fifth embodiment is a manufacturing method of an information display medium including an information display region inside a substrate made of an organic material having optical transparency and is summarized as follows. The manufacturing method includes a step of locally applying energy inside the substrate to form, at an energy application portion inside the substrate, a modified portion having a property different from other regions, and a step of forming a discontinuous modified portion by discontinuously forming the modified portion that adjacent modified portions do not overlap with each other inside the substrate and a pseudo boundary surface with an unmodified region has a continuous curved shape.

Hereby, the pseudo boundary surface between the unmodified region and the discontinuous modified portion is formed by the continuous curved shape, and optical response is changed by the shape of the pseudo boundary surface, so that information can be recorded in the information display region inside the substrate. Note that the shape of the pseudo boundary surface is formed inside the substrate, and therefore, in a case that display information is peeled off by forgery, counterfeit, manipulation, and the like, the display information is easily broken, so that forgery, counterfeit, and manipulation become difficult. Thus, it is possible to yield a higher forgery prevention effect.

Further, in the manufacturing method of the information display medium, it is preferable that one discontinuous modified portion be formed inside the substrate.

Hereby, the curved shape can be formed such that the modified region (the discontinuous modified portion) is placed minutely.

Further, in the manufacturing method of the information display medium, it is preferable at least two or more discontinuous modified portions be formed inside the substrate.

Hereby, the modified region (the discontinuous modified portions) can be placed minutely, and an area of a region where the modified region is formed can be made large.

Further, in the manufacturing method of the information display medium, it is preferable that at least two modified portions be formed inside the substrate at the same time.

Hereby, a process time to form the modified region (the continuous modified portion or the discontinuous modified portion) can be shortened.

As described above, with the information display medium and its manufacturing method according to the present embodiment, it is possible to provide an information display medium that can demonstrate a higher forgery prevention effect by forming, inside a substrate, an information display region that can enhance the forgery prevention effect.

Further, the information display medium 100 of this disclosure can display a plurality of pieces of information in regions partially different from each other at the time of reflection observation, so that the information display medium can be used as optical effect for forgery prevention. Accordingly, the information display medium can be used as a forgery prevention medium to protect value and information included in an article such as a valuable security, a certificate, a brand-name product, an expensive product, an electronic device, and a personal identification medium.

Further, the information display medium 100 can be used for purposes other than forgery prevention and can be used as a toy, an educational material, a decorative trim of a product, a poster, or the like, for instance.

Instances

Concrete instances of this disclosure would be described below, but this disclosure is not limited to this mode.

[First Instance]

Aluminum was deposited as a light reflection layer 20 on a plastic substrate to have a film thickness of around 50 nm.

Then, the aluminum as the light reflection layer 20 was partially removed by use of a femtosecond laser.

In an information display medium obtained as such, metallic luster due to the aluminum was checked at the time of reflection observation, but at the time of transmission observation, a transmittance was changed due to the aluminum partially removed, so that a watermark pattern by the aluminum was observed.

[Second Instance]

(Second Instance-1)

A UV hardening resin was formed as a structure forming layer on a PET film carrier substrate to have a thickness of 2 µm, and after that, by use of a metallograph including, in advance, a region (a first region) of a two-dimensional grating structure having a structure pitch of 300 nm and a structure depth of 350 nm, a region (a first region) of a random dot structure having a structure pitch of 800 nm and a structure depth of 200 nm, and a region (a second region) of a flat structure, those structures were formed on the structure forming layer.

After the structures were formed as such, aluminum was deposited as a light reflection layer 20 to have a film thickness of around 50 nm. After that, scanning was performed by irradiation with a femtosecond laser from the PET film carrier substrate side so that a beam waist position was set at a position with a thickness of 1 µm in the structure forming layer. Hereby, the aluminum was removed in the region of the two-dimensional grating structure having a structure pitch of 300 nm and a structure depth of 350 nm. Note that a line width of the region where the aluminum was removed was from 2 µm to 5 µm.

Further, scanning was performed at another position of the information display medium with a higher intensity of the femtosecond laser such that irradiation was performed from the PET film carrier substrate side so that the beam waist position was set at a position with a thickness of 1 µm in the structure forming layer. Hereby, the aluminum was removed in an irradiation region other than the region of the flat structure. Note that a line width of the region where the aluminum was removed was from 2 µm to 5 µm.

Further, scanning was performed at another position of the information display medium by irradiation with the femtosecond laser from the PET film carrier substrate side so that the beam waist position was set at a position with a thickness of 1.5 µm in the structure forming layer. Hereby, the aluminum was removed in an irradiation region. Note that a line width of the region where the aluminum was removed was from 2 µm to 5 µm.

In the information display medium obtained as such, at the time of reflection observation, it was difficult to check that the region where the aluminum was removed was formed by visual observation under cover of first information such as a picture, a character, or a number formed in the first region, because the line width of the region was too thin. In the meantime, at the of transmission observation, since a transmittance of the region where the aluminum was removed was improved, identification information like a watermark pattern was observed in the region where the aluminum was removed.

(Second Instance-2)

A UV hardening resin was formed as a structure forming layer on a PET film carrier substrate to have a thickness of 2 µm, and after that, by use of a metallograph including, in advance, a region of a two-dimensional grating structure having a structure pitch of 300 nm and a structure depth of 350 nm, a region of a random dot structure having a structure pitch of 800 nm and a structure depth of 200 nm, and a region of a flat structure, those structures were formed on the structure forming layer.

After the structures were formed, aluminum was deposited as a light reflection layer 20 to have a film thickness of around 50 nm. After that, scanning was performed with a large width by irradiation with a femtosecond laser from the PET film carrier substrate side so that a beam waist position was set at a position with a thickness of 1 µm in the structure forming layer. Hereby, the aluminum was removed in an irradiation region other than the region of the flat structure. Note that a line width of the region where the aluminum was removed was 3 mm or more.

Further, scanning was performed at another position of the information display medium by irradiation with the femtosecond laser from the PET film carrier substrate side so that the beam waist position was set at a position with a thickness of 1.5 µm in the structure forming layer. Hereby, the aluminum was removed in an irradiation region. Note that a line width of the region where the aluminum was removed was 2 mm or more.

In the information display medium obtained as such, in the region where the aluminum was removed, an optical effect by an uneven structure was not observed at the time of reflection observation. Meanwhile, the optical effect was observed in a region where the aluminum remained. Further, since the scanning was performed with a large width, information formed by the region where the aluminum was removed was observed.

[Third Instance]
(Third Instance-1)

Optical variable ink was printed on a paper substrate.

Then, by use of a pulsed laser, the paper material and the optical variable ink were partially removed.

In the information display medium obtained as such, at the time of reflection observation, machining to the paper material was not visually observable, but machining to the optical variable ink was visually observable. However, at the time of transmission observation, a luminous transmittance was changed in the paper material partially removed and having different thicknesses, so that a watermark pattern was observed.

(Third Instance-2)

By use of a pulsed laser, a cavity portion obtained as a cavity by melting and sublimate of plastic and a carbonized portion that was carbonized were formed partially in a plastic substrate.

In an information display medium obtained as such, at the time of reflection observation, light was scattered in the cavity portion and light was absorbed in the carbonized portion, but a light absorption amount by the carbonized portion was larger, so that information was observable due to gradation of carbonization. Further, at the time of transmission observation, information different from the information at the time of reflection observation was observed due to monovalent gradation and a difference in light scattering degree by the cavity.

[Fourth Instance]

A plastic substrate was coated with an acrylic UV cured resin as a structure forming layer, and an uneven structure was patterned on the UV cured resin by use of a metallograph on which the uneven structure was formed in advance, and then, the UV cured resin was cured with UV. Aluminum was deposited on the UV cured resin as a light reflection layer to have a film thickness of around 50 nm.

Then, the aluminum was coated with a solution in which silver nitrate and polyvinyl pyrrolidone were dissolved in water, and the solution was dried to form a metal-ion containing layer. After that, by use of a femtosecond laser, silver particles having an average particle diameter of around 100 nm were formed in the metal-ion containing layer. Further, aluminum was partially removed by use of the same femtosecond laser.

In the information display medium obtained as such, it was observed that the metal-ion containing layer was colored in yellow due to the silver particles. Further, golden metallic luster was obtained in a region where such a colored region and the aluminum overlapped with each other. Further, light diffracted by the uneven structure was also observed.

[Fifth Instance]
(Instance 1)

By use of a pulsed laser, a modified region 523 was formed inside a substrate 10 to have a pitch of 1 μm.

In an information display medium 100 obtained as such, diffracted light was observed by inclining the information display medium 100. Further, diffracted light was also observed at the time of transmission observation.

(Instance 2)

By use of a pulsed laser, a modified region 523 was provided inside a substrate 10 so that the substrate 10 was carbonized.

Information due to gradation of carbonization was observed. Further, very weak diffracted light was checked.

(Instance 3)

Inside a substrate 10 in which information had been already formed by print ink on a lower boundary surface of the substrate 10, a modified region 523 was formed by use of a pulsed laser to have a pitch of 1 μm.

In an information display medium 100 obtained as such, diffracted light was observed by inclining the information display medium 100. Further, diffracted light was also observed at the time of transmission observation. Further, the information formed by the print ink on the lower boundary surface of the substrate 10 was also checked without deterioration.

This disclosure has been described above based on the embodiments. However, the scope of this disclosure is not limited to the exemplary embodiments illustrated and described herein and covers all embodiments that provide effects equivalent to those intended by this disclosure. Further, the scope of this disclosure is not limited to combinations of features of the invention defined by Claims, but can be defined by any combination of specific features among all the features disclosed herein.

Further, the present application claims a priority to Japanese Patent Application No. 2016-172797 (filed on Sep. 5, 2016), Japanese Patent Application No. 2016-172798 (filed on Sep. 5, 2016), Japanese Patent Application No. 2016-172799 (filed on Sep. 5, 2016), Japanese Patent Application No. 2016-208886 (filed on Oct. 25, 2016), and Japanese Patent Application No. 2017-099619 (filed on May 19, 2017), the disclosure of which is incorporated in its entirety by reference herein.

REFERENCE SIGNS LIST

10 substrate (structure forming layer)
20 light reflection layer
21, 70 second information display region
21a, 21b second information display region
30, 60 first region
31, 61 second region
50 laser beam
51 lens
52 laser source
53 reflecting mirror, half mirror
62 subregion
62a, 62b, 62c, 62d subregion
100, 200 information display medium
260 verifier
261 imaging device
330, 331, 332, 333 modified region
330, 370 application region
340, 341 information display region
411B low light reflection portion
412 metal-ion containing layer
413 particle
511 unmodified region
520 modified portion
521, 521a, 521b continuous modified portion
523 modified region
531, 532 pseudo boundary surface
560, 561 information display region

The invention claimed is:

1. A method of forming an identification information in an information display medium, the information display medium comprising:
a substrate; and
a light reflection layer, wherein,
the light reflection layer is made of one or more materials selected from a group consisting of a metal, an alloy, a metal compound, and a metalloid compound, the light reflection layer being placed on one surface of the substrate, and the light reflection layer includes a first region where a first information as an authentication information is displayed by either of or a combination of an outline shape or a shape of an uneven region, a second region continuous with the first region, and an information display region where an identification information is displayed in a shape formed by partial material removal of the light reflection layer, the information display region being set to partially or fully overlap with a part of the light reflection layer where the first information is displayed in the first region, wherein, the substrate includes a structure forming layer in which an uneven structure having a plurality of projections or recesses is formed on a surface corresponding to the first region on the one surface and a surface corresponding to the second region continuous with the first region is flat or formed in a planar shape with a roughness smaller than the first region; and the light reflection layer is formed on the surfaces, of the structure forming layer, corresponding to the first region and the second region formed of one or more materials selected from the group consisting of a metal, an alloy, a metal compound, and a metalloid compound having a refractive index different from the structure forming layer, wherein the method comprises:

forming the identification information in the light reflection layer by partially removing the light reflection layer by a pulsed laser.

2. A method of forming an identification information in an information display medium, the information display medium comprising:

a substrate; and a light reflection layer, wherein, the light reflection layer is made of one or more materials selected from a group consisting of a metal, an alloy, a metal compound, and a metalloid compound, the light reflection layer being placed on one surface of the substrate, and the light reflection layer includes a first region where a first information as an authentication information is displayed by either of or a combination of an outline shape or a shape of an uneven region, a second region continuous with the first region, and an information display region where an identification information is displayed in a shape formed by partial material removal of the light reflection layer, the information display region being set to partially or fully overlap with a part of the light reflection layer where the first information is displayed in the first region, wherein, the substrate includes a structure forming layer in which an uneven structure having a plurality of projections or recesses is formed on a surface corresponding to the first region on the one surface and a surface corresponding to the second region continuous with the first region is flat or formed in a planar shape with a roughness smaller than the first region; and the light reflection layer is formed on the surfaces, of the structure forming layer, corresponding to the first region and the second region formed of one or more materials selected from the group consisting of a metal, an alloy, a metal compound, and a metalloid compound having a refractive index different from the structure forming layer, wherein the method comprises:

forming the identification information by removing the one or more materials by irradiation with a pulse laser inside the structure forming layer by setting a beam waist position in a region from a side where the light reflection layer is not provided to an average thickness of the structure forming layer.

3. A method of forming an identification information in an information display medium, the information display medium comprising:

a substrate; and a light reflection layer, wherein, the light reflection layer is made of one or more materials selected from a group consisting of a metal, an alloy, a metal compound, and a metalloid compound, the light reflection layer being placed on one surface of the substrate, and the light reflection layer includes a first region where a first information as an authentication information is displayed by either of or a combination of an outline shape or a shape of an uneven region, a second region continuous with the first region, and an information display region where an identification information is displayed in a shape formed by partial material removal of the light reflection layer, the information display region being set to partially or fully overlap with a part of the light reflection layer where the first information is displayed in the first region, wherein, the substrate includes a structure forming layer in which an uneven structure having a plurality of projections or recesses is formed on a surface corresponding to the first region on the one surface and a surface corresponding to the second region continuous with the first region is flat or formed in a planar shape with a roughness smaller than the first region; and the light reflection layer is formed on the surfaces, of the structure forming layer, corresponding to the first region and the second region formed of one or more materials selected from the group consisting of a metal, an alloy, a metal compound, and a metalloid compound having a refractive index different from the structure forming layer, wherein the method comprises:

forming the identification information by removing the one or more materials by irradiation with a pulsed laser inside the structure forming layer by setting a beam waist position in a region from a side where the light reflection layer is provided to an average thickness of the structure forming layer.

* * * * *